US012689232B2

(12) United States Patent
    Moran

(10) Patent No.: US 12,689,232 B2
(45) Date of Patent: Jul. 21, 2026

(54) INDUCTION CHARGER

(71) Applicant: Masimo Corporation, Irvine, CA (US)

(72) Inventor: Brian Shanahan Moran, Irvine, CA (US)

(73) Assignee: Masimo Corporation, Irvine, CA (US)

( * ) Notice: Subject to any disclaimer, the term of this patent is extended or adjusted under 35 U.S.C. 154(b) by 187 days.

(21) Appl. No.: 18/660,017

(22) Filed: May 9, 2024

(65) Prior Publication Data

US 2024/0380246 A1 Nov. 14, 2024

Related U.S. Application Data

(60) Provisional application No. 63/501,363, filed on May 10, 2023.

(51) Int. Cl.
    *H02J 50/10* (2016.01)
    *H02J 7/70* (2026.01)
    (Continued)

(52) U.S. Cl.
    CPC .............. *H02J 50/10* (2016.02); *H02J 7/731* (2026.01); *H02J 50/005* (2020.01); *H02J 50/90* (2016.02)

(58) Field of Classification Search
    CPC ........ H02J 50/10; H02J 7/0044; H02J 50/005; H02J 50/90; H02J 7/0042
    See application file for complete search history.

(56) References Cited

U.S. PATENT DOCUMENTS

| | | | |
|---|---|---|---|
| 4,960,128 A | 10/1990 | Gordon et al. | |
| 4,964,408 A | 10/1990 | Hink et al. | |

(Continued)

FOREIGN PATENT DOCUMENTS

| | | |
|---|---|---|
| CN | 302687306 S | 12/2013 |
| CN | 302864470 | 7/2014 |

(Continued)

OTHER PUBLICATIONS

US 2024/0016391 A1, 01/2024, Lapotko et al. (withdrawn)

(Continued)

*Primary Examiner* — Michael N Orlando
*Assistant Examiner* — Abhishek A Patwardhan
(74) *Attorney, Agent, or Firm* — Knobbe, Martens, Olson & Bear, LLP

(57) ABSTRACT

Various implementations of chargers are provided herein for inductively charging an electronic device. In some implementations, the charger includes: a housing having an interior and a charging region configured to receive a portion of the electronic device; a substrate positioned within the interior; a cable configured to connect to a power source to provide energy to the charger; and an inductor member positioned within the interior. The inductor member receives electrical current from the cable and generates a magnetic field. The magnetic field induces electrical current in the electronic device when the portion of the electronic device is positioned at the charging region. The charger further includes a biasing member arranged within the interior and configured to apply a biasing force to the inductor member such that the inductor member is pressed against a portion of an interior surface of the housing at said charging region.

15 Claims, 24 Drawing Sheets

(51) Int. Cl.
H02J 50/00 (2016.01)
H02J 50/90 (2016.01)

(56) References Cited

U.S. PATENT DOCUMENTS

| | | | |
|---|---|---|---|
| 5,319,355 A | 6/1994 | Russek |
| 5,337,744 A | 8/1994 | Branigan |
| 5,341,805 A | 8/1994 | Stavridi et al. |
| 5,377,676 A | 1/1995 | Vari et al. |
| D360,723 S | 7/1995 | Kasai |
| 5,431,170 A | 7/1995 | Mathews |
| 5,436,499 A | 7/1995 | Namavar et al. |
| 5,456,252 A | 10/1995 | Vari et al. |
| 5,479,934 A | 1/1996 | Mran |
| 5,482,036 A | 1/1996 | Diab et al. |
| 5,494,043 A | 2/1996 | O'Sullivan et al. |
| 5,533,511 A | 7/1996 | Kaspari et al. |
| 5,590,649 A | 1/1997 | Caro et al. |
| 5,602,924 A | 2/1997 | Durand et al. |
| 5,638,816 A | 6/1997 | Kiani-Azarbayjany et al. |
| 5,638,818 A | 6/1997 | Diab et al. |
| 5,645,440 A | 7/1997 | Tobler et al. |
| 5,671,914 A | 9/1997 | Kalkhoran et al. |
| 5,726,440 A | 3/1998 | Kalkhoran et al. |
| D393,830 S | 4/1998 | Tobler et al. |
| 5,743,262 A | 4/1998 | Lepper, Jr. et al. |
| 5,747,806 A | 5/1998 | Khalil et al. |
| 5,750,994 A | 5/1998 | Schlager |
| 5,758,644 A | 6/1998 | Diab et al. |
| 5,760,910 A | 6/1998 | Lepper, Jr. et al. |
| 5,890,929 A | 4/1999 | Mills et al. |
| 5,919,134 A | 7/1999 | Diab |
| 5,987,343 A | 11/1999 | Kinast |
| 5,997,343 A | 12/1999 | Mills et al. |
| 6,002,952 A | 12/1999 | Diab et al. |
| 6,010,937 A | 1/2000 | Karam et al. |
| 6,027,452 A | 2/2000 | Flaherty et al. |
| 6,040,578 A | 3/2000 | Malin et al. |
| 6,066,204 A | 5/2000 | Haven |
| 6,075,755 A | 6/2000 | Zarchan |
| 6,091,530 A | 7/2000 | Duckworth |
| 6,115,673 A | 9/2000 | Malin et al. |
| 6,124,597 A | 9/2000 | Shehada et al. |
| 6,128,521 A | 10/2000 | Marro et al. |
| 6,129,675 A | 10/2000 | Jay |
| 6,144,868 A | 11/2000 | Parker |
| 6,152,754 A | 11/2000 | Gerhardt et al. |
| 6,184,521 B1 | 2/2001 | Coffin, IV et al. |
| 6,232,609 B1 | 5/2001 | Snyder et al. |
| 6,241,683 B1 | 6/2001 | Macklem et al. |
| 6,253,097 B1 | 6/2001 | Aronow et al. |
| 6,255,708 B1 | 7/2001 | Sudharsanan et al. |
| 6,280,381 B1 | 8/2001 | Malin et al. |
| 6,285,896 B1 | 9/2001 | Tobler et al. |
| 6,308,089 B1 | 10/2001 | von der Ruhr et al. |
| 6,317,627 B1 | 11/2001 | Ennen et al. |
| 6,321,100 B1 | 11/2001 | Parker |
| 6,334,065 B1 | 12/2001 | Al-Ali et al. |
| 6,360,114 B1 | 3/2002 | Diab et al. |
| 6,368,283 B1 | 4/2002 | Xu et al. |
| 6,411,373 B1 | 6/2002 | Garside et al. |
| 6,415,167 B1 | 7/2002 | Blank et al. |
| 6,430,437 B1 | 8/2002 | Marro |
| 6,430,525 B1 | 8/2002 | Weber et al. |
| 6,463,311 B1 | 10/2002 | Diab |
| 6,470,199 B1 | 10/2002 | Kopotic et al. |
| 6,487,429 B2 | 11/2002 | Hockersmith et al. |
| 6,505,059 B1 | 1/2003 | Kollias et al. |
| 6,525,386 B1 | 2/2003 | Mills et al. |
| 6,526,300 B1 | 2/2003 | Kiani et al. |
| 6,534,012 B1 | 3/2003 | Hazen et al. |
| 6,542,764 B1 | 4/2003 | Al-Ali et al. |
| 6,580,086 B1 | 6/2003 | Schulz et al. |
| 6,584,336 B1 | 6/2003 | Ali et al. |
| 6,587,196 B1 | 7/2003 | Stippick et al. |
| 6,587,199 B1 | 7/2003 | Luu |
| 6,597,932 B2 | 7/2003 | Tian et al. |
| 6,606,511 B1 | 8/2003 | Ali et al. |
| 6,635,559 B2 | 10/2003 | Greenwald et al. |
| 6,639,668 B1 | 10/2003 | Trepagnier |
| 6,640,116 B2 | 10/2003 | Diab |
| 6,640,117 B2 | 10/2003 | Makarewicz et al. |
| 6,658,276 B2 | 12/2003 | Kiani et al. |
| 6,661,161 B1 | 12/2003 | Lanzo et al. |
| 6,697,656 B1 | 2/2004 | Al-Ali |
| 6,697,658 B2 | 2/2004 | Al-Ali |
| RE38,476 E | 3/2004 | Diab et al. |
| RE38,492 E | 4/2004 | Diab et al. |
| 6,738,652 B2 | 5/2004 | Mattu et al. |
| 6,760,607 B2 | 7/2004 | Ai-Ali |
| 6,788,965 B2 | 9/2004 | Ruchti et al. |
| 6,816,241 B2 | 11/2004 | Grubisic |
| 6,822,564 B2 | 11/2004 | Al-Ali |
| 6,850,787 B2 | 2/2005 | Weber et al. |
| 6,850,788 B2 | 2/2005 | Al-Ali |
| 6,876,931 B2 | 4/2005 | Lorenz et al. |
| 6,920,345 B2 | 7/2005 | Al-Ali et al. |
| 6,934,570 B2 | 8/2005 | Kiani et al. |
| 6,943,348 B1 | 9/2005 | Coffin, IV |
| 6,956,649 B2 | 10/2005 | Acosta et al. |
| 6,961,598 B2 | 11/2005 | Diab |
| 6,970,792 B1 | 11/2005 | Diab |
| 6,985,764 B2 | 1/2006 | Mason et al. |
| 6,990,364 B2 | 1/2006 | Ruchti et al. |
| 6,998,247 B2 | 2/2006 | Monfre et al. |
| 7,003,338 B2 | 2/2006 | Weber et al. |
| 7,015,451 B2 | 3/2006 | Dalke et al. |
| 7,027,849 B2 | 4/2006 | Al-Ali |
| D519,944 S | 5/2006 | Ottens |
| D526,719 S | 8/2006 | Richie, Jr. et al. |
| 7,096,052 B2 | 8/2006 | Mason et al. |
| 7,096,054 B2 | 8/2006 | Abdul-Hafiz et al. |
| D529,616 S | 10/2006 | Deros et al. |
| 7,133,710 B2 | 11/2006 | Acosta et al. |
| 7,142,901 B2 | 11/2006 | Kiani et al. |
| 7,225,006 B2 | 5/2007 | Al-Ali et al. |
| RE39,672 E | 6/2007 | Shehada et al. |
| 7,254,429 B2 | 8/2007 | Schurman et al. |
| 7,254,431 B2 | 8/2007 | Al-Ali et al. |
| 7,254,434 B2 | 8/2007 | Schulz et al. |
| 7,274,955 B2 | 9/2007 | Kiani et al. |
| D554,263 S | 10/2007 | Al-Ali et al. |
| 7,280,858 B2 | 10/2007 | Al-Ali et al. |
| 7,289,835 B2 | 10/2007 | Mansfield et al. |
| 7,292,883 B2 | 11/2007 | De Felice et al. |
| 7,341,559 B2 | 3/2008 | Schulz et al. |
| 7,343,186 B2 | 3/2008 | Lamego et al. |
| D566,282 S | 4/2008 | Al-Ali et al. |
| 7,356,365 B2 | 4/2008 | Schurman |
| 7,371,981 B2 | 5/2008 | Abdul-Hafiz |
| 7,373,193 B2 | 5/2008 | Al-Ali et al. |
| 7,377,794 B2 | 5/2008 | Al-Ali et al. |
| 7,395,158 B2 | 7/2008 | Monfre et al. |
| 7,415,297 B2 | 8/2008 | Al-Ali et al. |
| 7,438,683 B2 | 10/2008 | Al-Ali et al. |
| 7,483,729 B2 | 1/2009 | Al-Ali et al. |
| D587,657 S | 3/2009 | Al-Ali et al. |
| 7,500,950 B2 | 3/2009 | Al-Ali et al. |
| 7,509,494 B2 | 3/2009 | Al-Ali |
| 7,510,849 B2 | 3/2009 | Schurman et al. |
| 7,514,725 B2 | 4/2009 | Wojtczuk et al. |
| 7,519,406 B2 | 4/2009 | Blank et al. |
| D592,507 S | 5/2009 | Wachman et al. |
| 7,530,942 B1 | 5/2009 | Diab |
| 7,593,230 B2 | 9/2009 | Abul-Haj et al. |
| 7,596,398 B2 | 9/2009 | Al-Ali et al. |
| 7,606,608 B2 | 10/2009 | Blank et al. |
| 7,620,674 B2 | 11/2009 | Ruchti et al. |
| D606,659 S | 12/2009 | Kiani et al. |
| 7,629,039 B2 | 12/2009 | Eckerbom et al. |
| 7,640,140 B2 | 12/2009 | Ruchti et al. |
| 7,647,083 B2 | 1/2010 | Al-Ali et al. |
| D609,193 S | 2/2010 | Al-Ali et al. |
| D614,305 S | 4/2010 | Al-Ali et al. |

(56) References Cited

U.S. PATENT DOCUMENTS

| | | | |
|---|---|---|---|
| 7,697,966 B2 | 4/2010 | Monfre et al. |
| 7,698,105 B2 | 4/2010 | Ruchti et al. |
| RE41,317 E | 5/2010 | Parker |
| RE41,333 E | 5/2010 | Blank et al. |
| 7,729,733 B2 | 6/2010 | Al-Ali et al. |
| 7,761,127 B2 | 7/2010 | Al-Ali et al. |
| 7,764,982 B2 | 7/2010 | Dalke et al. |
| D620,884 S | 8/2010 | Lee et al. |
| D621,516 S | 8/2010 | Kiani et al. |
| 7,791,155 B2 | 9/2010 | Diab |
| RE41,912 E | 11/2010 | Parker |
| 7,880,626 B2 | 2/2011 | Al-Ali et al. |
| 7,909,772 B2 | 3/2011 | Popov et al. |
| 7,919,713 B2 | 4/2011 | Al-Ali et al. |
| 7,937,128 B2 | 5/2011 | Al-Ali |
| 7,937,129 B2 | 5/2011 | Mason et al. |
| 7,941,199 B2 | 5/2011 | Kiani |
| 7,957,780 B2 | 6/2011 | Lamego et al. |
| 7,962,188 B2 | 6/2011 | Kiani et al. |
| 7,976,472 B2 | 7/2011 | Kiani |
| 7,990,382 B2 | 8/2011 | Kiani |
| 8,008,088 B2 | 8/2011 | Bellott et al. |
| RE42,753 E | 9/2011 | Kiani-Azarbayjany et al. |
| D645,818 S | 9/2011 | Guccione et al. |
| 8,028,701 B2 | 10/2011 | Al-Ali et al. |
| 8,048,040 B2 | 11/2011 | Kiani |
| 8,050,728 B2 | 11/2011 | Al-Ali et al. |
| RE43,169 E | 2/2012 | Parker |
| 8,118,620 B2 | 2/2012 | Al-Ali et al. |
| 8,130,105 B2 | 3/2012 | Al-Ali et al. |
| 8,182,443 B1 | 5/2012 | Kiani |
| 8,190,223 B2 | 5/2012 | Al-Ali et al. |
| 8,203,438 B2 | 6/2012 | Kiani et al. |
| 8,203,704 B2 | 6/2012 | Merritt et al. |
| 8,219,172 B2 | 7/2012 | Schurman et al. |
| 8,224,411 B2 | 7/2012 | Al-Ali et al. |
| 8,229,532 B2 | 7/2012 | Davis |
| 8,233,955 B2 | 7/2012 | Al-Ali et al. |
| 8,255,026 B1 | 8/2012 | Al-Ali |
| 8,265,723 B1 | 9/2012 | McHale et al. |
| 8,274,360 B2 | 9/2012 | Sampath et al. |
| 8,280,473 B2 | 10/2012 | Al-Ali |
| D670,396 S | 11/2012 | Doogan |
| 8,315,683 B2 | 11/2012 | Al-Ali et al. |
| RE43,860 E | 12/2012 | Parker |
| 8,346,330 B2 | 1/2013 | Lamego |
| 8,353,842 B2 | 1/2013 | Al-Ali et al. |
| 8,355,766 B2 | 1/2013 | MacNeish, III et al. |
| 8,374,665 B2 | 2/2013 | Lamego |
| 8,388,353 B2 | 3/2013 | Kiani et al. |
| 8,401,602 B2 | 3/2013 | Kiani |
| 8,414,499 B2 | 4/2013 | Al-Ali et al. |
| 8,418,524 B2 | 4/2013 | Al-Ali |
| 8,428,967 B2 | 4/2013 | Olsen et al. |
| 8,430,817 B1 | 4/2013 | Al-Ali et al. |
| D682,199 S | 5/2013 | Rautianen |
| 8,437,825 B2 | 5/2013 | Dalvi et al. |
| 8,455,290 B2 | 6/2013 | Siskavich |
| 8,457,707 B2 | 6/2013 | Kiani |
| 8,471,713 B2 | 6/2013 | Poeze et al. |
| 8,473,020 B2 | 6/2013 | Kiani et al. |
| 8,509,867 B2 | 8/2013 | Workman et al. |
| 8,515,509 B2 | 8/2013 | Bruinsma et al. |
| 8,523,781 B2 | 9/2013 | Ai-Ali |
| D692,145 S | 10/2013 | Al-Ali et al. |
| 8,571,617 B2 | 10/2013 | Reichgott et al. |
| 8,571,618 B1 | 10/2013 | Lamego et al. |
| 8,571,619 B2 | 10/2013 | Al-Ali et al. |
| D694,182 S | 11/2013 | Lee et al. |
| 8,577,431 B2 | 11/2013 | Lamego et al. |
| 8,584,345 B2 | 11/2013 | Al-Ali et al. |
| 8,588,880 B2 | 11/2013 | Abdul-Hafiz et al. |
| D697,027 S | 1/2014 | Ho |
| 8,630,691 B2 | 1/2014 | Lamego et al. |
| 8,641,631 B2 | 2/2014 | Sierra et al. |
| 8,652,060 B2 | 2/2014 | Al-Ali |
| 8,666,468 B1 | 3/2014 | Al-Ali |
| 8,670,811 B2 | 3/2014 | O'Reilly |
| RE44,823 E | 4/2014 | Parker |
| RE44,875 E | 4/2014 | Kiani et al. |
| 8,688,183 B2 | 4/2014 | Bruinsma et al. |
| 8,690,799 B2 | 4/2014 | Telfort et al. |
| 8,702,627 B2 | 4/2014 | Telfort et al. |
| 8,712,494 B1 | 4/2014 | MacNeish, III et al. |
| D704,634 S | 5/2014 | Eidelman et al. |
| 8,715,206 B2 | 5/2014 | Telfort et al. |
| 8,723,677 B1 | 5/2014 | Kiani |
| D707,627 S | 6/2014 | Brunner |
| 8,740,792 B1 | 6/2014 | Kiani et al. |
| 8,755,535 B2 | 6/2014 | Telfort et al. |
| 8,755,872 B1 | 6/2014 | Marinow |
| 8,764,671 B2 | 7/2014 | Kiani |
| 8,768,423 B2 | 7/2014 | Shakespeare et al. |
| 8,771,204 B2 | 7/2014 | Telfort et al. |
| 8,781,544 B2 | 7/2014 | Al-Ali et al. |
| 8,790,268 B2 | 7/2014 | Al-Ali |
| 8,801,613 B2 | 8/2014 | Al-Ali et al. |
| 8,821,397 B2 | 9/2014 | Al-Ali et al. |
| 8,821,415 B2 | 9/2014 | Al-Ali et al. |
| 8,830,449 B1 | 9/2014 | Lamego et al. |
| 8,840,549 B2 | 9/2014 | Al-Ali et al. |
| 8,852,094 B2 | 10/2014 | Al-Ali et al. |
| 8,852,994 B2 | 10/2014 | Wojtczuk et al. |
| D718,233 S | 11/2014 | Aumiller et al. |
| D718,236 S | 11/2014 | Murray |
| D718,324 S | 11/2014 | Rautiainen |
| 8,897,847 B2 | 11/2014 | Al-Ali |
| D720,289 S | 12/2014 | Chiang et al. |
| 8,911,377 B2 | 12/2014 | Al-Ali |
| 8,989,831 B2 | 3/2015 | Al-Ali et al. |
| 8,998,809 B2 | 4/2015 | Kiani |
| 9,066,666 B2 | 6/2015 | Kiani |
| 9,066,680 B1 | 6/2015 | Al-Ali et al. |
| D735,131 S | 7/2015 | Akana et al. |
| 9,095,316 B2 | 8/2015 | Welch et al. |
| 9,106,038 B2 | 8/2015 | Telfort et al. |
| 9,107,625 B2 | 8/2015 | Telfort et al. |
| 9,131,881 B2 | 9/2015 | Diab et al. |
| 9,138,180 B1 | 9/2015 | Coverston et al. |
| 9,153,112 B1 | 10/2015 | Kiani et al. |
| 9,192,329 B2 | 11/2015 | Al-Ali |
| 9,192,351 B1 | 11/2015 | Telfort et al. |
| 9,195,385 B2 | 11/2015 | Al-Ali et al. |
| D744,418 S | 12/2015 | Ogiahara |
| 9,211,095 B1 | 12/2015 | Al-Ali |
| 9,218,454 B2 | 12/2015 | Kiani et al. |
| 9,245,668 B1 | 1/2016 | Vo et al. |
| 9,267,572 B2 | 2/2016 | Barker et al. |
| D751,980 S | 3/2016 | Lee et al. |
| 9,277,880 B2 | 3/2016 | Poeze et al. |
| 9,307,928 B1 | 4/2016 | Al-Ali et al. |
| 9,323,894 B2 | 4/2016 | Kiani |
| D755,392 S | 5/2016 | Hwang et al. |
| 9,326,712 B1 | 5/2016 | Kiani |
| 9,392,945 B2 | 7/2016 | Al-Ali et al. |
| 9,408,542 B1 | 8/2016 | Kinast et al. |
| 9,436,645 B2 | 9/2016 | Al-Ali et al. |
| 9,445,759 B1 | 9/2016 | Lamego et al. |
| 9,460,846 B2 * | 10/2016 | Graham ............... H01F 27/366 |
| 9,474,474 B2 | 10/2016 | Lamego et al. |
| 9,480,435 B2 | 11/2016 | Olsen |
| 9,510,779 B2 | 12/2016 | Poeze et al. |
| 9,517,024 B2 | 12/2016 | Kiani et al. |
| 9,532,722 B2 | 1/2017 | Lamego et al. |
| 9,560,996 B2 | 2/2017 | Kiani |
| 9,579,039 B2 | 2/2017 | Jansen et al. |
| 9,583,256 B2 | 2/2017 | Lapetina et al. |
| 9,622,692 B2 | 4/2017 | Lamego et al. |
| D788,312 S | 5/2017 | Al-Ali et al. |
| 9,649,054 B2 | 5/2017 | Lamego et al. |
| 9,697,928 B2 | 7/2017 | Al-Ali et al. |
| 9,717,458 B2 | 8/2017 | Lamego et al. |
| 9,724,016 B1 | 8/2017 | Al-Ali et al. |
| 9,724,024 B2 | 8/2017 | Al-Ali |

(56) References Cited

U.S. PATENT DOCUMENTS

| | | | |
|---|---|---|---|
| 9,724,025 B1 | 8/2017 | Kiani et al. |
| 9,749,232 B2 | 8/2017 | Sampath et al. |
| 9,750,442 B2 | 9/2017 | Olsen |
| 9,750,461 B1 | 9/2017 | Telfort |
| 9,775,545 B2 | 10/2017 | Al-Ali et al. |
| 9,778,079 B1 | 10/2017 | Al-Ali et al. |
| 9,782,077 B2 | 10/2017 | Lamego et al. |
| 9,787,568 B2 | 10/2017 | Lamego et al. |
| 9,808,188 B1 | 11/2017 | Perea et al. |
| 9,839,379 B2 | 12/2017 | Al-Ali et al. |
| 9,839,381 B1 | 12/2017 | Weber et al. |
| 9,847,749 B2 | 12/2017 | Kiani et al. |
| 9,848,800 B1 | 12/2017 | Lee et al. |
| 9,861,298 B2 | 1/2018 | Eckerbom et al. |
| 9,861,305 B1 | 1/2018 | Weber et al. |
| 9,877,650 B2 | 1/2018 | Muhsin et al. |
| 9,891,079 B2 | 2/2018 | Dalvi |
| 9,924,897 B1 | 3/2018 | Abdul-Hafiz |
| 9,936,917 B2 | 4/2018 | Poeze et al. |
| 9,955,937 B2 | 5/2018 | Telfort |
| 9,965,946 B2 | 5/2018 | Al-Ali et al. |
| D820,865 S | 6/2018 | Muhsin et al. |
| 9,986,952 B2 | 6/2018 | Dalvi et al. |
| D822,215 S | 7/2018 | Al-Ali et al. |
| D822,216 S | 7/2018 | Barker et al. |
| 10,010,276 B2 | 7/2018 | Al-Ali et al. |
| D826,151 S | 8/2018 | Akana |
| 10,086,138 B1 | 10/2018 | Novak, Jr. |
| 10,111,591 B2 | 10/2018 | Dyell et al. |
| D833,624 S | 11/2018 | DeJong et al. |
| 10,123,729 B2 | 11/2018 | Dyell et al. |
| D835,282 S | 12/2018 | Barker et al. |
| D835,283 S | 12/2018 | Barker et al. |
| D835,284 S | 12/2018 | Barker et al. |
| D835,285 S | 12/2018 | Barker et al. |
| 10,149,616 B2 | 12/2018 | Al-Ali et al. |
| 10,154,815 B2 | 12/2018 | Al-Ali et al. |
| 10,159,412 B2 | 12/2018 | Lamego et al. |
| 10,188,348 B2 | 1/2019 | Al-Ali et al. |
| RE47,218 E | 2/2019 | Al-Ali |
| RE47,244 E | 2/2019 | Kiani et al. |
| RE47,249 E | 2/2019 | Kiani et al. |
| 10,205,291 B2 | 2/2019 | Scruggs et al. |
| 10,226,187 B2 | 3/2019 | Al-Ali et al. |
| 10,231,657 B2 | 3/2019 | Al-Ali et al. |
| 10,231,670 B2 | 3/2019 | Blank et al. |
| RE47,353 E | 4/2019 | Kiani et al. |
| D847,741 S | 5/2019 | Hu |
| 10,279,247 B2 | 5/2019 | Kiani |
| 10,292,664 B2 | 5/2019 | Al-Ali |
| 10,299,720 B2 | 5/2019 | Brown et al. |
| 10,327,337 B2 | 6/2019 | Schmidt et al. |
| 10,327,713 B2 | 6/2019 | Barker et al. |
| 10,332,630 B2 | 6/2019 | Al-Ali |
| D856,926 S | 8/2019 | Yoon |
| 10,383,520 B2 | 8/2019 | Wojtczuk et al. |
| 10,383,527 B2 | 8/2019 | Al-Ali |
| 10,388,120 B2 | 8/2019 | Muhsin et al. |
| D864,120 S | 10/2019 | Forrest et al. |
| 10,441,181 B1 | 10/2019 | Telfort et al. |
| 10,441,196 B2 | 10/2019 | Eckerbom et al. |
| 10,448,844 B2 | 10/2019 | Al-Ali et al. |
| 10,448,871 B2 | 10/2019 | Al-Ali et al. |
| 10,456,038 B2 | 10/2019 | Lamego et al. |
| 10,463,340 B2 | 11/2019 | Telfort et al. |
| 10,471,159 B1 | 11/2019 | Lapotko et al. |
| 10,505,311 B2 | 12/2019 | Al-Ali et al. |
| D872,016 S | 1/2020 | Liao |
| 10,524,738 B2 | 1/2020 | Olsen |
| 10,532,174 B2 | 1/2020 | Al-Ali |
| 10,537,285 B2 | 1/2020 | Shreim et al. |
| 10,542,903 B2 | 1/2020 | Al-Ali et al. |
| 10,555,678 B2 | 2/2020 | Dalvi et al. |
| 10,568,553 B2 | 2/2020 | O'Neil et al. |
| 10,608,817 B2 | 3/2020 | Haider et al. |
| D880,477 S | 4/2020 | Forrest et al. |
| 10,617,302 B2 | 4/2020 | Al-Ali et al. |
| 10,617,335 B2 | 4/2020 | Al-Ali et al. |
| 10,627,783 B2 | 4/2020 | Rothkopf et al. |
| 10,637,181 B2 | 4/2020 | Al-Ali et al. |
| D883,201 S | 5/2020 | Chen et al. |
| D886,058 S | 6/2020 | Yoon |
| D886,849 S | 6/2020 | Muhsin et al. |
| D887,548 S | 6/2020 | Abdul-Hafiz et al. |
| D887,549 S | 6/2020 | Abdul-Hafiz et al. |
| D887,977 S | 6/2020 | Weinstein |
| 10,667,764 B2 | 6/2020 | Ahmed et al. |
| D890,708 S | 7/2020 | Forrest et al. |
| 10,721,785 B2 | 7/2020 | Al-Ali |
| D892,732 S | 8/2020 | Akana |
| 10,736,518 B2 | 8/2020 | Al-Ali et al. |
| 10,750,984 B2 | 8/2020 | Pauley et al. |
| D897,098 S | 9/2020 | Al-Ali |
| 10,779,098 B2 | 9/2020 | Iswanto et al. |
| D902,858 S | 11/2020 | Sun |
| 10,827,961 B1 | 11/2020 | Iyengar et al. |
| 10,828,007 B1 | 11/2020 | Telfort et al. |
| 10,832,818 B2 | 11/2020 | Muhsin et al. |
| 10,849,554 B2 | 12/2020 | Shreim et al. |
| 10,856,750 B2 | 12/2020 | Indorf |
| D906,970 S | 1/2021 | Forrest et al. |
| D908,213 S | 1/2021 | Abdul-Hafiz et al. |
| 10,918,281 B2 | 2/2021 | Al-Ali et al. |
| 10,932,705 B2 | 3/2021 | Muhsin et al. |
| 10,932,729 B2 | 3/2021 | Kiani et al. |
| 10,939,878 B2 | 3/2021 | Kiani et al. |
| 10,956,950 B2 | 3/2021 | Al-Ali et al. |
| D916,135 S | 4/2021 | Indorf et al. |
| D917,046 S | 4/2021 | Abdul-Hafiz et al. |
| D917,472 S | 4/2021 | Kwon |
| D917,550 S | 4/2021 | Indorf et al. |
| D917,564 S | 4/2021 | Indorf et al. |
| D917,704 S | 4/2021 | Al-Ali et al. |
| 10,987,066 B2 | 4/2021 | Chandran et al. |
| 10,991,135 B2 | 4/2021 | Al-Ali et al. |
| D919,094 S | 5/2021 | Al-Ali et al. |
| D919,100 S | 5/2021 | Al-Ali et al. |
| 11,006,867 B2 | 5/2021 | Al-Ali |
| D921,202 S | 6/2021 | Al-Ali et al. |
| 11,024,064 B2 | 6/2021 | Muhsin et al. |
| 11,026,604 B2 | 6/2021 | Chen et al. |
| D925,597 S | 7/2021 | Chandran et al. |
| D926,367 S | 7/2021 | Cruice |
| D927,233 S | 8/2021 | Lee et al. |
| D927,699 S | 8/2021 | Al-Ali et al. |
| 11,076,777 B2 | 8/2021 | Lee et al. |
| 11,114,188 B2 | 9/2021 | Poeze et al. |
| D932,427 S | 10/2021 | Schoeck |
| D933,232 S | 10/2021 | Al-Ali et al. |
| D933,233 S | 10/2021 | Al-Ali et al. |
| D933,234 S | 10/2021 | Al-Ali et al. |
| D933,597 S | 10/2021 | Natsume |
| 11,145,408 B2 | 10/2021 | Sampath et al. |
| 11,147,518 B1 | 10/2021 | Al-Ali et al. |
| D935,450 S | 11/2021 | Lee et al. |
| D936,575 S | 11/2021 | Feng |
| 11,185,262 B2 | 11/2021 | Al-Ali et al. |
| 11,191,484 B2 | 12/2021 | Kiani et al. |
| D946,596 S | 3/2022 | Ahmed |
| D946,597 S | 3/2022 | Ahmed |
| D946,598 S | 3/2022 | Ahmed |
| D946,617 S | 3/2022 | Ahmed |
| 11,272,839 B2 | 3/2022 | Al-Ali et al. |
| 11,289,199 B2 | 3/2022 | Al-Ali |
| RE49,034 E | 4/2022 | Al-Ali |
| 11,298,021 B2 | 4/2022 | Muhsin et al. |
| D950,580 S | 5/2022 | Ahmed |
| D950,599 S | 5/2022 | Ahmed |
| D950,738 S | 5/2022 | Al-Ali et al. |
| D953,260 S | 5/2022 | On |
| D957,648 S | 7/2022 | Al-Ali |
| 11,382,567 B2 | 7/2022 | O'Brien et al. |
| 11,389,093 B2 | 7/2022 | Triman et al. |
| 11,406,286 B2 | 8/2022 | Al-Ali et al. |

(56) References Cited

U.S. PATENT DOCUMENTS

| | | | |
|---|---|---|---|
| 11,417,426 B2 | 8/2022 | Muhsin et al. |
| 11,439,329 B2 | 9/2022 | Lamego |
| 11,445,948 B2 | 9/2022 | Scruggs et al. |
| D965,789 S | 10/2022 | Al-Ali et al. |
| D967,433 S | 10/2022 | Al-Ali et al. |
| 11,464,410 B2 | 10/2022 | Muhsin |
| D968,586 S | 11/2022 | Fan |
| 11,504,058 B1 | 11/2022 | Sharma et al. |
| 11,504,066 B1 | 11/2022 | Dalvi et al. |
| D971,933 S | 12/2022 | Ahmed |
| D973,072 S | 12/2022 | Ahmed |
| D973,685 S | 12/2022 | Ahmed |
| D973,686 S | 12/2022 | Ahmed |
| D974,193 S | 1/2023 | Forrest et al. |
| D979,516 S | 2/2023 | Al-Ali et al. |
| D980,091 S | 3/2023 | Forrest et al. |
| 11,596,363 B2 | 3/2023 | Lamego |
| 11,627,919 B2 | 4/2023 | Kiani et al. |
| 11,637,437 B2 | 4/2023 | Al-Ali et al. |
| D985,498 S | 5/2023 | Al-Ali et al. |
| 11,653,862 B2 | 5/2023 | Dalvi et al. |
| D989,112 S | 6/2023 | Muhsin et al. |
| D989,327 S | 6/2023 | Al-Ali et al. |
| D989,520 S | 6/2023 | Trevisan |
| 11,678,829 B2 | 6/2023 | Al-Ali et al. |
| 11,679,579 B2 | 6/2023 | Al-Ali |
| 11,684,296 B2 | 6/2023 | Vo et al. |
| 11,692,934 B2 | 7/2023 | Normand et al. |
| 11,701,043 B2 | 7/2023 | Al-Ali et al. |
| D997,365 S | 8/2023 | Hwang |
| 11,721,105 B2 | 8/2023 | Ranasinghe et al. |
| 11,730,379 B2 | 8/2023 | Ahmed et al. |
| D998,625 S | 9/2023 | Indorf et al. |
| D998,630 S | 9/2023 | Indorf et al. |
| D998,631 S | 9/2023 | Indorf et al. |
| D999,244 S | 9/2023 | Indorf et al. |
| D999,245 S | 9/2023 | Indorf et al. |
| D999,246 S | 9/2023 | Indorf et al. |
| 11,766,198 B2 | 9/2023 | Pauley et al. |
| D1,000,975 S | 10/2023 | Al-Ali et al. |
| 11,803,623 B2 | 10/2023 | Kiani et al. |
| 11,832,940 B2 | 12/2023 | Diab et al. |
| D1,013,179 S | 1/2024 | Al-Ali et al. |
| 11,872,156 B2 | 1/2024 | Telfort et al. |
| 11,879,960 B2 | 1/2024 | Ranasinghe et al. |
| 11,883,129 B2 | 1/2024 | Olsen |
| D1,022,729 S | 4/2024 | Forrest et al. |
| 11,951,186 B2 | 4/2024 | Krishnamani et al. |
| 11,974,833 B2 | 5/2024 | Forrest et al. |
| 11,986,067 B2 | 5/2024 | Al-Ali et al. |
| 11,986,289 B2 | 5/2024 | Dalvi et al. |
| 11,986,305 B2 | 5/2024 | Al-Ali et al. |
| D1,030,660 S | 6/2024 | Liu |
| D1,031,729 S | 6/2024 | Forrest et al. |
| 12,004,869 B2 | 6/2024 | Kiani et al. |
| 12,014,328 B2 | 6/2024 | Wachman et al. |
| D1,036,293 S | 7/2024 | Al-Ali et al. |
| D1,037,462 S | 7/2024 | Al-Ali et al. |
| 12,029,844 B2 | 7/2024 | Pauley et al. |
| 12,048,534 B2 | 7/2024 | Vo et al. |
| D1,038,876 S | 8/2024 | Mantrawadi |
| 12,064,217 B2 | 8/2024 | Ahmed et al. |
| 12,066,426 B1 | 8/2024 | Lapotko et al. |
| D1,041,511 S | 9/2024 | Indorf et al. |
| D1,042,596 S | 9/2024 | DeJong et al. |
| D1,042,852 S | 9/2024 | Hwang |
| 12,076,159 B2 | 9/2024 | Belur Nagaraj et al. |
| 12,082,926 B2 | 9/2024 | Sharma et al. |
| D1,044,828 S | 10/2024 | Chandran et al. |
| D1,048,571 S | 10/2024 | Yu et al. |
| D1,048,908 S | 10/2024 | Al-Ali et al. |
| 12,106,752 B2 | 10/2024 | Campbell et al. |
| 12,114,974 B2 | 10/2024 | Al-Ali et al. |
| 12,126,683 B2 | 10/2024 | Koo et al. |
| 12,127,838 B2 | 10/2024 | Olsen et al. |
| 12,128,213 B2 | 10/2024 | Kiani et al. |
| 12,131,661 B2 | 10/2024 | Pauley et al. |
| D1,050,910 S | 11/2024 | Al-Ali et al. |
| 12,133,717 B2 | 11/2024 | Al-Ali et al. |
| 12,178,572 B1 | 12/2024 | Pauley et al. |
| 12,178,581 B2 | 12/2024 | Telfort et al. |
| 12,178,852 B2 | 12/2024 | Kiani et al. |
| D1,057,159 S | 1/2025 | DeJong et al. |
| D1,057,160 S | 1/2025 | DeJong et al. |
| 12,198,790 B1 | 1/2025 | Al-Ali |
| 12,200,421 B2 | 1/2025 | Campbell et al. |
| 12,207,901 B1 | 1/2025 | Lapotko et al. |
| D1,060,680 S | 2/2025 | Al-Ali et al. |
| D1,061,585 S | 2/2025 | Indorf |
| D1,063,893 S | 2/2025 | DeJong et al. |
| 12,220,207 B2 | 2/2025 | Telfort et al. |
| 12,235,941 B2 | 2/2025 | Kiani et al. |
| 12,236,767 B2 | 2/2025 | Muhsin et al. |
| D1,066,244 S | 3/2025 | Lim et al. |
| D1,066,672 S | 3/2025 | Al-Ali et al. |
| D1,068,656 S | 4/2025 | Trevisan et al. |
| D1,071,195 S | 4/2025 | Seung |
| D1,072,836 S | 4/2025 | Indorf |
| D1,072,837 S | 4/2025 | Ahmed et al. |
| 12,272,445 B1 | 4/2025 | Kiani |
| D1,078,689 S | 6/2025 | Hwang |
| D1,079,020 S | 6/2025 | Hwang |
| 12,336,796 B2 | 6/2025 | Al-Ali |
| D1,083,653 S | 7/2025 | DeJong et al. |
| D1,085,102 S | 7/2025 | Indorf et al. |
| 12,362,596 B2 | 7/2025 | Barker et al. |
| 12,390,114 B2 | 8/2025 | Novak, Jr. et al. |
| D1,092,244 S | 9/2025 | DeJong et al. |
| D1,093,406 S | 9/2025 | Indorf et al. |
| D1,094,735 S | 9/2025 | DeJong et al. |
| D1,095,288 S | 9/2025 | Lim |
| D1,095,483 S | 9/2025 | DeJong et al. |
| 12,433,524 B2 | 10/2025 | Al-Ali et al. |
| 12,440,128 B2 | 10/2025 | Al-Ali et al. |
| D1,102,622 S | 11/2025 | Al-Ali et al. |
| 12,478,272 B2 | 11/2025 | Telfort et al. |
| 12,478,293 B1 | 11/2025 | Al-Ali et al. |
| D1,106,466 S | 12/2025 | Avendaño et al. |
| 12,495,967 B2 | 12/2025 | Muhsin et al. |
| 12,495,999 B2 | 12/2025 | Al-Ali et al. |
| 12,507,952 B2 | 12/2025 | Al-Ali et al. |
| 12,521,021 B2 | 1/2026 | Al-Ali et al. |
| 12,521,506 B2 | 1/2026 | Yu et al. |
| 12,538,084 B1 | 1/2026 | Telfort et al. |
| 12,539,046 B2 | 2/2026 | Kiani |
| 2001/0034477 A1 | 10/2001 | Mansfield et al. |
| 2001/0039483 A1 | 11/2001 | Brand et al. |
| 2002/0010401 A1 | 1/2002 | Bushmakin et al. |
| 2002/0058864 A1 | 5/2002 | Mansfield et al. |
| 2002/0133080 A1 | 9/2002 | Apruzzese et al. |
| 2003/0013975 A1 | 1/2003 | Kiani |
| 2003/0018243 A1 | 1/2003 | Gerhardt et al. |
| 2003/0144582 A1 | 7/2003 | Cohen et al. |
| 2003/0156288 A1 | 8/2003 | Barnum et al. |
| 2003/0212312 A1 | 11/2003 | Coffin, IV et al. |
| 2004/0106163 A1 | 6/2004 | Workman, Jr. et al. |
| 2005/0055276 A1 | 3/2005 | Kiani et al. |
| 2005/0234317 A1 | 10/2005 | Kiani |
| 2006/0073719 A1 | 4/2006 | Kiani |
| 2006/0189871 A1 | 8/2006 | Al-Ali et al. |
| 2007/0073116 A1 | 3/2007 | Kiani et al. |
| 2007/0078315 A1 | 4/2007 | Kling |
| 2007/0180140 A1 | 8/2007 | Welch et al. |
| 2007/0244377 A1 | 10/2007 | Cozad et al. |
| 2008/0064965 A1 | 3/2008 | Jay et al. |
| 2008/0094228 A1 | 4/2008 | Welch et al. |
| 2008/0103375 A1 | 5/2008 | Kiani |
| 2008/0221418 A1 | 9/2008 | Al-Ali et al. |
| 2009/0036759 A1 | 2/2009 | Ault et al. |
| 2009/0093687 A1 | 4/2009 | Telfort et al. |
| 2009/0095926 A1 | 4/2009 | MacNeish, III |
| 2009/0247984 A1 | 10/2009 | Lamego et al. |
| 2009/0275844 A1 | 11/2009 | Al-Ali |
| 2010/0004518 A1 | 1/2010 | Vo et al. |

(56) References Cited

U.S. PATENT DOCUMENTS

| | | |
|---|---|---|
| 2010/0030040 A1 | 2/2010 | Poeze et al. |
| 2010/0099964 A1 | 4/2010 | O'Reilly et al. |
| 2010/0234718 A1 | 9/2010 | Sampath et al. |
| 2010/0270257 A1 | 10/2010 | Wachman et al. |
| 2011/0028806 A1 | 2/2011 | Merritt et al. |
| 2011/0028809 A1 | 2/2011 | Goodman |
| 2011/0040197 A1 | 2/2011 | Welch et al. |
| 2011/0082711 A1 | 4/2011 | Poeze et al. |
| 2011/0087081 A1 | 4/2011 | Kiani et al. |
| 2011/0118561 A1 | 5/2011 | Tari et al. |
| 2011/0137297 A1 | 6/2011 | Kiani et al. |
| 2011/0172498 A1 | 7/2011 | Olsen et al. |
| 2012/0123231 A1 | 5/2012 | O'Reilly |
| 2012/0165629 A1 | 6/2012 | Merritt et al. |
| 2012/0209084 A1 | 8/2012 | Olsen et al. |
| 2012/0226117 A1 | 9/2012 | Lamego et al. |
| 2012/0283524 A1 | 11/2012 | Kiani et al. |
| 2013/0023775 A1 | 1/2013 | Lamego et al. |
| 2013/0060147 A1 | 3/2013 | Welch et al. |
| 2013/0096405 A1 | 4/2013 | Garfio |
| 2013/0296672 A1 | 11/2013 | O'Neil et al. |
| 2013/0345921 A1 | 12/2013 | Al-Ali et al. |
| 2014/0104999 A1 | 4/2014 | Kim et al. |
| 2014/0117926 A1 | 5/2014 | Hwu et al. |
| 2014/0166076 A1 | 6/2014 | Kiani et al. |
| 2014/0180160 A1 | 6/2014 | Brown et al. |
| 2014/0187973 A1 | 7/2014 | Brown et al. |
| 2014/0275871 A1 | 9/2014 | Lamego et al. |
| 2014/0275872 A1 | 9/2014 | Merritt et al. |
| 2014/0316217 A1 | 10/2014 | Purdon et al. |
| 2014/0316218 A1 | 10/2014 | Purdon et al. |
| 2014/0323897 A1 | 10/2014 | Brown et al. |
| 2014/0323898 A1 | 10/2014 | Purdon et al. |
| 2015/0005600 A1 | 1/2015 | Blank et al. |
| 2015/0011907 A1 | 1/2015 | Purdon et al. |
| 2015/0073241 A1 | 3/2015 | Lamego |
| 2015/0080754 A1 | 3/2015 | Purdon et al. |
| 2015/0099950 A1 | 4/2015 | Al-Ali et al. |
| 2016/0322856 A1* | 11/2016 | Rejman ................... H02J 50/10 |
| 2017/0024748 A1 | 1/2017 | Haider |
| 2017/0173632 A1 | 6/2017 | Al-Ali |
| 2017/0251974 A1 | 9/2017 | Shreim et al. |
| 2018/0242926 A1 | 8/2018 | Muhsin et al. |
| 2018/0247712 A1 | 8/2018 | Muhsin et al. |
| 2019/0239787 A1 | 8/2019 | Pauley et al. |
| 2019/0320906 A1 | 10/2019 | Olsen |
| 2020/0014236 A1* | 1/2020 | Graham ................ H02J 7/0044 |
| 2020/0060869 A1 | 2/2020 | Telfort et al. |
| 2020/0111552 A1 | 4/2020 | Ahmed |
| 2020/0113520 A1 | 4/2020 | Abdul-Hafiz et al. |
| 2020/0138368 A1 | 5/2020 | Kiani et al. |
| 2020/0163597 A1 | 5/2020 | Dalvi et al. |
| 2020/0253474 A1 | 8/2020 | Muhsin et al. |
| 2020/0253544 A1 | 8/2020 | Belur Nagaraj et al. |
| 2020/0275841 A1 | 9/2020 | Telfort et al. |
| 2020/0288983 A1 | 9/2020 | Telfort et al. |
| 2020/0329983 A1 | 10/2020 | Al-Ali et al. |
| 2020/0329993 A1 | 10/2020 | Al-Ali et al. |
| 2021/0022628 A1 | 1/2021 | Telfort et al. |
| 2021/0099027 A1* | 4/2021 | Larsson ................ H02J 7/0042 |
| 2021/0104173 A1 | 4/2021 | Pauley et al. |
| 2021/0113121 A1 | 4/2021 | Diab et al. |
| 2021/0117525 A1 | 4/2021 | Kiani et al. |
| 2021/0118581 A1 | 4/2021 | Kiani et al. |
| 2021/0121582 A1 | 4/2021 | Krishnamani et al. |
| 2021/0161465 A1 | 6/2021 | Barker et al. |
| 2021/0236729 A1 | 8/2021 | Kiani et al. |
| 2021/0256835 A1 | 8/2021 | Ranasinghe et al. |
| 2021/0275101 A1 | 9/2021 | Vo et al. |
| 2021/0290060 A1 | 9/2021 | Ahmed |
| 2021/0290072 A1 | 9/2021 | Forrest |
| 2021/0290080 A1 | 9/2021 | Ahmed |
| 2021/0290120 A1 | 9/2021 | Al-Ali |
| 2021/0290177 A1 | 9/2021 | Novak, Jr. |
| 2021/0290184 A1 | 9/2021 | Ahmed |
| 2021/0296008 A1 | 9/2021 | Novak, Jr. |
| 2021/0330228 A1 | 10/2021 | Olsen et al. |
| 2021/0386382 A1 | 12/2021 | Olsen et al. |
| 2021/0402110 A1 | 12/2021 | Pauley et al. |
| 2022/0039707 A1 | 2/2022 | Sharma et al. |
| 2022/0053892 A1 | 2/2022 | Al-Ali et al. |
| 2022/0071562 A1 | 3/2022 | Kiani |
| 2022/0096603 A1 | 3/2022 | Kiani et al. |
| 2022/0151521 A1 | 5/2022 | Krishnamani et al. |
| 2022/0218244 A1 | 7/2022 | Kiani et al. |
| 2022/0287574 A1 | 9/2022 | Telfort et al. |
| 2022/0296161 A1 | 9/2022 | Al-Ali et al. |
| 2022/0361819 A1 | 11/2022 | Al-Ali et al. |
| 2022/0379059 A1 | 12/2022 | Yu et al. |
| 2022/0392610 A1 | 12/2022 | Kiani et al. |
| 2023/0028745 A1 | 1/2023 | Al-Ali |
| 2023/0038389 A1 | 2/2023 | Vo |
| 2023/0045647 A1 | 2/2023 | Vo |
| 2023/0058052 A1 | 2/2023 | Al-Ali |
| 2023/0058342 A1 | 2/2023 | Kiani |
| 2023/0069789 A1 | 3/2023 | Koo et al. |
| 2023/0087671 A1 | 3/2023 | Telfort et al. |
| 2023/0110152 A1 | 4/2023 | Forrest et al. |
| 2023/0111198 A1 | 4/2023 | Yu et al. |
| 2023/0115397 A1 | 4/2023 | Vo et al. |
| 2023/0116371 A1 | 4/2023 | Mills et al. |
| 2023/0135297 A1 | 5/2023 | Kiani et al. |
| 2023/0138098 A1 | 5/2023 | Telfort et al. |
| 2023/0145155 A1 | 5/2023 | Krishnamani et al. |
| 2023/0147750 A1 | 5/2023 | Barker et al. |
| 2023/0210417 A1 | 7/2023 | Al-Ali et al. |
| 2023/0222805 A1 | 7/2023 | Muhsin et al. |
| 2023/0222887 A1 | 7/2023 | Muhsin et al. |
| 2023/0226331 A1 | 7/2023 | Kiani et al. |
| 2023/0284916 A1 | 9/2023 | Telfort |
| 2023/0284943 A1 | 9/2023 | Scruggs et al. |
| 2023/0301562 A1 | 9/2023 | Scruggs et al. |
| 2023/0346993 A1 | 11/2023 | Kiani et al. |
| 2023/0368221 A1 | 11/2023 | Haider |
| 2023/0371893 A1 | 11/2023 | Al-Ali et al. |
| 2023/0389837 A1 | 12/2023 | Krishnamani et al. |
| 2024/0016418 A1 | 1/2024 | Devadoss et al. |
| 2024/0016419 A1 | 1/2024 | Devadoss et al. |
| 2024/0047061 A1 | 2/2024 | Al-Ali et al. |
| 2024/0049310 A1 | 2/2024 | Al-Ali et al. |
| 2024/0049986 A1 | 2/2024 | Al-Ali et al. |
| 2024/0081656 A1 | 3/2024 | DeJong et al. |
| 2024/0122486 A1 | 4/2024 | Kiani |
| 2024/0180456 A1 | 6/2024 | Al-Ali |
| 2024/0188872 A1 | 6/2024 | Al-Ali et al. |
| 2024/0245855 A1 | 7/2024 | Vo et al. |
| 2024/0252046 A1 | 8/2024 | Jansen et al. |
| 2024/0260894 A1 | 8/2024 | Olsen |
| 2024/0267698 A1 | 8/2024 | Telfort et al. |
| 2024/0277233 A1 | 8/2024 | Al-Ali |
| 2024/0277280 A1 | 8/2024 | Al-Ali |
| 2024/0298920 A1 | 9/2024 | Fernkbist et al. |
| 2024/0306985 A1 | 9/2024 | Vo et al. |
| 2024/0324953 A1 | 10/2024 | Telfort |
| 2024/0380247 A1 | 11/2024 | Moran |
| 2024/0404549 A1 | 12/2024 | Campbell et al. |
| 2025/0000458 A1 | 1/2025 | Abdul-Hafiz et al. |
| 2025/0037836 A1 | 1/2025 | Kiani |
| 2025/0100482 A1 | 3/2025 | Al-Ali et al. |
| 2025/0118415 A1 | 4/2025 | Olsen |
| 2025/0255764 A1 | 8/2025 | Stead |
| 2025/0278512 A1 | 9/2025 | Koo et al. |
| 2025/0281059 A1 | 9/2025 | Avendano |
| 2025/0288250 A1 | 9/2025 | Al-Ali et al. |
| 2025/0295366 A1 | 9/2025 | Al-Ali et al. |
| 2025/0302426 A1 | 10/2025 | Ha et al. |
| 2025/0311949 A1 | 10/2025 | Al-Ali et al. |
| 2025/0318761 A1 | 10/2025 | Al-Ali et al. |
| 2025/0322950 A1 | 10/2025 | Al-Ali et al. |
| 2025/0323417 A1 | 10/2025 | Rey |
| 2025/0329240 A1 | 10/2025 | Kiani |
| 2025/0344010 A1 | 11/2025 | Al-Ali et al. |

(56) References Cited

U.S. PATENT DOCUMENTS

| | | | |
|---|---|---|---|
| 2026/0014333 A1 | 1/2026 | Fernkvist et al. |
| 2026/0014334 A1 | 1/2026 | Danwihl |
| 2026/0048198 A1 | 2/2026 | Vo et al. |

FOREIGN PATENT DOCUMENTS

| | | |
|---|---|---|
| CN | 303604833 | 3/2016 |
| CN | 304349108 | 11/2017 |
| CN | 304593170 | 4/2018 |
| CN | 304783451 | 8/2018 |
| CN | 304945645 | 12/2018 |
| CN | 305321012 | 8/2019 |
| CN | 305485027 | 12/2019 |
| CN | 305819497 | 6/2020 |
| CN | 307211403 | 3/2022 |
| CN | 307222658 | 4/2022 |
| CN | 308490112 | 2/2024 |
| GB | 4032616 | 11/2013 |
| GB | 6172121 | 2/2022 |
| GB | 6380576 | 8/2024 |
| IN | 319236-001 | 8/2019 |
| JP | D1400735 | 11/2010 |
| JP | D1436448 | 3/2012 |
| JP | D1489271 | 12/2013 |
| JP | D1716615 | 6/2022 |
| JP | D1725593 | 9/2022 |
| KR | 30-0645410 | 5/2012 |
| WO | WO D202560-001 | 9/2019 |

OTHER PUBLICATIONS

"AGENT: The World's Smartest Watch", https://www.kickstarter.com/projects/secretlabs/agent-the-worlds-smartest-watch/faqs, Last updated Apr. 30, 2016, pp. 8.

"Apple Watch Magnetic Charging Cable (1 m)," https://www.apple.com/shop/product/MX2E2AM/A/apple-watchmagnetic-charging-cable-1m (last visited Mar. 6, 2023), pp. 4.

Belkin BoostCharge Pro 2-in-1, Posted Date Feb. 4, 2021 [Online] [Retrieved Aug. 20, 2023] Retrieved From Internet, https://www.fnac.com/m p49897597 /Bel kin-BoostCharge-Pro-2-in-1-Plot-de-charge-sans-fil-magnetique-adaptateur-secteur-15-Watt-noir/w-4.

Bennett, Brian, "LG's WCP-300 easily charges sans wires (hands-on)", https://www.cnet.com/reviews/lg-wcp-300-wireless-charger-preview/, Feb. 26, 2013, pp. 3.

Chang-Wook, Kim, "Mobile 11th Street, Mobile Phone Wireless Charger Unlimited Sale", etnews, Mar. 11, 2013, pp. 2.

Hanselman, Scott, "Exclusive Sneak Peek: The AGENT Smart Watch Emulator and managed .NET code on my wrist!", https://www.hanselman.com/blog/exclusive-sneak-peek-the-agent-smart-watch-emulator-and-managed-net-code-on-my-wrist, Jun. 18, 2013, pp. 2.

Johns et al., "Adapting Qi-compliant wireless-power solutions to low-power wearable products", Texas Instruments, Analog Applications Journal, 2Q, 2014, pp. 7.

Mmobiel Wireless Charging Station, Posted date Aug. 16, 2023 [Online] [Retrieved Aug. 20, 2024] RetrievedFrom Internet, https://www.amazon.com/MMOBIEL-Wireless-Charging-Station-Compatible/dp/BOCFQQGFBY?th=1.

Samsung Original Wireless Fast Charger Duo Pad, Posted Date May 18, 2019 [Online] [Retrieved Aug. 20, 2024] Retrieved From Internet, https://www.amazon.com .au/Samsung-Original-Wireless-Charger-Enabled/dp/B07PKQ343V?th= 1.

YouTube, "GMYLE(R) Qi Wireless Charger Review (Nexus 5)", https://www.youtube.com/watch?v=EvJ4Jkvj_R8, Nov. 28, 2013, pp. 10.

\* cited by examiner

200

202

210

205

204

207

213

203

200

207

205

215

209

203

211

204

200

202

210

207

205

203

200

202

207

205

203

204

INDUCTION CHARGER

CROSS REFERENCE TO RELATED APPLICATIONS

Any and all applications for which a foreign or domestic priority claim is identified in the Application Data Sheet as filed with the present application are hereby incorporated by reference under 37 CFR 1.57 for all purposes and for all that they contain.

TECHNICAL FIELD

The present disclosure generally relates to devices for induction charging and methods of manufacturing such devices.

BACKGROUND

One method of charging electronic devices is via induction. In induction charging, induction coils conduct an electric current to generate a magnetic field. The magnetic field generated by the induction coils can induce an electric current in a conductive material that is in the presence of the magnetic field. The induced electric current can be used to generate a charge in an electronic device when the electronic device is placed in proximity to the induction coils. Accordingly, an induction coil can be used to charge electronic devices without requiring direct physical contact between the induction coil and corresponding conductive material in the electronic device. Where the induction coil is arranged within a charging device, induction charging allows the charging device to charge a separate electronic device without requiring a cabled connection between the charging device and the separate electronic device.

SUMMARY

The strength of an electric current induced by a magnetic field depends on the strength of the magnetic field. The stronger the magnetic field, the greater the strength of the induced electric current. The rate at which an electronic device is charged via induction depends on the strength of the electric current induced in the electronic device. Accordingly, strengthening the magnetic field increases the rate at which an electronic device is inductively charged. The strength of a magnetic field is inversely proportional to distance from the center of the magnetic field source. Various implementations of chargers disclosed herein include unique external and/or internal structural features that minimize the distance between inductor members (positioned within an interior of the chargers) and a charging region of the chargers, thereby increasing the strength of the magnetic field and charging efficiency for an electronic device that is intended to be inductively charged by the chargers. As described further herein, the disclosed chargers can include a biasing member that biases the inductor member against an interior surface of a housing of the charger at the charging region.

Disclosed herein is a charger for providing energy to an electronic device. The charger can comprise a housing, a substrate, a cable, an inductor member, and a biasing member. The housing can comprise an interior and a charging region, said charging region configured to receive a portion of the electronic device. The substrate can be positioned within the interior of said housing. The cable can be configured to provide energy to the charger, the cable comprising a first end and a second end opposite said first end, said first end electrically connected to said substrate, said second end configured to connect to a power source. The inductor member can be positioned within the interior of said housing and electrically connected to said substrate, said inductor member configured to receive electrical current from said cable and generate a magnetic field responsive to the received electrical current, said magnetic field configured to induce electrical current in said electronic device when said portion of the electronic device is positioned at said charging region of said housing. The biasing member can be arranged within the interior of said housing, said biasing member configured to apply a biasing force to the inductor member such that the inductor member is pressed against a portion of an interior surface of the housing at said charging region of the housing.

In some implementations, said inductor member is annular, and wherein said biasing member applies said biasing force to the inductor member such that an inner edge of the annular inductor member contacts the portion of the interior surface of the housing at said charging region of the housing. In some implementations, said substrate is a printed circuit board. In some implementations, said biasing member comprises a frame and an inductor engagement member that is operably positioned by said frame, and wherein said frame is engaged with one or more portions of the housing and biases said inductor engagement member into engagement with said inductor member such that said inductor member contacts said portion of the interior surface of the housing at said charging region of the housing. In some implementations, said frame comprises a first portion that operably positions said inductor engagement member and a second portion that is engaged with said one or more portions of the housing, and wherein said first and second portions of the frame are different and/or spaced away from one another. In some implementations, said inductor member is annular; said inductor engagement member comprises a first portion and a second portion that is inset from a perimeter of said first portion; and said second portion of said inductor engagement member is positioned within an opening defined by the annular inductor member.

In some implementations, said inductor engagement member further comprises an aperture extending through said first and second portions of the inductor engagement member; said housing further comprises a protrusion extending from the interior surface at said charging region; and said protrusion extends at least partially through said aperture in said inductor engagement member. In some implementations, the charger further comprises a plurality of magnets; said frame further comprises a plurality of magnet retention members; and each of the plurality of magnets are operably positioned by one of said plurality of magnet retention members. In some implementations, said plurality of magnet retention members are arranged in a circular array that extends around said inductor member. In some implementations, each of said plurality of magnet retention members comprises an at least partially cylindrical shape, and wherein each of said plurality of magnets comprises a cylindrical shape.

In some implementations, said frame comprises: a main body positioned around said inductor member; one or more arms connected to said main body, each of said one or more arms engaged with one of said one or more portions of the housing; and one or more fingers connected to said main body, each of said one or more fingers engaged with said inductor engagement member. In some implementations, said main body comprises an annular shape that extends around a perimeter of said inductor member. In some implementations, said housing further comprises one or more retention members arranged on the interior surface of said housing, each of the one or more retention members engaged with one of the one or more arms of said frame. In some implementations, each of said one or more retention members comprises one or more teeth; and each of said one or more arms of said frame comprises one or more teeth. In some implementations, each of the one or more teeth of each of the one or more retention members are beveled or chamfered. In some implementations, each of said one or more arms of said frame comprises a plurality of teeth.

In some implementations, each of said one or more retention members comprises a plurality of teeth. In some implementations, said housing comprises a plurality of retention members spaced apart from one another. In some implementations, each of said first and second portions of the inductor engagement member comprises a circular shape. In some implementations, the electronic device comprises a smartwatch. In some implementations, said biasing member is further configured to apply the biasing force to the inductor member to inhibit the inductor member from moving away from said charging region of the housing.

Disclosed herein is a charger for providing energy to an electronic device. The charger can comprise a housing comprising an interior and a charging region, said charging region configured to receive a portion of the electronic device; a substrate positioned within the interior of said housing; an inductor member positioned within the interior of said housing and electrically connected to said substrate, said inductor member to generate a magnetic field responsive to receiving electrical current, said magnetic field configured to induce electrical current in said electronic device when said portion of the electronic device is positioned at said charging region of said housing; and a biasing member arranged within the interior of said housing, said biasing member configured to apply a biasing force to the inductor member such that the inductor member is pressed against a portion of an interior surface of the housing at said charging region of the housing.

In some implementations, the charger can comprise a cable configured to provide energy to the charger, the cable comprising a first end and a second end opposite said first end, said first end electrically connected to said substrate, said second end configured to connect to a power source. In some implementations, an assembly can comprise the charger and said electronic device, wherein said electronic device is a smartwatch.

In some implementations, said inductor member is annular, and wherein said biasing member applies said biasing force to the inductor member such that an inner edge of the annular inductor member contacts the portion of the interior surface of the housing at said charging region of the housing. In some implementations, said biasing member comprises a frame and an inductor engagement member that is operably positioned by said frame, and wherein said frame is engaged with one or more portions of the housing and biases said inductor engagement member into engagement with said inductor member such that said inductor member contacts said portion of the interior surface of the housing at said charging region of the housing.

Disclosed herein is a method of manufacturing an induction charger. The method can comprise: obtaining a housing comprising an interior surface, an exterior surface, and a charging region configured to receive a portion of the electronic device; obtaining an inductor member configured to receive electrical current and generate a magnetic field responsive to the received electrical current; and biasing the inductor member against a portion of the interior surface of the housing at said charging region with a biasing member.

In some implementations, the induction charger is configured to rest upon a support surface; said housing comprises a top shell and a bottom shell, said bottom shell configured to be positioned closer to said support surface than said top shell when said induction charger rests upon said support surface; said charging region is located on a portion of said top shell; the method further comprises securing the top shell to the bottom shell; and said step of biasing the inductor member against the portion of the interior surface of the housing at said charging region with said biasing member occurs prior to said step of securing the top shell to the bottom shell.

In some implementations, said inductor member comprises an annular shape; and said step of biasing the inductor member against the portion of the interior surface of the housing at said charging region with the biasing member comprises biasing the inductor member such that an inner edge of the annular inductor member contacts the portion of the interior surface of the housing at said charging region of the housing.

In some implementations, said biasing member comprises a frame and an inductor engagement member; and the method further comprises: positioning the inductor engagement member adjacent said inductor member positioning the frame adjacent said inductor engagement member; engaging the frame with one or more portions of the housing in a first position; said step of biasing the inductor member against the portion of the interior surface of the housing at said charging region comprises transitioning the frame from said first position to a second position; and wherein: said inductor member does not contact the portion of the interior surface when the frame is in said first position; and said inductor member contacts the portion of the interior surface when the frame is in said second position.

In some implementations, the first position is a first rotational position of the frame and the second position is a second rotational position of the frame; and said transitioning the frame from said first position to the second position comprising rotating the frame from the first rotational position to the second rotational position.

In some implementations, said transitioning the frame from said first position to the second position comprises rotating the frame about an axis extending through a center of the frame; and said rotating the frame about said axis causes the inductor member to move along said axis. In some implementations, the method further comprises inhibiting the frame from transitioning from said second position to said first position.

In some implementations, said frame comprises a main body, one or more arms connected to said main body, and one or more fingers connected to said main body; and the method further comprises: positioning said main body around said inductor member; engaging said one or more arms with one or more portions of the housing; and engaging said one or more fingers with said inductor engagement member.

In some implementations, said housing further comprises one or more retention members arranged on the interior surface of said housing; and said engaging the frame with one or more portions of the housing in said first position comprises: engaging each of said one or more retention members with a first portion of one of the one or more arms of said frame; and said transitioning the frame from said first position to said second position comprises: engaging each of said one or more retention members with a second portion of said one of the one or more arms of said frame. In some implementations, said engagement between said one or more arms and said one or more portions of the housing form a ratchet mechanism.

In some implementations, said one or more arms comprises a first arm and a second arm, each of the first and second arms comprising a plurality of teeth; said one or more retention members comprises a first retention member and a second retention member; said engaging the frame with one or more portions of the housing in said first position comprises: engaging a first one of the plurality of teeth of the first arm with the first retention member; and engaging a first one of the plurality of teeth of the second arm with the second retention member; and said transitioning the frame from said first position to said second position comprises: engaging a second one of the plurality of teeth of the first arm with the first retention member; and engaging a second one of the plurality of teeth of the second arm with the second retention member. In some implementations, the method further comprises inhibiting the frame from transitioning from the second position to the first position. In some implementations, said inductor member is annular; said inductor engagement member comprises a first portion and a second portion that is inset from a perimeter of said first portion; and the method further comprises: positioning said second portion of said inductor engagement member within an opening defined by the annular inductor member.

In some implementations, said inductor engagement member further comprises an aperture extending through said first and second portions of the inductor engagement member; said housing further comprises a protrusion extending from the interior surface at said charging region; and the method further comprises positioning said protrusion at least partially within said aperture in said inductor engagement member to at least partially align said inductor engagement member with said charging region. In some implementations, securing the inductor member to the inductor engagement member to inhibit relative movement between the inductor member and the inductor engagement member; and securing the inductor engagement member to the frame to inhibit relative movement between the inductor engagement member and the frame. In some implementations, said securing the inductor member to the inductor engagement member comprises adhering the inductor member to the inductor engagement member. In some implementations, said inductor member comprises a coiled conductor wire, and wherein said biasing the inductor member against the portion of the interior surface of the housing at said charging region comprises biasing the inductor member such that at least a portion of the coiled conductor wire deforms. In some implementations, said inductor member comprises a casing enclosing said coiled conductor wire.

BRIEF DESCRIPTION OF THE DRAWINGS

Various implementations will be described hereinafter with reference to the accompanying drawings. These implementations are illustrated and described by example only, and are not intended to limit the scope of the disclosure. In the drawings, similar elements may have similar reference numerals.

FIGS. 1O-1P are top and bottom perspective exploded views of a bottom portion of the housing of the charger in accordance with aspects of this disclosure.

FIG. 1AA is another bottom view of the interior of the charger in which an inductor assembly of the charger is in a first position in accordance with aspects of this disclosure.

FIGS. 1BB-1CC are bottom perspective views of the interior of the charger illustrated in FIG. 1AA in accordance with aspects of this disclosure.

FIG. 1DD is an enlarged cross section view of a portion of the charger in accordance with aspects of this disclosure.

FIGS. 1EE-1FF illustrate enlarged perspective views of portions of the housing of the charger in accordance with aspects of this disclosure.

DETAILED DESCRIPTION

The present disclosure will now be described with reference to the accompanying figures, wherein like numerals refer to like elements throughout. The following description is merely illustrative in nature and is in no way intended to limit the disclosure, its application, or uses. It should be understood that steps within a method may be executed in different order without altering the principles of the present disclosure. Furthermore, the devices, systems, and/or methods disclosed herein can include several novel features, no single one of which is solely responsible for its desirable attributes or which is essential to practicing the devices, systems, and/or methods disclosed herein.

Figure 1A:
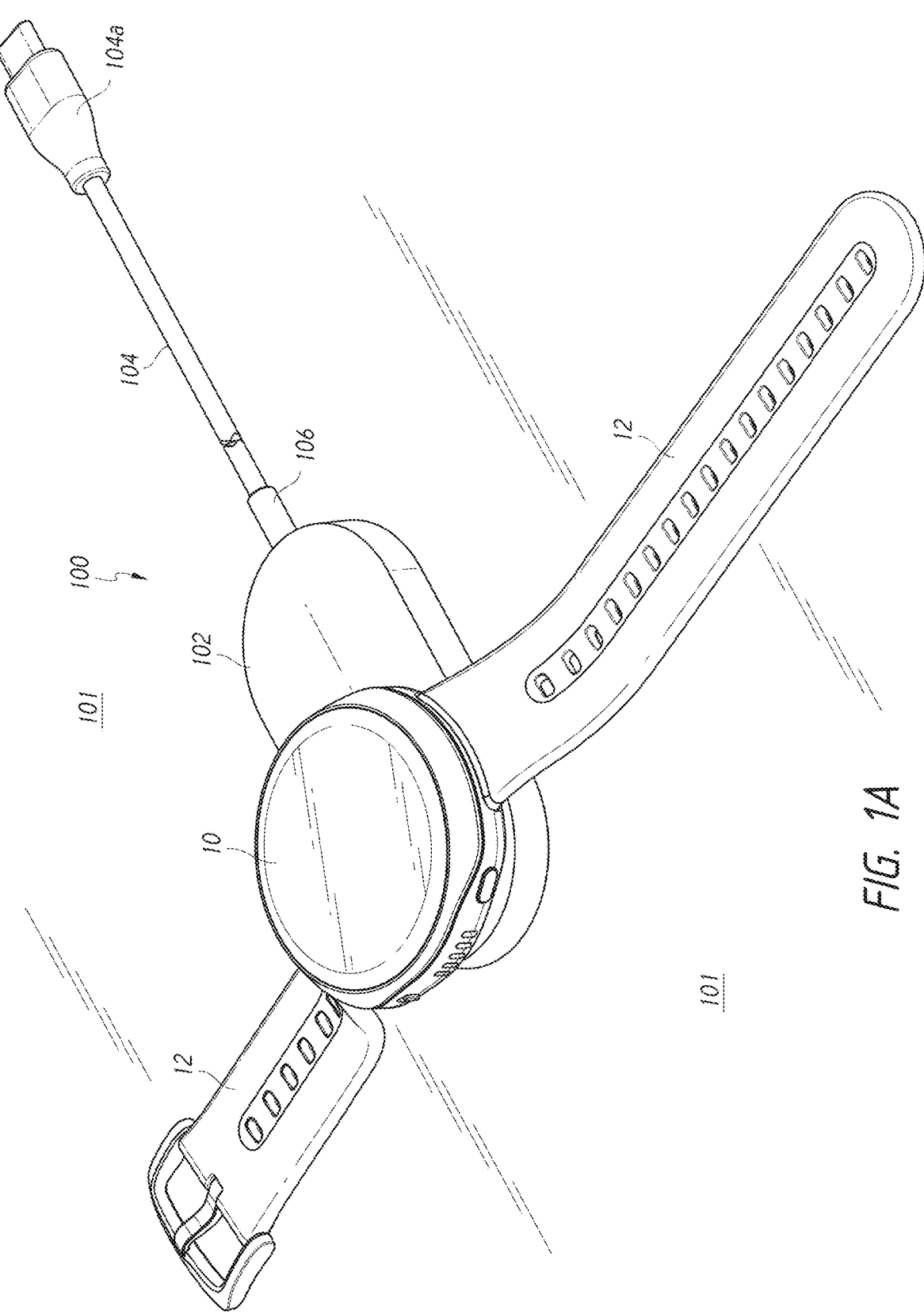
FIGS. 1A-1B are perspective views of an example induction charger and electronic device in accordance with aspects of this disclosure.
Figure 1B:
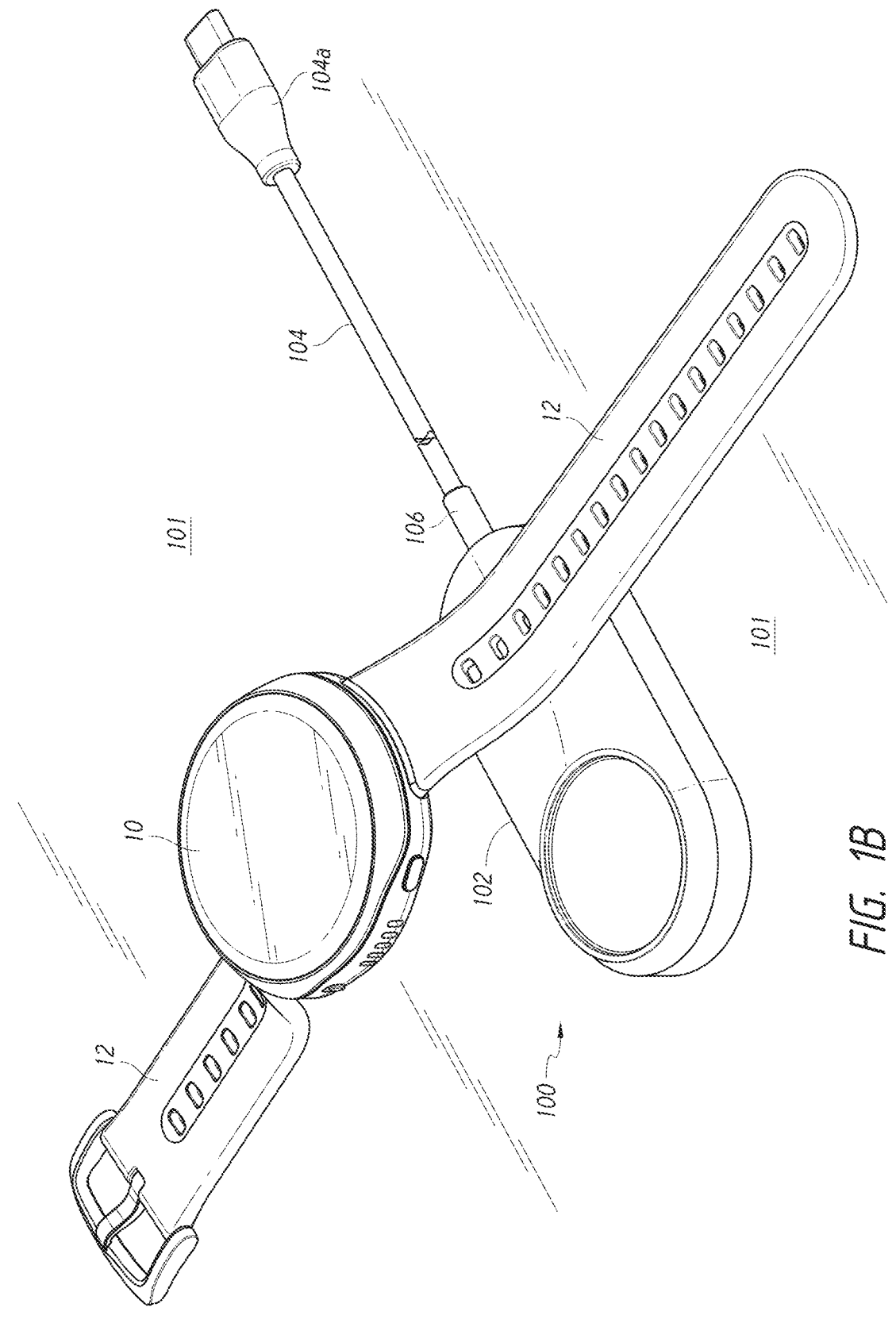

FIG. 1A illustrates a perspective view of an example induction charger 100 (also referred to herein as a "charger"). The charger 100 can provide energy to an electronic device 10 to charge the electronic device 10 (for example, to charge a battery of the electronic device 10) via induction. The charger 100 can be configured to generate a magnetic field that can induce an electromotive force, such as an electrical current, in one or more electrical components of the electronic device 10 which provide energy to the electronic device 10 to power the electronic device 10 (which, can, for example, be stored in the electronic device 10). FIG. 1A illustrates the electronic device 10 positioned atop a portion of the charger 100, whereas FIG. 1B illustrates the electronic device 10 spaced from and positioned above charger 100. The charger 100 and/or electronic device 10 can be configured in a variety of ways to facilitate interaction between the two devices. Such interaction can allow the charger 100 to charge the electronic device 10 (for example, a battery of the electronic device 10). When the electronic device 10 is positioned away from the charger 100 (for example, as shown in FIG. 1B), the electronic device 10 may be unable to receive charge via charger 100. Generally speaking, the smaller the distance between the charger 100 (namely, an inductor coil/member of the charger 100) and electronic device 10, the greater the strength of the magnetic field and the rate at which electronic device 10 can be charged. As will be described in more detail below, the charger 100 can include various structure and features that operably position an inductor member of the charger 100 as close as possible to an electronic device (when electronic device is placed in proximity to charger 100) while the inductor member is enclosed within an interior of a housing of charger 100. Such configurations thereby significantly improve the induction charging capabilities of charger 100.

The electronic device 10 can be, for example, a smartwatch configured to: measure and/or monitor one or more physiological parameters of a subject; display physiological data indicative of such parameters and/or display other information (for example, time, date, location, motion, and/or other information); and/or communicate (for example, wirelessly communicate) with one or more separate devices (such as a mobile phone); among other things. The electronic device 10 can include and/or be configured to removably connect to one or more straps 12. The straps 12 can secure the electronic device 10 to a user. The electronic device 10 and strap(s) 12 can together form a "wearable device". The electronic device 10 shown and/or described herein is provided as non-limiting example of an electronic device that can interact with (for example, be charged by) charger 100. In some implementations, the charger 100 can provide energy to charge other devices, such as other electronic devices that consume electrical energy. For example, the charger 100 can provide energy, such as via induction, to charge a cellular device, a phone, an auricular device such as a headphone, earbud, earphone or the like, a computing device, a laptop, a sensor, a physiological sensor, a monitoring hub, etc. The charger 100 can be configured to interact with and/or charge any of the example wearable devices shown and/or described in U.S. Patent Publication No. 2023/0028745A1, U.S. Patent Publication No. 2021/0290120A1, and/or U.S. patent application Ser. No. 18/529,409 each of which are hereby incorporated by reference in their entireties for all purposes.

FIGS. 1C-1K illustrate various views of the charger 100. The charger 100 can include a housing 102 and a cable 104. In some implementations, the housing 102 and cable 104 are permanently secured to one another. In some variants, the housing 102 and cable 104 are configured to be removably coupled to one another. For example, charger 100 can have a rechargeable battery that can receive power/charge from cable 104 when cable 104 is connected, and then can provide energy to inductor member 148 regardless of whether the cable 104 is connected to the charger 100. In some implementations, the cable 104 includes a bend relief 106. The cable 104 can include a connector 104a configured to physically and electrically couple to a power source. Such power source can be an electronic device that stores energy, such as a computer, a laptop, a vehicle, a battery pack, etc. The power source can be a utility grid connectable to the connector 104a via a standard outlet such as a 110V or 220V outlet. The connector 104a can include a USB connector. In some implementations, the connector 104a can include a standard 110V or 220V plug. The cable 104 can include one or more electrical conductors, such as wires. The cable 104 can conduct energy via the connector 104a to and/or through the housing 102 (for example, to circuit board 111 of charger 100). The cable 104 can be coupled to the housing 102 via the bend relief 106. The bend relief 106 can be formed of a material that is more rigid than the cable 104. The bend relief 106 can resist deformation such as torsion, bending, compression, expansion, etc. Accordingly, the bend relief 106 can improve connection between the cable 104 and the housing 102.

Figures 1C, 1D, 1E:
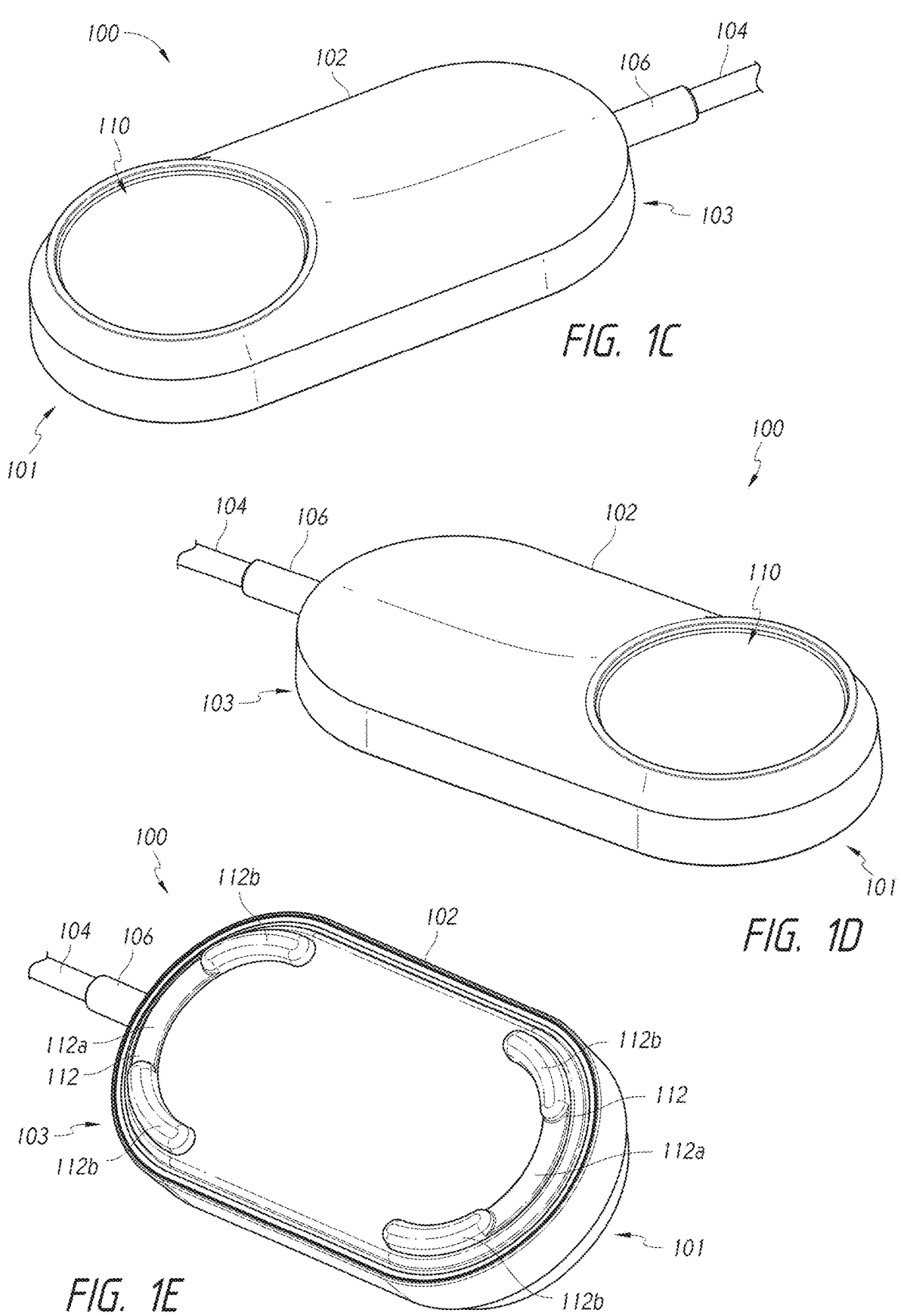
FIGS. 1C-1D are top perspective views of the charger in accordance with aspects of this disclosure.
FIG. 1E is a bottom perspective view of the charger in accordance with aspects of this disclosure.

FIGS. 1C-1D illustrate top perspective views of the charger 100, while FIG. 1E illustrates a bottom perspective view of charger 100. The charger 100 can include a first end 101 and a second end 103 opposite the first end 101. In some implementations, the cable 104 is coupled to the housing 102 (such as via the bend relief 106) at the second end 103. The housing 102 can include a charging region 110 configured to interact with (for example, receive, operably position, and/or connect to) an electronic device (such as electronic device 10) or a portion thereof. In some implementations, the charging region 110 is disposed proximate to the first end 101. In some implementations, the charging region 110 is located closer to the first end 101 than to the second end 103. The charging region 110 can be formed of a material that is configured to allow a magnetic field to pass therethrough. The charging region 110 can be formed from the same material as a remainder of the housing 102, or alternatively, formed from a different material than the remainder of the housing 102. The charging region 110 can be circular-shaped, for example. The charging region 110 can be rounded. The charging region 110 can be curved. The charging region 110 can comprise a dome-shape. In some variants, the charging region 110 is flat or planar. In some implementations, charging region 110 is arranged on a top portion of housing 102 that faces opposite a surface upon which charger 100 rests when in use.

The charger 100 can include one or more supports configured to contact a support surface 101 (for example, a desk, table, or other surface). For example, with reference to FIG. 1E, the charger 100 can include supports 112. The supports 112 can be disposed at a bottom portion and/or surface of the housing 102. The supports 112 can be disposed at or proximate opposite ends of the housing 102 from each other. For example, one support 112 can be disposed on a portion of housing 102 proximate the second end 103 of charger 100 and another support 112 can be disposed proximate the first end 101 of charger 100. In some implementations, the supports 112 have a semi-annular shape. In some implementations, the charger 100 includes more than two supports 112. Supports 112 can be connected to plate 136 and/or bottom shell 102b as discussed in more detail below with respect to FIGS. 1O-1P.

Figure 1F:
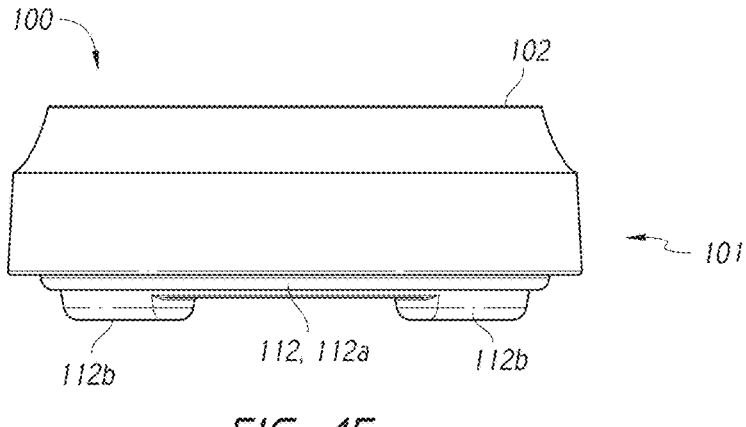
FIG. 1F is a front view of the charger in accordance with aspects of this disclosure.
Figure 1G:
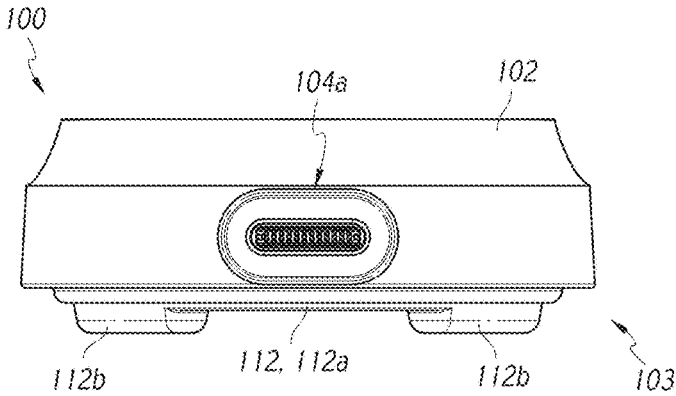
FIG. 1G is a rear view of the charger in accordance with aspects of this disclosure.

FIGS. 1F-1G illustrate front and rear views (respectively) of the charger 100. In some variants, the charger 100 is configured to removably connect to cable 104. The charger 100 can include a connector port that is configured to removably connect to the cable 104 (for example, an end of cable), such as via connection to the bend relief 106. In such variants, connector port and cable 104 can be configured to mechanically and electrically connect to one another.

Figure 1H:
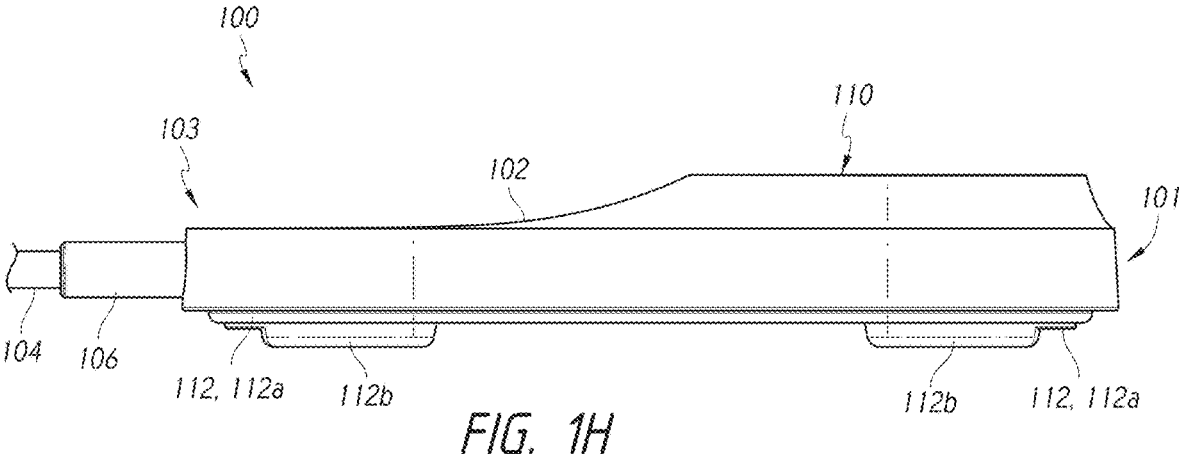
FIGS. 1H-1I are side views of the charger in accordance with aspects of this disclosure.
Figure 1I:
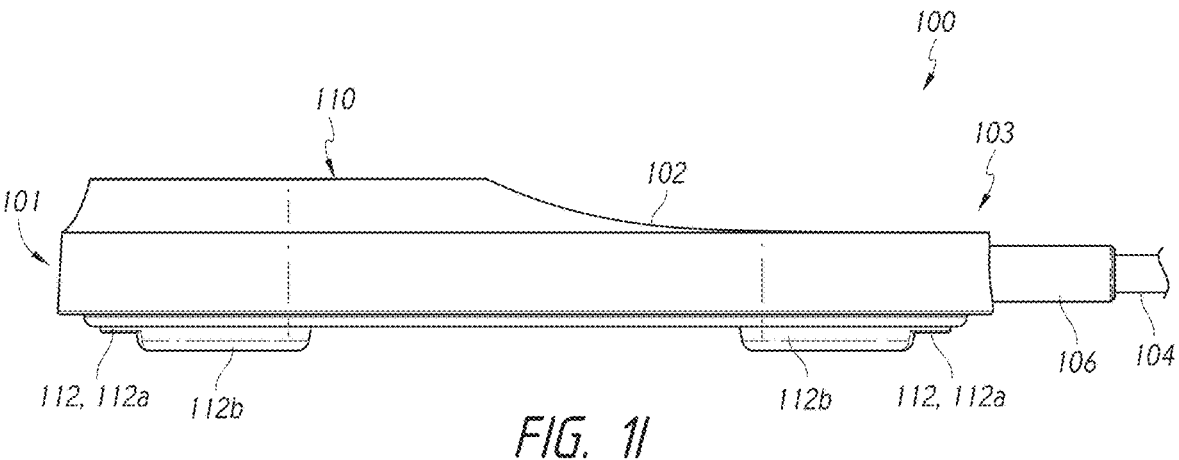
Figure 1J:
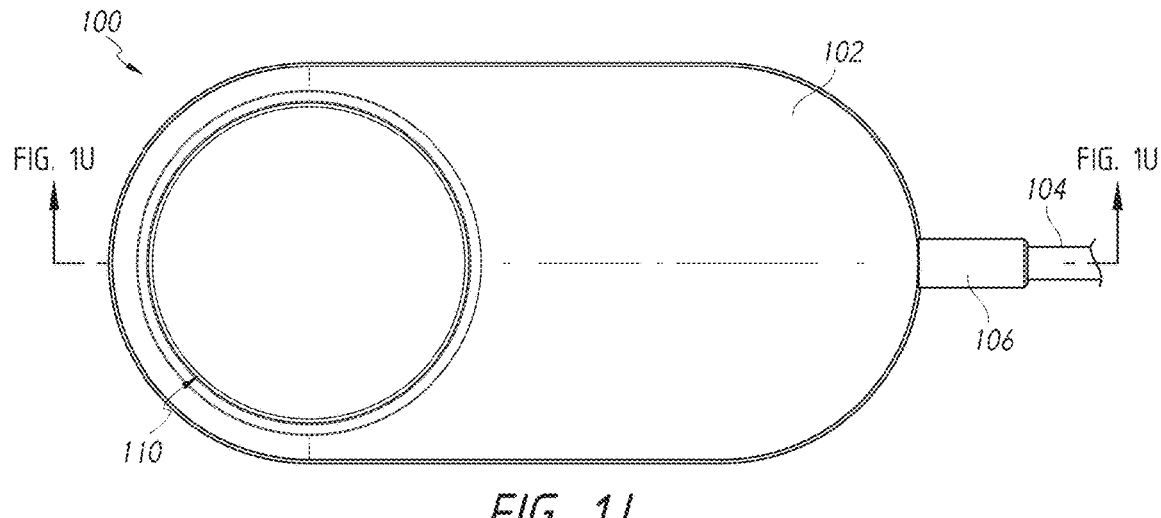
FIG. 1J is a top view of the charger in accordance with aspects of this disclosure.
Figure 1K:
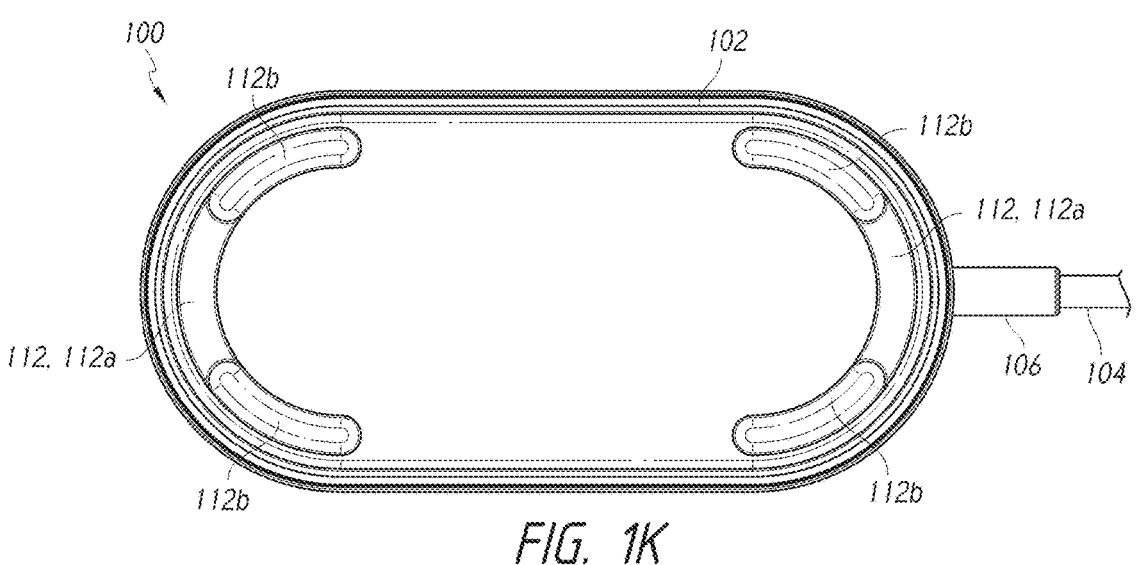
FIG. 1K is a bottom view of the charger in accordance with aspects of this disclosure.

FIGS. 1H-1I illustrate side views of the charger 100. FIG. 1J is a top view of the housing 102 of the charger 100. FIG. 1K is a bottom view of the housing 102 of the charger 100.

Figure 1L:
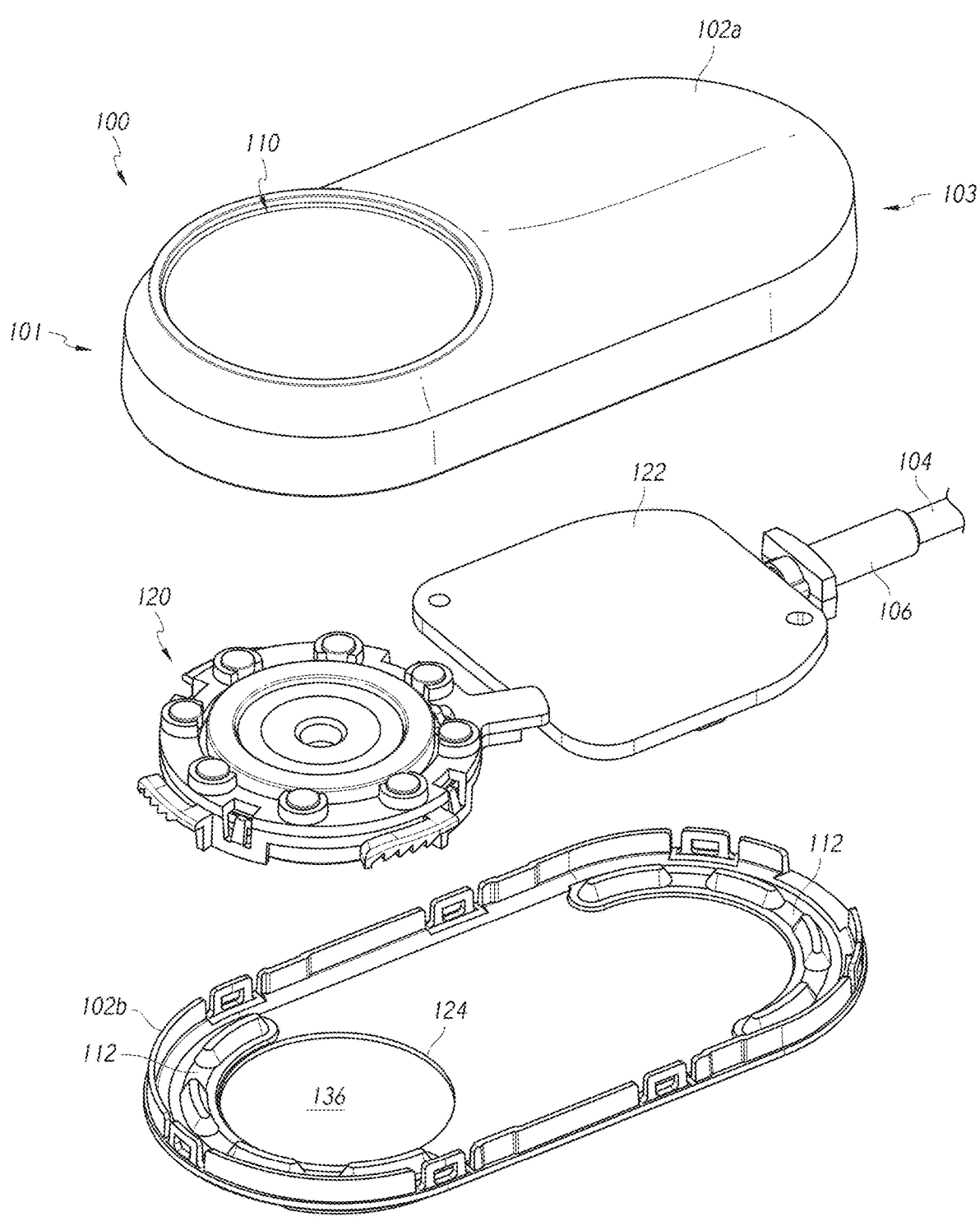
FIG. 1L is an exploded, top perspective view of the charger in accordance with aspects of this disclosure.

FIG. 1L illustrates a partially exploded top perspective view of the charger 100. The housing 102 can include a top shell 102a and a bottom shell 102b. FIG. 1L illustrates the top and bottom shells 102a, 102b separated from one another. The top shell 102a can be physically coupled to the bottom shell 102b when charger 100 is in an assembled state so as to form an interior of the housing 102. The charger 100 can include one or more inductor members for facilitating induction charging of an electronic device (such as electronic device 10 shown in and described with respect to FIGS. 1A-1B). Inductor member 148 can comprise one or more wires (for example, a coiled wire having one or more turns) comprising an electrically conductive material (for example, a metallic material such as copper) configured to conduct an electrical current. In some implementations, such inductor member(s) can be implemented as part of an inductor assembly with one or more other components. For example, in some implementations, the charger 100 includes an inductor assembly 120 shown in FIG. 1L, which includes inductor member 148 described further below. As shown in FIG. 1L, the charger 100 can include inductor assembly 120 and a circuit board 122. The circuit board 122 can be electrically coupled to the cable 104. The inductor assembly 120 can be electrically coupled to the circuit board 122. The inductor assembly 120 can receive electrical current from the cable 104 via the circuit board 122. The inductor assembly 120 can be configured to conduct electrical current and generate a magnetic field, for example, via inductor member 148. In some implementations, the charger 100 includes a processor, for example, embodied in a chip that is mounted to circuit board 122. Such processor can be configured to control any of a variety of operations of the charger 100. For example, such processor can be configured to control an amount of current received from cable 140, conducted to inductor member 148 (e.g., from the cable 140 via the circuit board 122), and/or conducted through the inductor member 148.

The inductor assembly 120 and/or circuit board 122 can be arranged within an interior of the housing 102 (for example, an interior at least partly formed by shells 102a, 102b). The inductor assembly 120 can be disposed within a portion of the interior of the housing 102 between the top shell 102a and the bottom shell 102b. In some implementations, the inductor assembly 120 is disposed within the interior of the housing 102 and is positioned closer to first end 101 than to second end 103. The inductor assembly 120 can be arranged within the interior of the housing 102 adjacent to the charging region 110, which can allow. the inductor assembly 120 (via inductor member 148) to direct a magnetic field through the charging region 110. The inductor assembly 120, or portions thereof (such as inductor member 148) can be operably positioned within the interior of the housing 102 so as to physically contact the charging region 110, for example, a portion of an interior surface of housing 102 at the charging region 110. The circuit board 122 can be disposed within a portion of the interior of the housing 102 between the top shell 102a and the bottom shell 102b. In some implementations, the circuit board 122 is disposed within the interior of the housing 102 and is positioned closer to second end 103 than to first end 101.

As shown in FIG. 1L, the inductor assembly 120 can be arranged adjacent to the circuit board 122 within the interior of the housing 102. In some implementations, the inductor assembly 120 (or portions thereof) are spaced apart from the circuit board 122 within the interior of the housing 102. The inductor assembly 120 can generate heat, such as when conducting an electrical current and/or when generating a magnetic field. The circuit board 122 can generate heat when transmitting electrical energy from the cable 104 to the inductor assembly 120. The inductor assembly 120 and circuit board 122 can be arranged within the housing 102 so as to facilitate heat dissipation and prevent or inhibit internal temperature (within housing 102) from exceeding thresholds of one or more components of the charger 100. For example, the inductor assembly 120 and circuit board 122 are spaced from one another, such as shown in the figures, so as to minimize heat transfer between the inductor assembly 120 and the circuit board 122. In some implementations, the inductor assembly 120 and circuit board 122 are oriented about a similar horizontal plane, which can also act to minimize heat transfer therebetween (for example, compared to an arrangement where the inductor assembly 120 and circuit board 122 are vertically stacked and/or aligned with one another). Such configurations can also facilitate dissipation of heat generated by the inductor assembly 120 and/or circuit board 122 out of the interior of housing 102, which in turn can improve performance of the charger 100 (such as by improving the electrical performance of the inductor assembly 120 and/or the circuit board 122). Heat dissipation and/or reduction can also improve a user experience such as by preventing a user from contacting an undesirably hot surface of the charger 100. The charger 100 can include other features that facilitate heat dissipation. For example, with reference to FIGS. 1O-1P, the housing 102 includes a bottom shell 102b including an opening 124 which allows heat to flow therethrough. The opening 124 can be adjacent to the inductor assembly 120 (for example, underneath the inductor assembly 120) and can advantageously facilitate dissipation of heat from the inductor assembly 120 to outside the interior of the housing 102. In some implementations, charger 100 includes a plate 136 (described further below) which can cover opening 124. Plate 136 can be configured to receive heat flowing out through opening 124 of shell 102b and can transmit such heat outside the interior of the housing 102. In some implementations, opening 124 is circular. The opening 124 can be sized and/or shaped to correspond to a size and/or shape of the inductor assembly 120 (or a portion thereof). The opening 124 can be disposed in a portion of the bottom shell 102b proximate the first end 101 of the charger 100/housing 102. The housing 102, including top shell 102a and/or bottom shell 102b, or portions thereof, can be formed of a synthetic material such as plastic or polymer. The housing 102 can be formed of a rigid material. Plate 136 can comprise a thermally conductive material, for example, a material that is more thermally conductive than a material from which shells 102a, 102b are made, which can further improve heat dissipation. In some implementations, plate 136 comprises a metallic material.

Figure 1M:
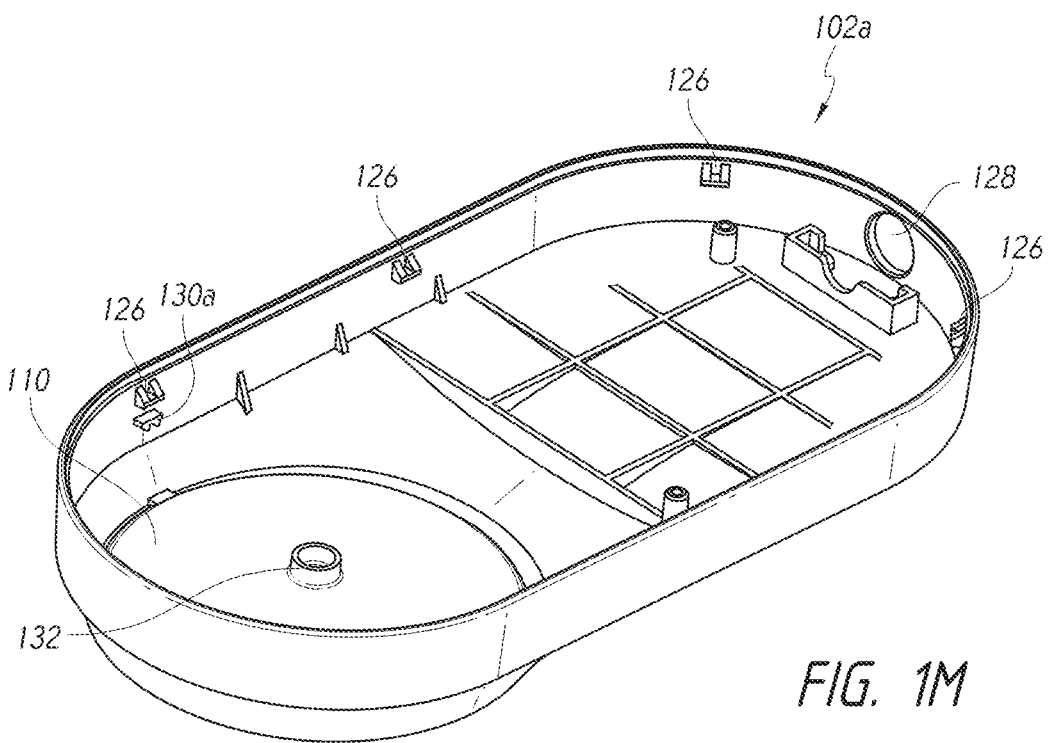
FIGS. 1M-1N are perspective views of a top shell of a housing of the charger in accordance with aspects of this disclosure.
Figure 1N:
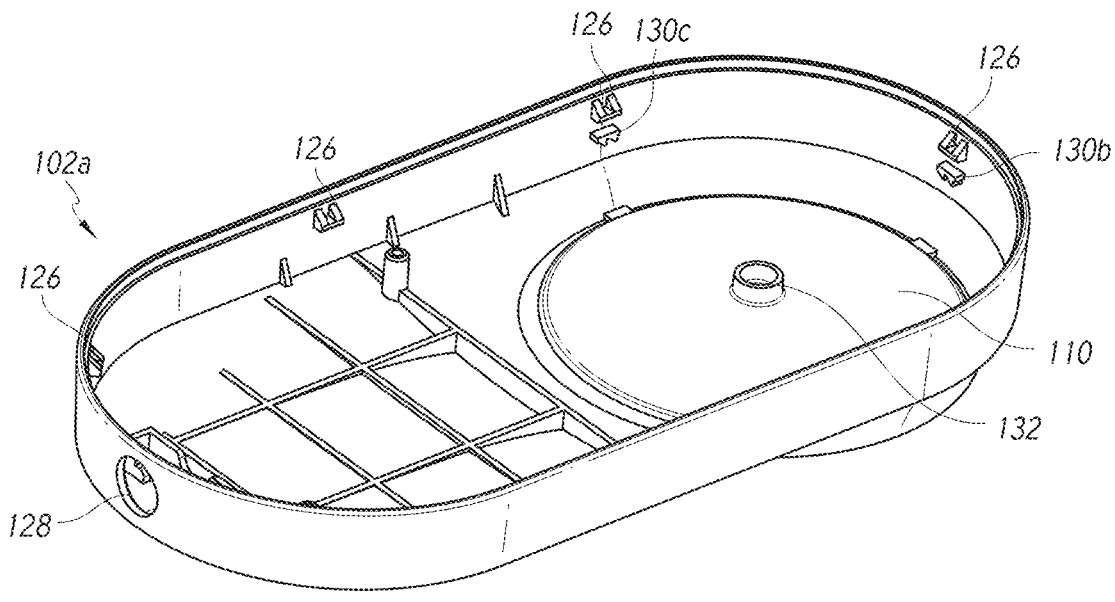
Figure 10:
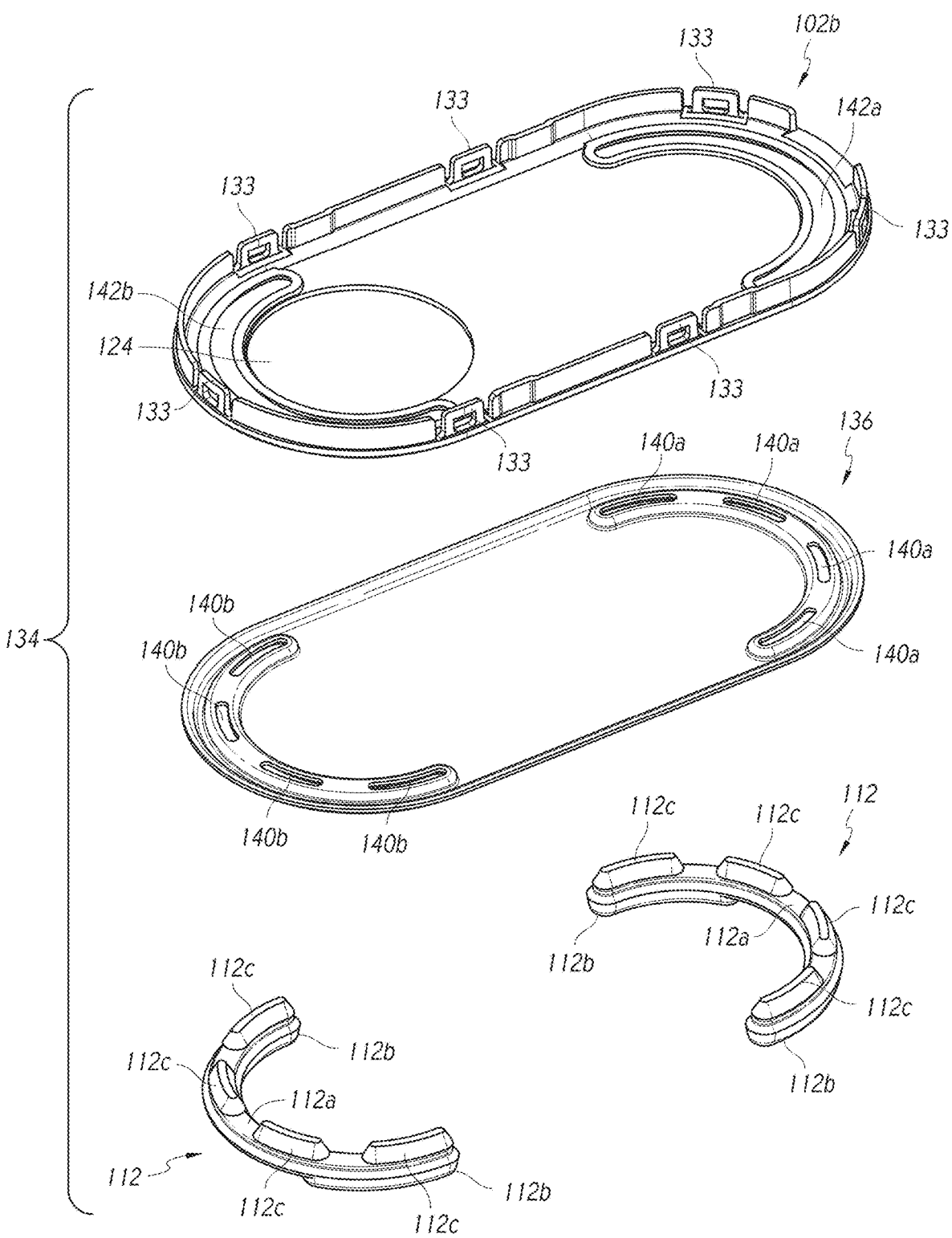

FIGS. 1M-1N illustrate bottom perspective views of the top shell 102a. The top shell 102a can include a hole 128 configured receive the cable 104 and/or bend relief 106. In some implementations, top shell 102a includes a protrusion 132 extending outward from a portion of the charging region 110. The protrusion 132 can be configured to operably position inductor assembly 120. The protrusion 132 can be configured to fit within an aperture 151 of engagement member 150 of the inductor assembly 120 (see FIG. 1R). Positioning of the protrusion 132 within such aperture 151 of the inductor assembly 120 can prevent or inhibit the inductor assembly 120 (or portions thereof) from moving relative to the top shell 102a and/or housing 102. This can in turn maintain alignment between the inductor assembly 120 and the charging region 110.

The top shell 102a can include one or more connectors 126 (see FIGS. 1M-1N) configured to engage corresponding connectors 133 on bottom shell 102b (see FIG. 1O). Engagement between connectors 126 and connectors 133 can facilitate securement of shells 102a, 102b to one another. Connectors 126 can be arranged along an interior surface of top shell 102a and/or housing 102. The top shell 102a can include one, two, three, four, five, six, seven, or more than seven one or more connectors 126, and the bottom shell 102b can include a corresponding number of connectors 133. In some implementations, connectors 133 are arranged along a perimeter of shell 102b. In some implementations, connectors 133 comprise an opening (see FIG. 1O) configured to receive all or a portion of connectors 126.

With continued reference to FIGS. 1M-1N, the top shell 102a can include one or more retention members 130a, 130b, 130c configured to engage portions of inductor assembly 120. The retention member(s) 130a, 130b, 130c can be arranged on an interior surface of shell 102a and/or housing

102, for example, around a perimeter of the charging region 110 or a portion of such perimeter. The retention member(s) 130a, 130b, 130c can be fixedly coupled to the top shell 102a. In some implementations, the retention member(s) 130a, 130b, 130c are not movable relative to the top shell 102a and/or housing 102. The retention member(s) 130a, 130b, 130c can contact and/or engage the inductor assembly 120. The retention member(s) 130a, 130b, 130c can apply a force to the inductor assembly 120. The retention member(s) 130a, 130b, 130c can advantageously be configured to keep the inductor assembly 120 adjacent to the charging region 110, as described in more detail below. The retention member(s) 130a, 130b, 130c can be configured to cause the inductor assembly 120 (for example, inductor member 148) to contact the charging region 110 (for example, an interior surface of the housing 102 at the charging region 110). The retention member(s) 130a, 130b, 130c can help bias the inductor assembly 120 against the charging region 110 (for example, an interior surface of the housing 102 at the charging region 110) and/or cause the inductor assembly 120 to apply a force to the charging region 110. Although the figures illustrate three retention members (130a, 130b, 130c), the top shell 102a can include an alternative number of retention members, such as one, two, or four or more retention members. One or more of the retention member(s) 130a, 130b, 130c can be arranged on portions of the top shell 102a opposite one another with respect to the charging region 110. For example, retention member 130a can be arranged opposite retention member 130a. In some implementations, retention member 130b is arranged to be equidistant between retention members 130a, 130c along an interior surface of housing 102 (shell 102a). Retention members 130a, 130b, 130c can be configured to engage arms 160 of frame 143 as described in more detail below. The retention members 130a, 130b, and 130c can have teeth 131 (see FIGS. 1EE-1FF). The teeth 131 can be sized and/or shaped to correspond to and/or engage with teeth 166 of the arms 160, which are further described below.

Figure 1P:
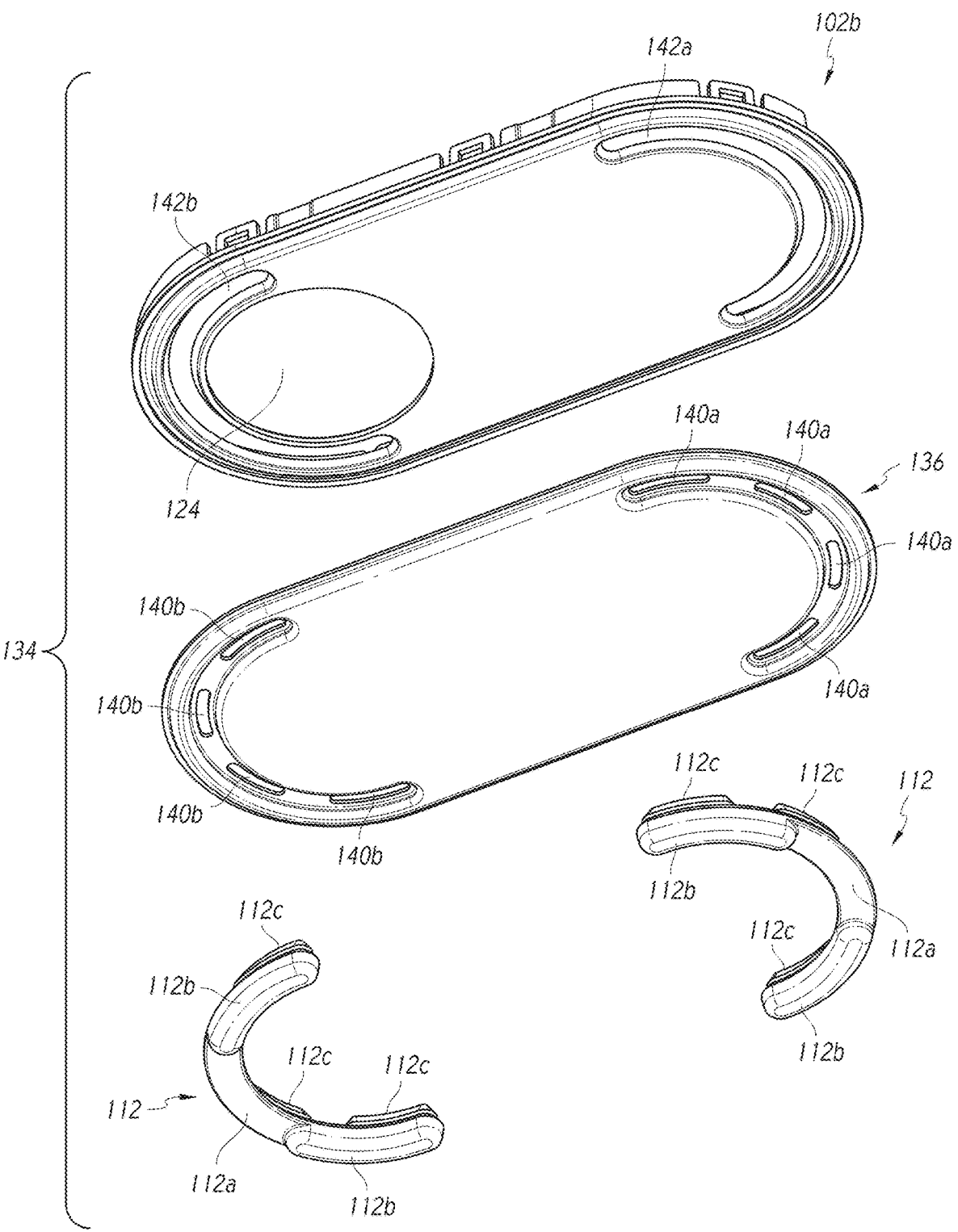

FIGS. 1O-1P are exploded perspective views of the bottom shell 102b, along with a plate 136, and supports 112, 112 in an unassembled state. In some implementations, bottom shell 102b, along with a plate 136, and supports 112, 112 form an assembly 134 that is configured to be connected to the top shell 102a. As previously mentioned, charger 100 can include one or both supports 112. Supports 112 can include a main body 112a, one or more pads 112b, and one or more plugs 112c. Pad(s) 112b and plug(s) 112c can extend from main body 112a in an opposite direction. Pad(s) 112b can be configured to contact a support surface 101 upon which charger 100 rests. In some implementations, main body 112a, pad(s) 112b, and plug(s) 112c are integral with one another and/or made of the same material. Although the figures illustrate three plugs 112c for each support 112, supports 112 can include an alternative number of plugs 112c (for example, one, two, or more than three plugs). Additionally, although the figures illustrate two pads 112b for each support 112, supports 112 can include an alternative number of pads 112b (for example, one or three or more pads). With reference to FIG. 1P, in implementations which include two pads 112b (as shown) pads 112b can be spaced from one another along main body 112a.

The bottom shell 102b can include opening 142a and/or opening 142b for receiving and connecting to supports 112 (and plate, via supports 112). The plate 136 can include one or more openings 140a and openings 140b which can be configured to allow plugs 112c of supports 112 to pass therethrough. Plugs 112c can be configured to be positioned through (for example, forcibly) openings 140*a*, 140*b* and openings 142*a*, 142*b* to secure supports 112, plate 136, and shell 102*b* together. In some implementations, plugs 112*c* are tapered at free ends thereof. Plugs 112*c* can be sized and/or shaped to remain engaged within and/or through openings 140*a*, 140*b* and openings 142*a*, 142*b*. Plugs 112*c* can comprise a different material than a material from which the plate 136 and/or the shell 102*b* is made. In some implementations, openings 140*a* are spaced from one another and/or are arranged in a semi-circular manner. In some implementations, openings 140*b* are spaced from one another and/or are arranged in a semi-circular manner. In some implementations, openings 142*a*, 142*b* comprise semi-circular shape.

The bottom shell 102*b* can be formed of a rigid material. The bottom shell 102*b* can be formed of a synthetic material, such as plastic or polymer. The bottom shell 102*b* can be formed of a thermally non-conductive material. In some implementations, the bottom shell 102*b* is less thermally conductive than the plate 136. The plate 136 can be formed of a rigid material. The plate 136 can be formed of a metal, such as aluminum. The plate 136 can be configured to conduct thermal energy. As mentioned previously, shell 102*b* can include an opening 124. Opening 124 can be positioned proximate inductor assembly 120 when charger 100 is in an assembled state. Heat generated by inductor assembly 120 can pass through opening 124 and to plate 136, and plate 136 can advantageously transmit such heat outside the interior of the housing 102 to ambient.

Figures 1Q, 1R:
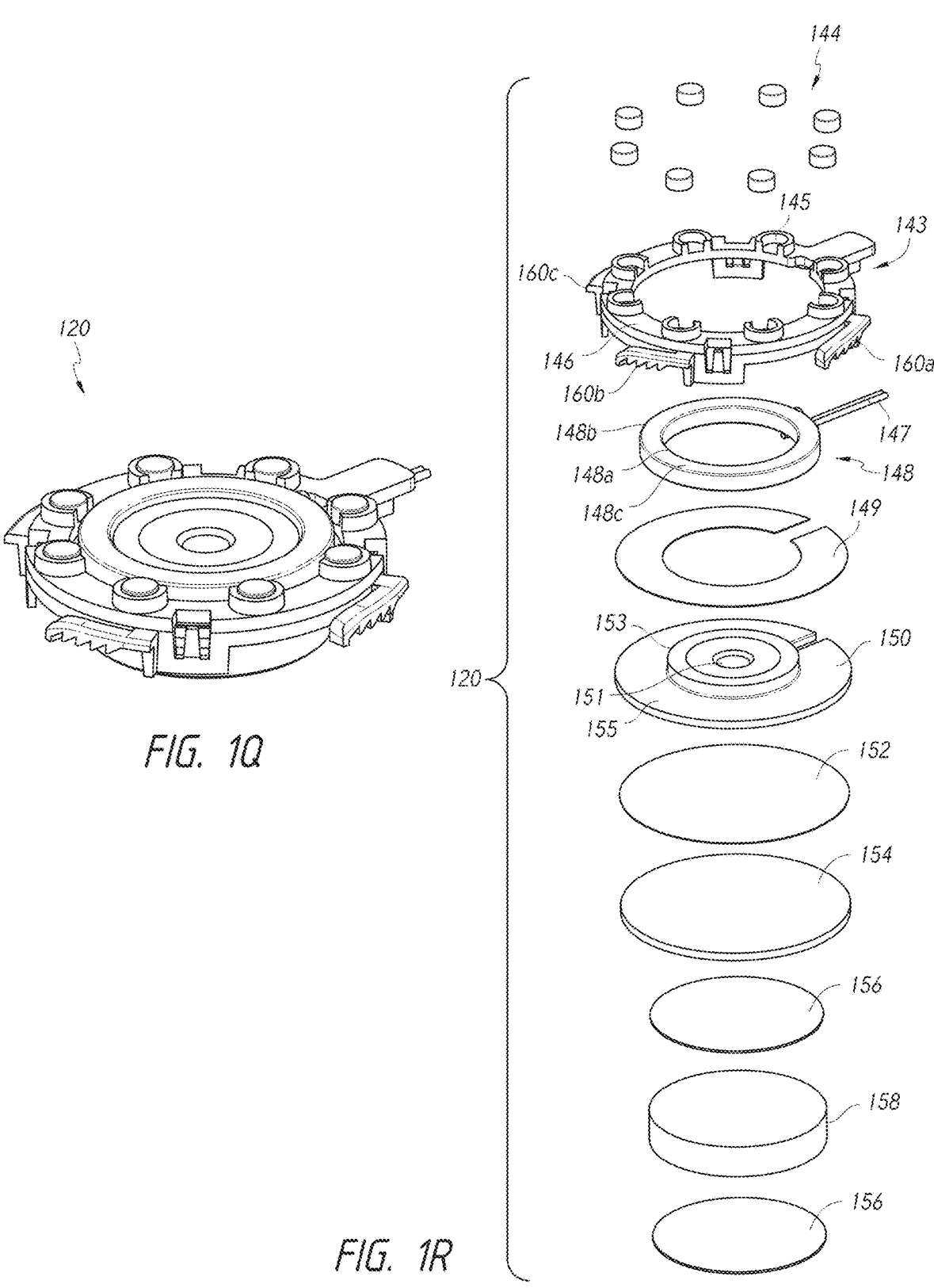
FIG. 1Q is a perspective view of an inductor assembly of the charger in accordance with aspects of this disclosure.
FIG. 1R is a perspective exploded view of the inductor assembly of FIG. 1Q in accordance with aspects of this disclosure.
Figure 1S:
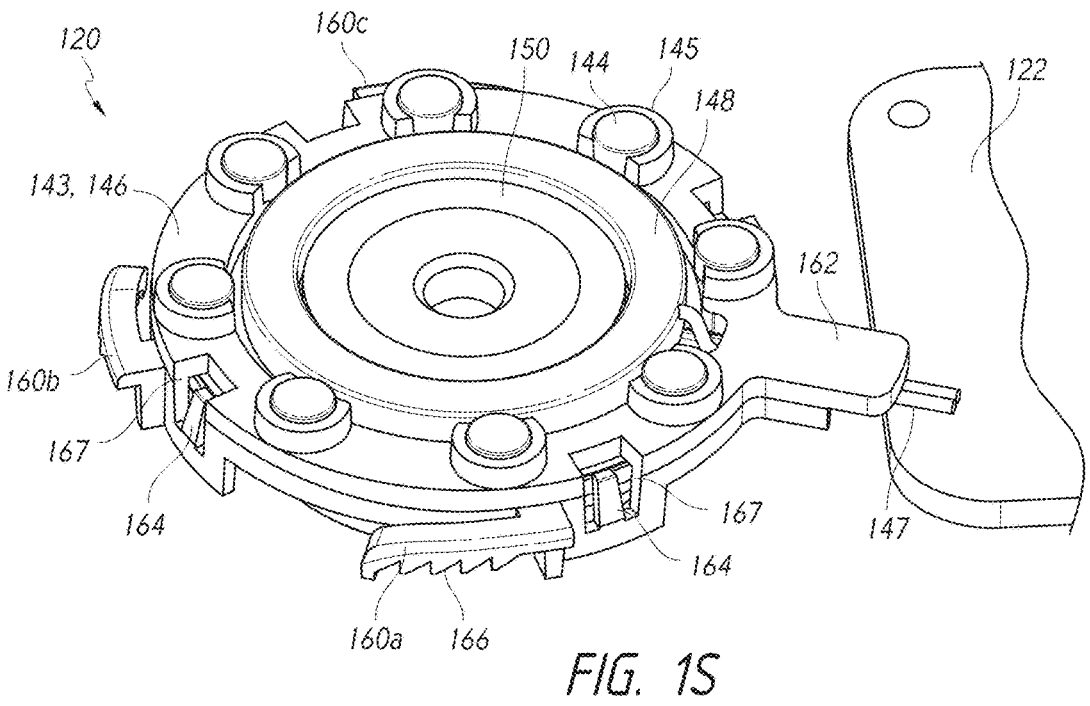
FIGS. 1S-1T are enlarged perspective views of the inductor assembly of FIGS. 1Q-1R and a circuit board of the charger in accordance with aspects of this disclosure.
Figure 1T:
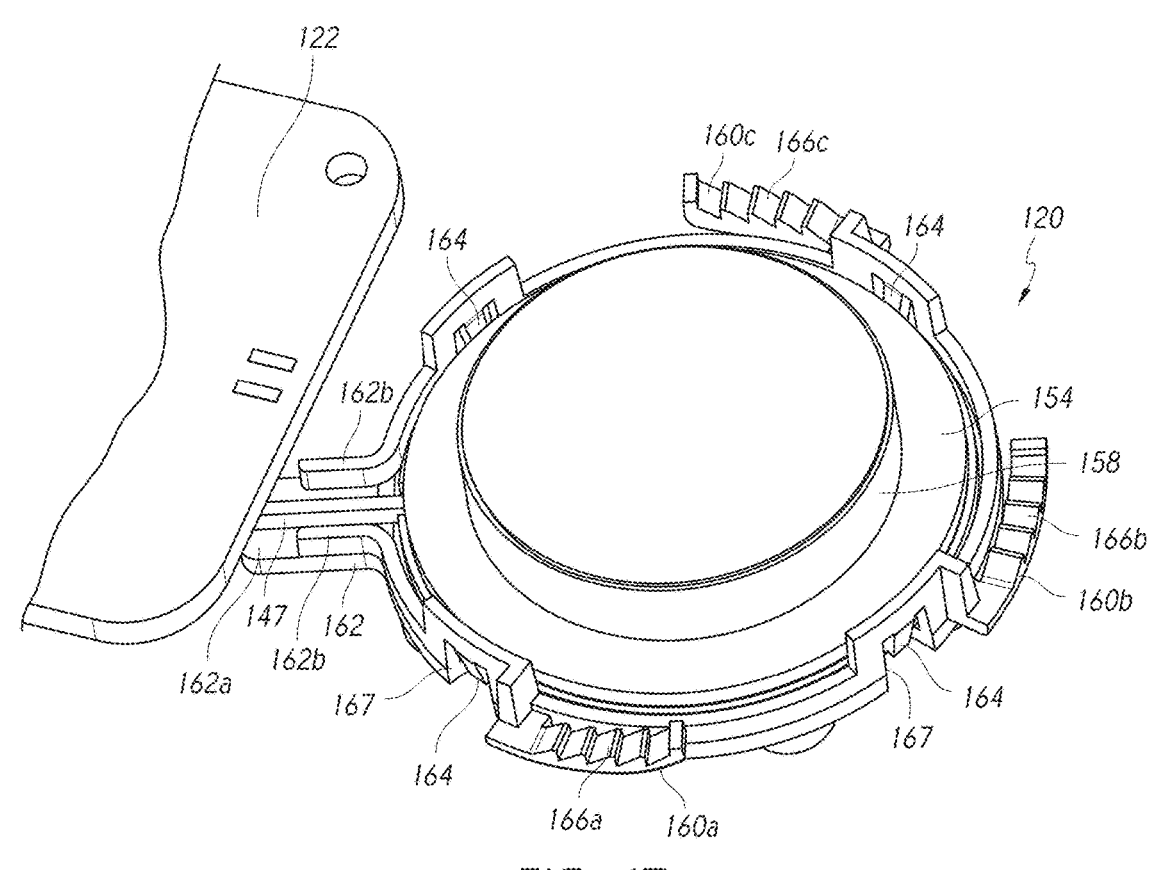

FIG. 1Q illustrates a top perspective view of the inductor assembly 120. FIG. 1R illustrates a perspective exploded view of the inductor assembly 120. The inductor assembly 120 can include one or more or a plurality of magnets 144 (only one of which is labeled in the drawings for purposes of clarity), a frame 143, an inductor member 148, an adhesive member 149, an inductor engagement member 150 (which may also be referred to herein as an "engagement member"), an adhesive layer 152, a shield layer 154, one or more thermal pads 156, and/or a heat sink 158. The inductor assembly 120 can include less than all of the components shown in and/or described with respect to FIG. 1R in some implementations. For example, the inductor assembly 120 can include inductor member 148 and any one or more of the other components shown in and/or described with respect to FIG. 1R. FIGS. 1S-1T illustrate enlarged views of inductor assembly 120 in an assembled state proximate and connected to (via wires 147) circuit board 122 (only a portion of circuit board 122 being shown).

The frame 143 can include a main body 146 and one or more arms connected to the main body 146, such as arm 160*a*, arm 160*b*, and arm 160*c*, each of which are described in more detail below. In some implementations, main body 146 comprises an annular shape having a central opening (see FIG. 1R). The arms 160*a*, 160*b*, 160*b* can be arranged around an outer perimeter of the main body 146. The arms 160*a*, 160*b*, 160*b* can be equally spaced apart from one another or unequally spaced apart from one another. In some implementations, arm 160*a* is disposed opposite arm 160*c*. In some variants, the inductor assembly 120 can include only the inductor member 148 and one or more arms 160. Arms 160*a*, 160*b*, 160*c* can include a first end that is connected to main body 146, a second end that is opposite such first end, and a length extending between such first and second ends. Such second ends of the arms 160*a*, 160*b*, 160*c* can be cantilevered. In some implementations, arms 160*a*,

160*b*, 160*c* are arranged outside a perimeter of the main body 146 and/or are configured so as to generally follow a curvature of such perimeter.

The frame 143 and engagement member 150 can be configured to secure to one another. For example, with reference to FIGS. 1S-1T, frame 143 can include one or more or a plurality of fingers 164 that are configured to engage portions of engagement member 150. Frame 143 can include one or more finger openings 167 within which fingers 164 are arranged. The finger openings 167 can be formed along the main body. The number of finger openings 167 can correspond to the number of fingers 164. Frame 143 can include one, two, three, four, or more than four fingers 164 and corresponding finger openings 167 arranged along portions of main body 146. The fingers 164 and finger openings 167 can be disposed around an outer perimeter of the main body 146. The fingers 164 and finger openings 167 can be equally or unequally spaced apart from one another. One or more fingers 164 can be disposed on the main body 146 across from one another, and one or more finger openings 167 can be disposed on the main body 146 across from one another. The fingers 164 can be configured to contact and engage the engagement member 150. In some implementations, the fingers 164 are biased (for example, angled) inwards towards a center of the frame 143 and are flexed outward when engagement member 150 is positioned within a portion of main body 146. Such configuration can cause the fingers 164 to hold engagement member 150 in place. Securement between frame 143 and engagement member 150 can allow frame 143 to apply and/or transfer force to the engagement member 150, which in turn allows engagement member 150 to push inductor member 148 towards and/or against an interior surface of charging region 110, the benefits of which are described in more detail below. The arms 160 can be formed of a rigid material than be resilient to deformation such as synthetic material such as plastic or polymer. The arms 160 can engage with retention members 130 and can transfer force from the retention members to the frame 143 and engagement member 150.

With reference to FIGS. 1S-1T, arms 160*a*, 160*b*, 160*c* can include one or more teeth 166 (only one of which is labeled in the drawings for purposes of clarity). As an example, each arm 160*a*, 160*b*, 160*c* can include one, two, three, four, five, or more than five teeth 166. Teeth 166 can advantageously engage retention members 130*a*, 130*b*, 130*c* as described in more detail below. Teeth 166 can be angled, as shown, and/or can be beveled or chamfered.

As shown in FIGS. 1S-1T, the frame 143 can include a wing 162. The wing 162 can extend outward from the main body 146 (for example, radially outward from the main body 146) and/or can be arranged along a perimeter of the main body 146. The wing 162 can encompass and/or at least partially cover the wire(s) 147. With reference to FIG. 1T, wing 162 can include a planar portion 162*a* and two edge walls 162*b* that can at least partially confine the wire 147. This can advantageously maintain proper positioning of wires 147 relative to circuit board 122 and/or inhibit wires 147 from being bent, among other things. In some implementations, edge walls 162*b* (which also may be referred to as side walls) are perpendicular to planar portion 162*a*, parallel to one another, and/or arranged along edges of planar portion 162*a*. The wire(s) 147 can connect to the circuit board 122. In some implementations, the wire(s) 147 are soldered to the circuit board 122.

The frame 143 can include one or more magnet retention members 145 (only one of which is labeled in the drawings for purposes of clarity). The magnet retention members 145 can extend outward from the main body 146 (for example, a top surface of the main body 146) and can be configured to receive magnets 144. The magnet retention members 145 can be arranged in an annular formation on the main body 146, for example, around a central opening of main body 146. The magnet retention members 145 can be positioned on the main body 146 in a circular array. An annulus defined by the magnet retention members 145 can be concentric with an annulus defined by the inductor member 148 (and/or a central opening of main body 146 of frame 143). In some implementations, the magnet retention members 145 have a cylindrical or partially cylindrical shape (see FIG. 1R). For example, in some implementations, the magnet retention members 145 each comprise a wall extending outward from main body 146 and having a cylindrical or partially cylindrical shape. The inductor assembly 120 can include one or a plurality of magnets 144, for example, one, two, three, four, five, six, seven, eight, or more than eight magnets 144. The magnet(s) 144 can be secured to the main body 146 via the magnet retention members 145. For example, the magnet(s) 144 can be sized and/or shaped to be received by the magnet retention members 145. In some implementations, the magnet(s) 144 comprise a cylindrical shape. The magnet(s) 144 can be arranged on the main body 146 in an annular formation. In some implementations, an annulus defined by the magnet(s) 144 (for example, when secured to the magnet retention members 145) is concentric with an annulus defined by the inductor member 148 (and/or a central opening of main body 146 of frame 143). Magnets 144 can advantageously allow inductor assembly 120 (and in turn, charger 100) to be magnetically attracted to a portion of the electronic device 10 (which can comprise magnets and/or a material that is magnetically attractable to magnets 144). When charger 100 is in an assembled state, magnets 144 can be arranged adjacent or proximate to the charging region 110 (see FIG. 1V) and therefore can be configured to magnetically attract to a portion of the electronic device 10 when electronic device is positioned at charging region 110. By preventing or inhibiting movement of an electronic device relative to the charging region 110, such as sliding on a surface of the charging region 110, the charging region 110 can facilitate aligning the inductor member 148 with a corresponding inductor member in the electronic device to be charged. This can reduce the distance between inductor member 148 of the charger 100 (which can be arranged within an interior of housing 102 of charger 100) and a corresponding inductor member in the electronic device to be charged, which can improve energy transfer and/or reduce charge times.

The inductor member 148 can include one or more electrically conductive materials for generating a magnetic field for providing charge to electronic device 10. The inductor member 148 can include one or more wires 147 which can electrically coupled with circuit board 122 to communicate electrical energy with the circuit board. The wires 147 can be copper wires. The inductor member 148 can include one or more wires 147 wound in a coil. The inductor member 148 can include one or more wires 147 wound in one or more turns. The inductor member 148 can form a closed loop. The inductor member 148 can form an annulus. The inductor member 148 can be an induction coil. The inductor member 148 can conduct an electrical current. The inductor member 148 can generate a magnetic field, such as when conducting an electrical current. The strength and/or direction of a magnetic field generated by the inductor member 148 can correspond to the strength and/or direction of current conducted through the inductor member 148. The inductor member 148 can generate a changing magnetic field, such as by changing a strength and/or direction of current conducted through the inductor member 148.

As mentioned previously, the inductor assembly 120 can include an engagement member 150. Engagement member 150 can secure and/or operably position inductor member 148 relative to frame 143. For example, the engagement member 150 can secure and/or operably position inductor member 148 within main body 146 of frame 143, as illustrated in the figures. In some implementations, the inductor member 148 is concentrically arranged within main body 146 when secured and/or operably positioned by engagement member 150. With reference to FIG. 1R, the engagement member 150 can include a first portion 155 and a second portion 153 projecting outward from the first portion 153. In some implementations, the second portion 153 is inset from a perimeter of the first portion 155. In some implementations, the second portion 153 comprises a cylindrical shape. In some implementations, the first portion 155 is disc shaped. In some implementations, center axes of the first and second portions 153, 155 are aligned. The second portion 153 can have a smaller cross-sectional area (for example, diameter) than the first portion 155. In some implementations, the second portion 153 is sized and/or shaped to fit within the inductor member 148 (for example, within a central opening of inductor member 148). The inductor member 148 can surround the second portion 153. The second portion 153 can prevent or inhibit the inductor member 148 from moving relative to the engagement member 150, which can advantageously facilitate proper alignment and/or positioning of inductor member 148 relative to other portions of charger 100 (for example, charging region 110). The inductor assembly 120 can include an adhesive member 149 configured to secure inductor member 148 to engagement member 150. For example, a bottom portion or surface of the inductor member 148 can be adhesively secured to a top portion of surface of engagement member 150 (for example, to portion 155) via adhesive member 149. In some implementations, the adhesive member 149 contacts and secured to the first portion 155, for example, around portion 153. The inductor member 148 can be secured to the first portion 155 via the adhesive member 149. The second portion 153 can be sized and/or shape to fit within the opening of the inductor member 148. Securement of inductor member 148 to engagement member 150 (for example, via engagement of portion 153 within an opening of inductor member 148 and/or via adhesive member 149) not only can facilitate proper alignment and/or positioning of inductor member 148, but also can allow engagement member 150 to apply force to the inductor member 148 and/or cause inductor member 148 to move (for example, towards and/or against an interior surface of charging region 110), the benefits of which are described in more detail below.

In some implementations, the engagement member 150 includes an aperture 151 (see FIG. 1R). The aperture 151 can be positioned within a center of the second portion 153 and/or extend through the second portion 153. The aperture 151 can extend through the first portion 155. The aperture 151 can be continuous through the engagement member 150. The aperture 151 can be a through-hole. The aperture 151 can receive a portion of the housing 102, such as the protrusion 132 shown and/or described with reference to FIGS. 1M-1N which can help align the engagement member 150 and/or the inductor member 148 with the charging region 110. The aperture 151 can prevent or inhibit the inductor assembly 120 from moving relative to the housing 102.

The engagement member 150 can include a slot 157 configured to receive the wires 147. When inductor member 148 is supported by engagement member 150), the wires 147 can be positioned within the slot 157. The length of the slot 157 can be less than a radius of the engagement member 150. The length of the slot 157 can correspond to a width of the first portion 155. The slot 157 can be positioned within the first portion 155.

The engagement member 150 can be formed of a magnetic material. The engagement member 150 can be formed of ferrite material. The engagement member 150 can be configured to act as a shield against a magnetic field. For example, the engagement member 150 can be configured to block a magnetic field generated by the inductor member 148. The engagement member 150 can advantageously reduce the presence of eddy currents.

The shield layer 154 can be formed of a magnetic material. The shield layer 154 can be formed of ferrite material. The shield layer 154 can be configured to act as a shield against a magnetic field. For example, the shield layer 154 can be configured to block a magnetic field generated by the inductor member 148. The shield layer 154 can advantageously reduce the presence of eddy currents. The inductor assembly 120 can include an adhesive layer 152 that can secure the engagement member 150 to the shield layer 154.

The heat sink 158 can be arranged be adjacent to the shield layer 154. Inductor assembly 120 can include thermal pads 156 arranged on one or more sides of the heat sink 158. The heat sink 158 can be formed of a thermally conductive material. The heat sink 158 can be formed of metal, such as aluminum. In some implementations, the heat sink 158 comprises a generally cylindrical shape. The heat sink 158 can be arranged adjacent to the opening 124 of shell 102a as shown and/or described with reference to at least FIGS. 1O-1P. The heat sink 158 can advantageously conduct thermal energy away from the inductor assembly 120, for example, to an exterior region or surface of housing 102 and/or to plate 136 as shown and/or described with reference to FIGS. 1O-1P.

As mentioned previously, FIGS. 1S-1T illustrate top and bottom perspective views (respectively) of the inductor assembly 120 and a portion of circuit board 122. Inductor member 148 can be electrically connected to circuit board 122 via wires 147. Wires 147 can be soldered to circuit board 122. Inductor member 148 can receive electrical current from the circuit board 11. The arms 160 can be engaged with portions of the housing such as retention members 130a, 130b, 130c which engagement causes frame 143 to apply and/or transfer force to the engagement member.

Figures 1U, 1V, 1W:
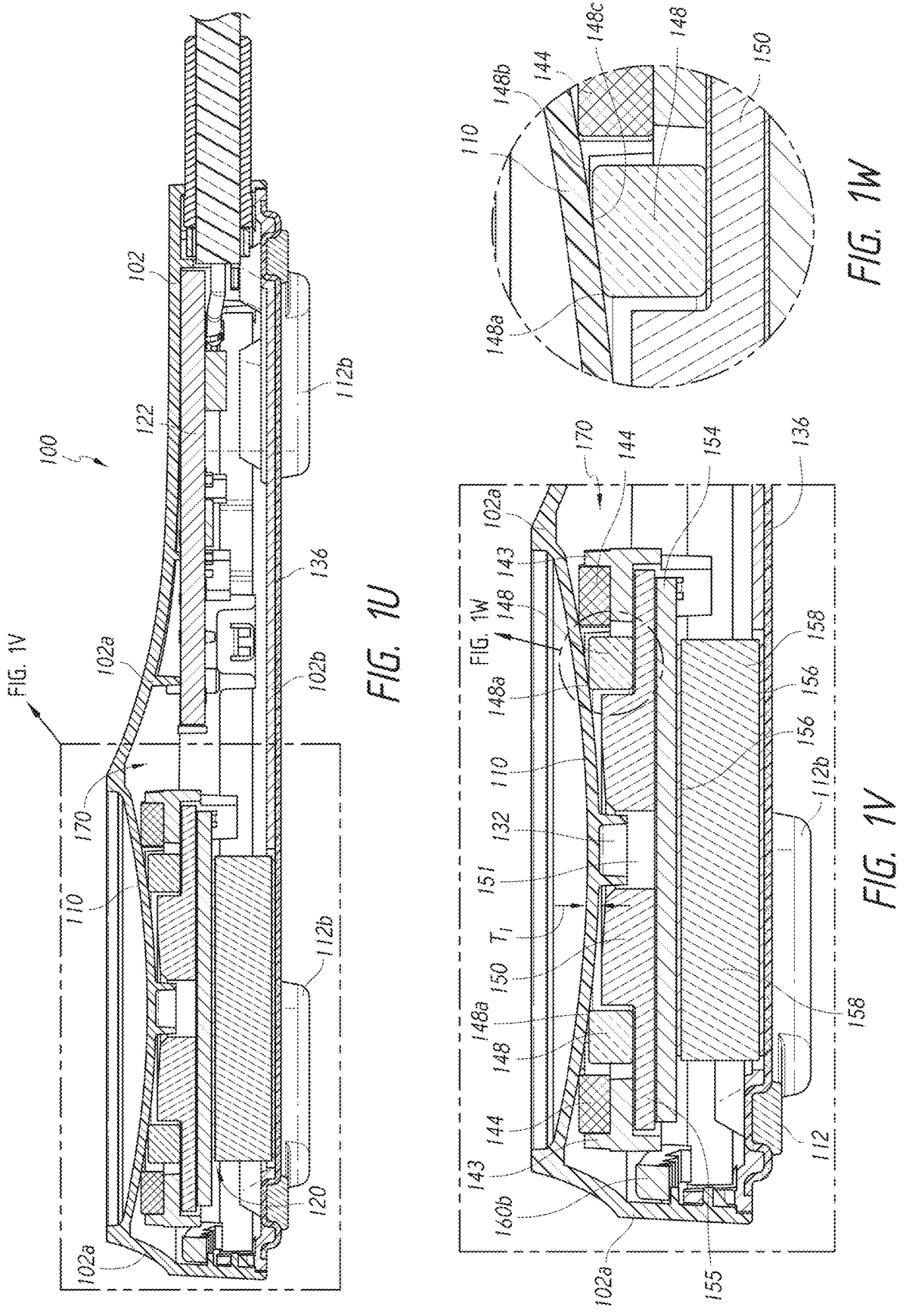
FIG. 1U is a cross section view of the charger taken along the line illustrated in FIG. 1J in accordance with aspects of this disclosure.
FIG. 1V is an enlarged view of a portion of the charger illustrated in FIG. 1U in accordance with aspects of this disclosure.
FIG. 1W is an enlarged view of a portion of the charger illustrated in FIG. 1V in accordance with aspects of this disclosure.

FIG. 1U is a cross section view of the charger 100 taken along the line illustrated in FIG. 1J. FIG. 1U illustrates charger 100 in an assembled state. FIG. 1V is an enlarged view of a portion of that illustrated in FIG. 1U. FIGS. 1U-V illustrate an example arrangement of inductor assembly 120 and circuit board 122 within an interior of the housing 102.

As described previously, charger 100 can include a charging region 110 for receiving a portion of electronic device 10. One or more portions of inductor assembly 120 can be arranged within the interior of the housing 102 of charger 100 and be positioned proximate or adjacent charging region in order to facilitate inductive charging. One or more portions and/or components of the inductor assembly 120 can be positioned adjacent to the charging region 110 (for example, so as to contact an interior surface of housing 102 at the charging region 110). In some implementations, charger 100 includes one or more magnets 144, and such magnet(s) 144 are arranged to contact the charging region 110 (for example, at least a portion of each magnet 144 is in contact with charging region 110). The inductor member 148 (for example, portion(s) thereof) can be arranged to contact the charging region 110. For example, in the illustrated implementation of FIGS. 1U-1V, an inner edge 148a of the inductor member 148 (which can be annular) contacts the charging region 110. In some implementations, an entirety of such inner edge 148a contacts the charging region 110. As described elsewhere herein, the inductor member 148 can be biased into contact with the charging region 110, for example, with a biasing member of the charger 100. As discussed in more detail below, such biasing member (which also may be referred to as a "biasing mechanism") can comprise frame 143 and inductor engagement member 150. In some implementations, at least a portion of the inductor member 148 deforms as a result of such biasing. FIG. 1W illustrates an enlarged view of a portion of that illustrated in FIG. 1V in an example condition in which a portion of inductor member 148 deformed. In such example condition, a portion of a top surface 148c of inductor member 148 (which faces toward charging region 110) contacts the charging region 110 along with the inner edge 148a. In some implementations, only a portion of the top surface 148c contacts the charging region 110. In some implementations, an entirety of the top surface 148c contacts the charging region 110. In some implementations, an outer edge 148b of inductor member does not contact the charging region 110. In some implementations, outer edge 148b contacts the charging region 110. In some implementations, the inductor member 148 contiguously contacts the charging region 110 in a closed loop. In some implementations, the inductor member 148 may be secured to the charging region 110 with an adhesive such as glue.

As shown in FIGS. 1U-1V, the charging region 110 can be non-planar. In some implementations, a top surface of charging region 110 (which can be a portion of the exterior surface of housing 102) is concave and a bottom surface of charging region 110 (which can be a portion of the interior surface of housing 102) is convex. The charging region 110 can be ellipsoidal. The charging region 110 can be dome-shaped. As described elsewhere herein, the charging region 110 can be configured to receive an electronic device (or a portion thereof) for charging, such as electronic device 10 shown and/or described with reference to at least FIGS. 1A-1B. The shape of the charging region 110 can prevent or inhibit an electronic device from moving relative to the charging region 110. For example, the ellipsoidal shape of the charging region 110 can prevent an electronic device (or a portion thereof) from translating relative to the charging region 110. In some implementations, electronic device 10 includes a protruding portion (for example, on a bottom portion of electronic device 10) that is configured to be received by a space at least partially defined by charging region 110.

The charging region 110 can be designed and/or manufactured to achieve a minimal thickness of the charging region 110. For example, the charging region 110 can be designed and/or manufactured such that the thickness Ti of the charging region 110 shown FIGS. 1U-1W is as thin a possible without defecting or deforming the charging region 110. A thinner charging region 110 can reduce the distance between the inductor member 148 and a corresponding inductor member in an electronic device to be charged which can improve energy transfer and reduce charge times.

As described previously, charger 100 can include supports 112. Supports 112 can support the charger 100 on a surface on which the charger 100 rests. Pads 112*b* of supports 112 can space the plate 136 a distance from a support surface on which the charger 100 rests (for example, a surface underneath charger 100 in the orientation illustrated in FIG. 1U). Such configuration can cause all or a majority of the exterior surface of the plate 136 to contact air rather than such support surface on which the charger 100 rests. Heat can dissipate from the charger 100, such as via the plate 136, to air that exists between the plate 136 and a surface on which the charger 100 rests.

FIG. 1W illustrates an enlarged view of a portion of the charger 100 illustrated in FIG. 1U according to some implementations. As described elsewhere herein, the engagement member 150 can apply a force to the inductor member 148 and cause inductor member 148 to apply a force to (and/or be pressed against) charging region 110. In some cases, depending on the forces and materials of inductor member 148 and charging region 110 (housing 102) the responsive force applied by charging region 110 to inductor member 148 can cause the inductor member 148 to deform. FIG. 1W illustrates inductor member 148 in an example partially deformed state in which a portion of a top surface of inductor member 148 contacts charging region 110 along with an inner edge 148*a* of inductor member 148. In some implementations, when charger 100 is in an assembled state, an entirety or majority of a top surface of inductor member 148 contacts charging region 110.

The inductor member 148 can deform as the engagement member 150 presses the inductor member 148 against the charging region 110. The cross section of inductor member 148 can represent multiple cross sections of one or more wires wound in a coil in multiple turns. Deformation of the inductor member 148 can occur as one or more turns of the one or more wires of the inductor member 148 move relative to one another. In some implementations, the inductor member 148 can include a casing surrounding one or more turns of one or more wires. The casing can be formed of a rigid material or of a deformable material.

In various implementations such as that illustrated in FIGS. 1U-1X, the charger 100 is configured such that the inductor member 148 is in direct contact with the charging region 110 (for example, when charger 100 is in an assembled state). Achieving such direct contact advantageously improves the charger's 100 charging capability with respect to electronic device 10 because it positions the inductor member 148 (arranged within the interior of housing 102 for protection) as close as possible to the electronic device 10 (which can be removably positioned at charging region 110). As discussed in more detail below, charger 100 can include a biasing member (which also may be referred to as a "biasing mechanism") that biases inductor member 148 into contact with charging region 110 (for example, an interior surface of housing 102 at charging region 110). Such configurations are in contrast to conventional chargers which are unable to achieve such direct contact due to imprecisions in the manufacturing and assembly processes and tolerancing requirements. The biasing member of charger 100 can apply a force to the inductor member 148 to cause the inductor member 148 to contact and/or be pressed against the charging region 110. Such biasing member can be configured to prevent or inhibit the inductor member 148 from moving away from the charging region 110. The biasing member can comprise the frame 143 and/or engagement member 150. In some implementations, frame 143 and inductor engagement member 150 are separate components, for example, secured to one another as described herein with respect to fingers 164. In some implementations, frame 143 and inductor engagement member 150 are removably secured to one another (for example, via engagement of fingers 164 and portions of inductor engagement member 150). In some implementations, frame 143 and inductor engagement member 150 are permanently secured to one another.

Although various implementations of the chargers disclosed herein have been described as including a biasing member comprising frame 143 and inductor engagement member 150, in some variants, such biasing member includes frame 143 but does not include inductor engagement member 150. In such variants, frame 143 can be configured to engage and/or secure inductor member 148 so as to bias and/or position inductor member 148 against charging region 110.

Figures 1X, 1Y, 1Z:
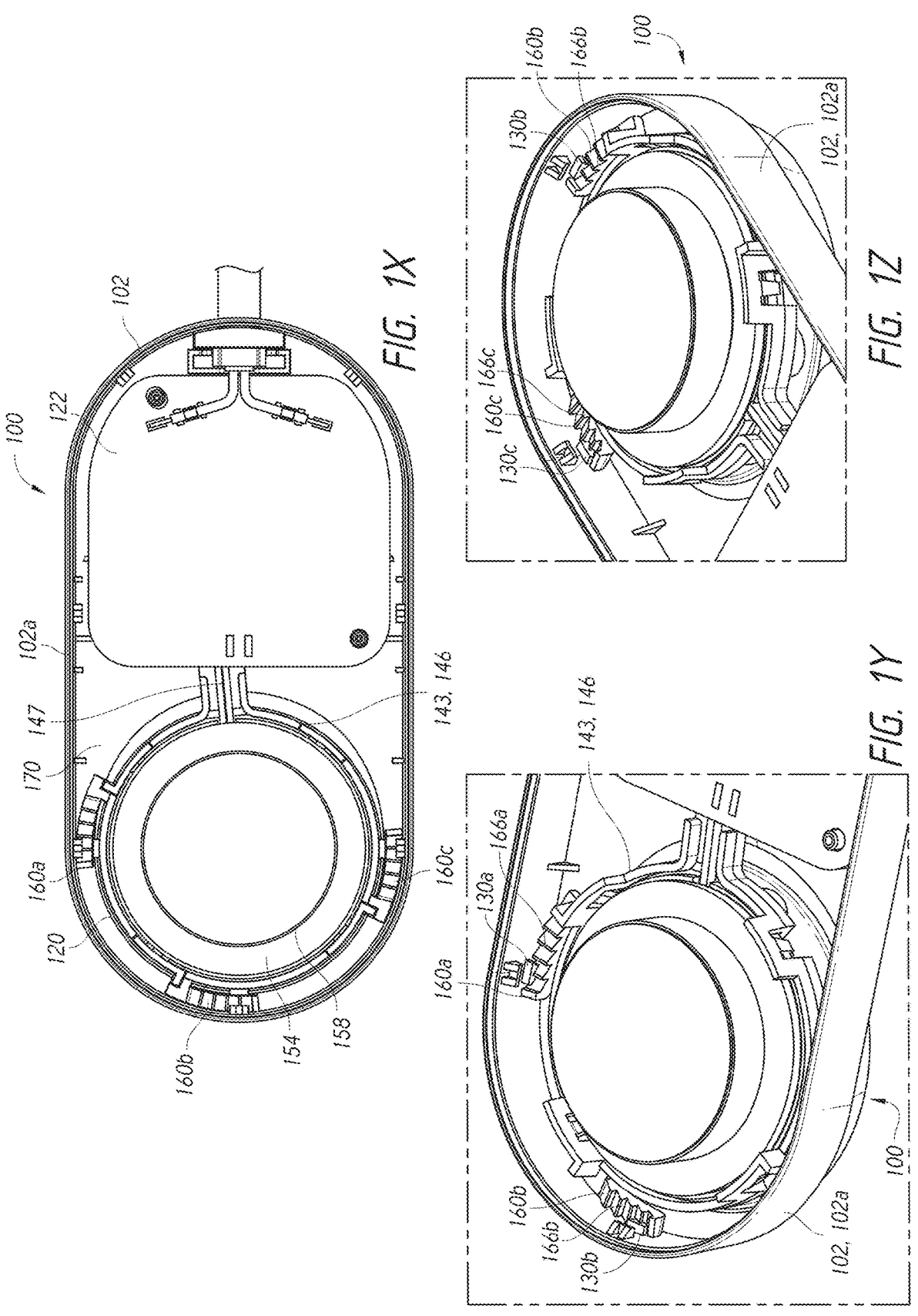
FIG. 1X is a bottom view of an interior of the charger in which an inductor assembly of the charger is in a second position in accordance with aspects of this disclosure.
FIGS. 1Y-1Z are bottom perspective views of the interior of the charger illustrated in FIG. 1X in accordance with aspects of this disclosure.
Figures 1A, 1B, 1C:
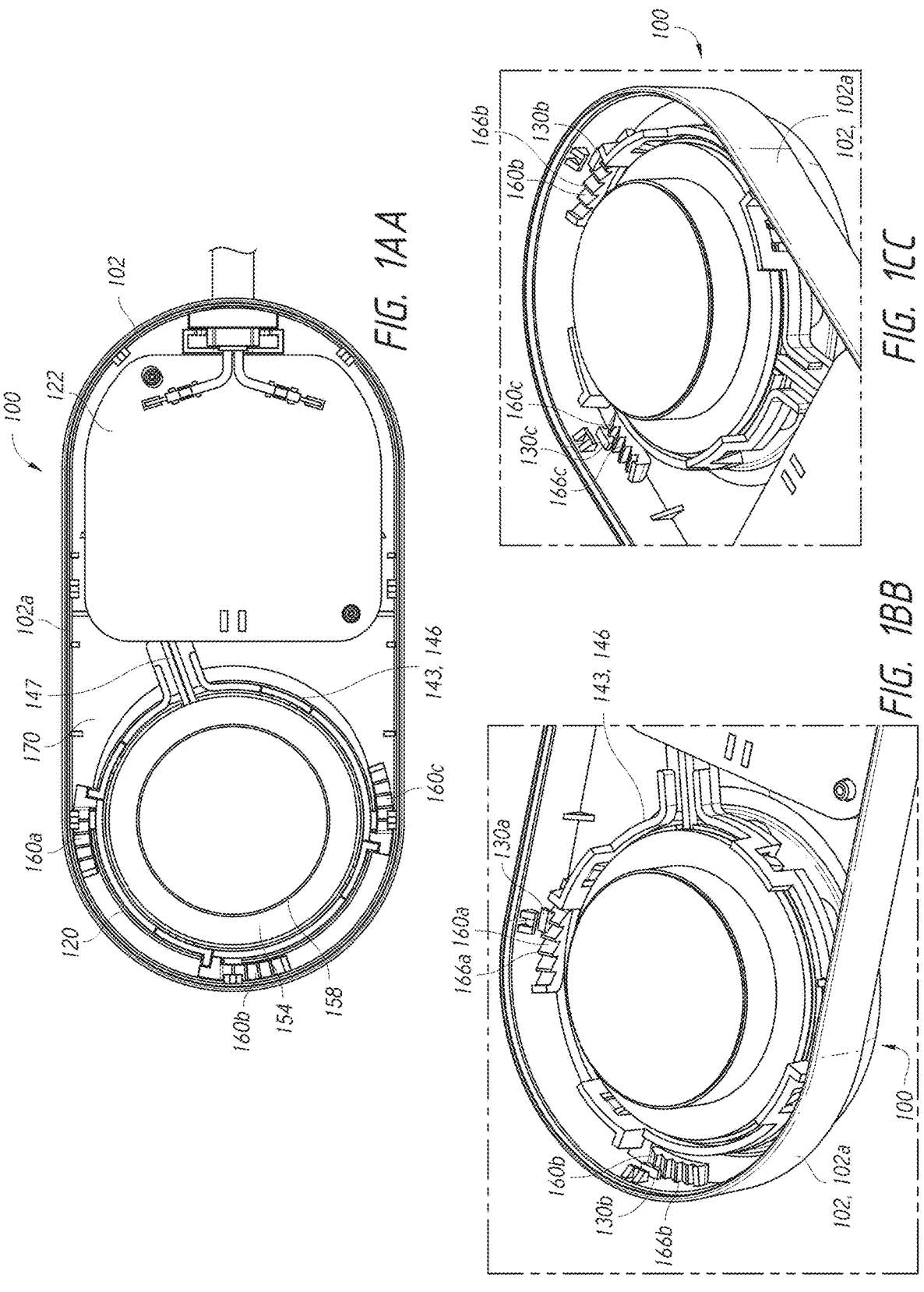
Figure 1D:
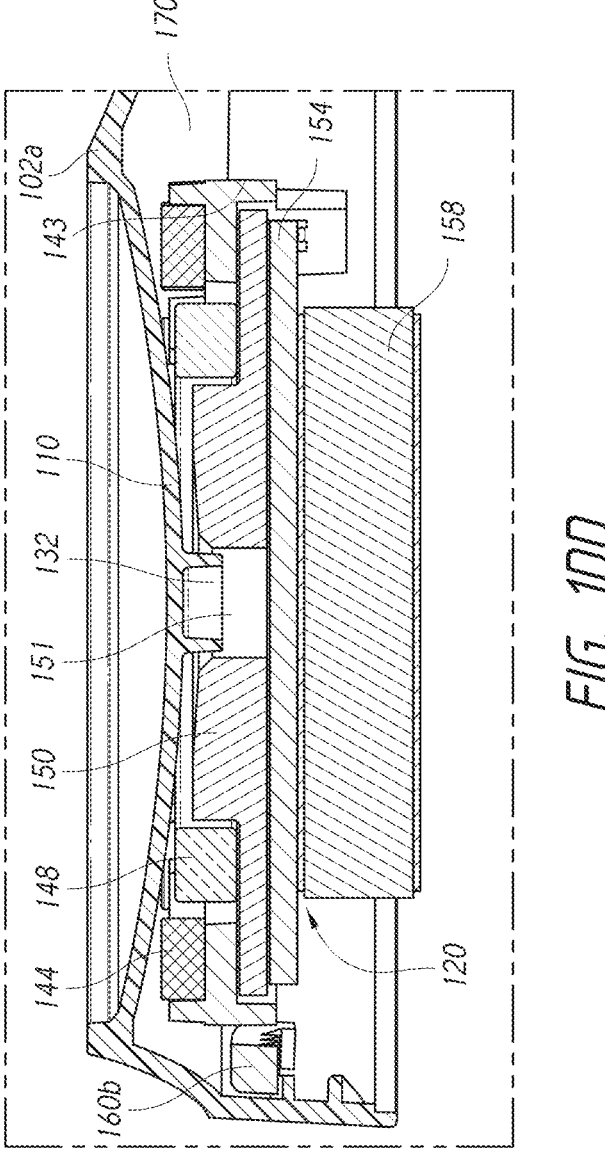
Figure 1E:
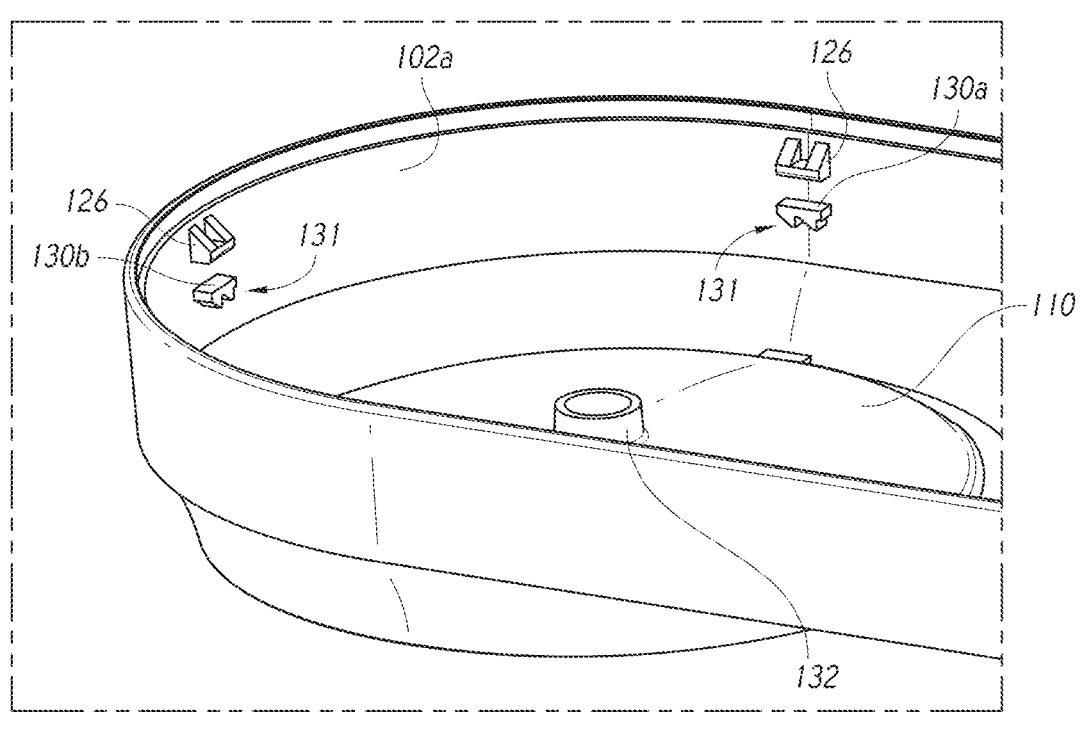
Figure 1F:
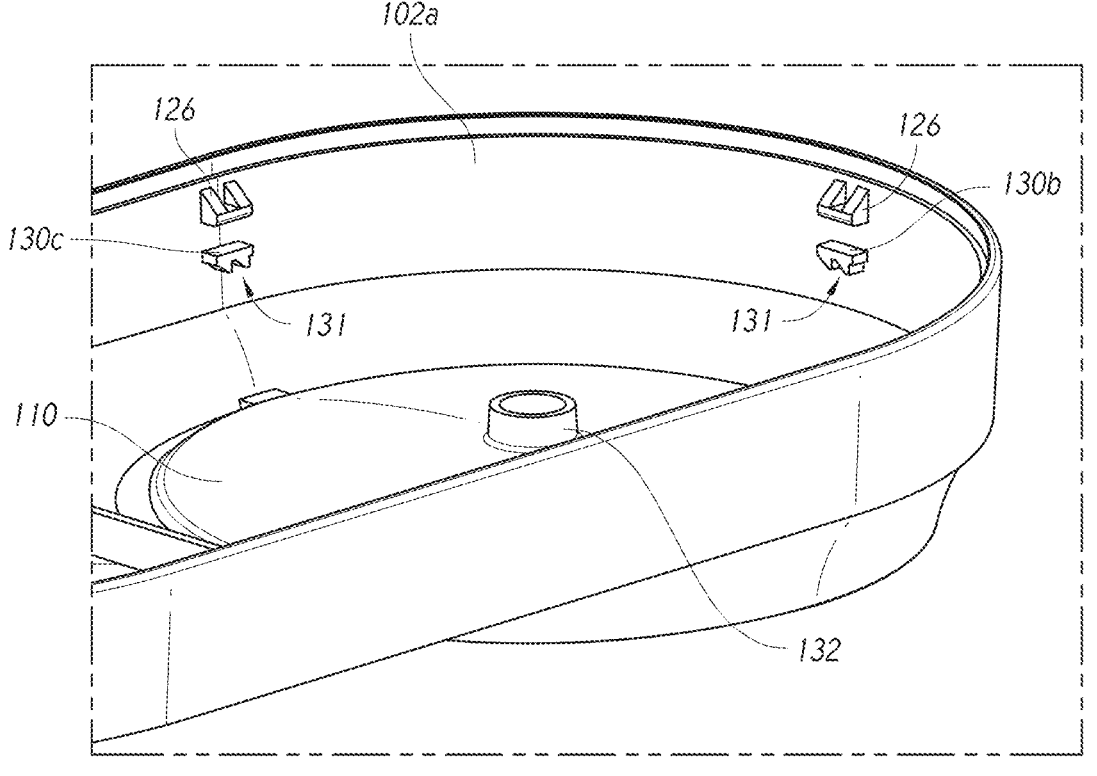

FIG. 1X illustrates a bottom view of the charger 100 with plate 136, supports 112, and shell 102*b* removed. FIGS. 1Y-1Z are perspective views of portions of the charger 100 with plate 136, supports 112, and shell 102*b* removed. As described previously, the housing 102 can include one or more retention members configured to engage portions of arms 160 of frame 143, such as retention member 130*a*, 130*b*, and 130*c*. FIGS. 1X-1Z illustrate retention members 130*a*, 130*b*, 130*c* engaged with arms 160*a*, 160*b*, 160*c*. As shown, teeth 131 of retention members retention members 130*a*, 130*b*, 130*c* can be engaged with teeth 166*a*, 166*b*, 166*c* of arms 160*a*, 160*b*, 160*c*. As described previously, engagement member 150 can be coupled with frame 143 (for example, via fingers 164). Accordingly, when frame 143, engagement member 150, and inductor member 148 are secured to one another and positioned as shown in FIGS. 1U-1Z (which can represent an assembled or final state of these components within charger 100), frame 143 and engagement member 150 can bias inductor member 148 against charging region 110. In some implementations, frame 143 and engagement member 150 cooperate together, along with retention members 130*a*, 130*b*, 130*c* to bias inductor member 148 against a portion of an interior surface of housing 102.

Charger 100 can be assembled in a variety of ways, for example, to facilitate arrangement of inductor assembly 120 (and inductor member 148) against charging region 110. As mentioned previously, FIGS. 1X-1Z illustrate bottom (and bottom perspective views) of charger 100 (and portions of charger 100) with plate 136, supports 112, and shell 102*b* removed. FIGS. 1AA-1CC illustrate the same views as in FIGS. 1X-1Z, but with inductor assembly 120 in a different position (rotational position). FIGS. 1AA-1CC illustrate inductor assembly 120 in a first rotational position which can occur prior to the rotational position of inductor assembly 120 illustrated in FIGS. 1X-1Z (which can be referred to as a "second rotational position"). Such second rotational position of inductor assembly 120 illustrated in FIGS. 1X-1Z can be a final or assembled position of inductor assembly 120, in which inductor member 148 is positioned against charging region 110, as illustrated in FIGS. 1U-1W. FIG. 1DD illustrates an enlarged view similar to that shown in FIG. 1V but corresponding to the "first" rotational position of inductor assembly 120 and inductor member 148 illustrated in FIGS. 1AA-1CC. As shown in FIG. 1DD, inductor member 148 is not in contact with charging region 110 when in such first rotational position (see FIG. 1DD).

Inductor assembly 120 can be assembled in a variety of ways. For example, inductor member 148, frame 143, and engagement member 150 can be engaged and/or secured with one another as shown and/or described with respect to FIGS. 1Q-1R. Additionally, any of the components shown and/or described with respect to FIGS. 1Q-1R can be engaged and/or secured to one another as shown and/or described with respect to FIGS. 1Q-1R. After inductor member 148, frame 143, and engagement member 150 (and/or any other components of inductor assembly 120) are engaged and/or secured to one another, inductor assembly 120 can be positioned within a portion of housing 102 (for example, shell 102a) such that retention members 130a, 130b, 130c are at least partially engaged and/or in contact with arms 160a, 160b, 160c as illustrated in FIGS. 1AA-1CC. Thereafter, inductor assembly 120 can be rotated (for example, via rotation of frame 143) to the position illustrated in FIGS. 1X-1Z (for example, in a clockwise manner). In some implementations, retention members 130a, 130b, 130c are arranged closer to the free ends of arms 160a, 160b, 160c when inductor assembly 120 is in the second position (FIGS. 1X-1Z) than when inductor assembly 120 is in the first position (FIGS. 1AA-1CC).

With reference to FIGS. 1AA and 1X, arms 160a, 160b, 160c be oriented so as to generally follow a curvature of the main body 146 of the frame 143 (which can be circular). Such configurations facilitate rotational engagement of retention members 130a, 130b, 130c with and along arms 160a, 160b, 160c while inductor assembly 120 rotates. Arms 160a, 160b, 160c can be configured such that, when inductor assembly 120 (for example, frame 143) is rotated from the first position (FIGS. 1AA-1CC) to the second position (FIGS. 1X-1Z), the inductor assembly 120 and inductor member 148 are moved towards charging region 110, for example, moved along an axis extending through inductor member 148 (and/or frame 143, inductor engagement member 150) and/or an axis about which inductor member 148 (and/or frame 143, inductor engagement member 150) rotates. For example, arms 160a, 160b, 160c can be angled relative to a plane about which main body 146 of frame 143 is oriented. For example, with reference to FIGS. 1S-1T, arms 160a, 160b, 160c can be bent downward given the illustrated orientation. Such configurations can facilitate movement of frame 143, inductor engagement member 150, and/or inductor member 148 relative to housing 102 (and charging region 110) where retention members 130a, 130b, 130c are retention members 130a, 130b, 130c are fixed to the housing 102 and are moved along the angled arms 160a, 160b, 160c. Although FIGS. 1AA-1CC and FIGS. 1X-1Z illustrate two example rotational positions of inductor assembly 120 relative to shell 102a (for example, during a manufacturing process of charger 100), it is to be understood that inductor assembly 120 can be moved (rotated) to and/or through a plurality of rotational positions between and/or beyond these two positions in some implementations.

In some implementations, teeth 166a, 166b, 166c, arms 160a, 160b, 160c, teeth 131, and/or retention members 130a, 130b, 130c are configured to form a ratchet mechanism that allows rotation of inductor assembly 120 in one rotational direction but prevents or inhibits rotation of inductor assembly 120 in the other rotational direction. Such configurations can advantageously allow inductor assembly 120 to be rotated from the position of FIGS. 1AA-1CC to the position of FIGS. 1X-1Z, as well as a plurality of positions between these two positions, while inhibiting locking inductor assembly 120 from returning to the previous rotational positions. As described previously, arms 160a, 160b, 160c can include a plurality of teeth 166a, 166b, 166c along lengths thereof. The number of teeth 166a, 166b, 166c on each arm 160a, 160b, 160c can be modified to define the number of rotational positions of inductor assembly 120, given that teeth 131 of retention members 130a, 130b, 130c engage each tooth of arms 160. Such configurations can allow for fine tuning of the rotational positions of inductor assembly 120, and in turn, the axial/vertical positions of inductor member 148 (and other portions of inductor assembly 120) relative to charging region 110. For example, where arms 160a, 160b, 160c include a plurality of teeth 166a, 166b, 166c, inductor assembly 120 can be incrementally rotated through rotational positions (defined by engagement with teeth 131 of arms 160a, 160b, 160c) until inductor member 148 (or other portions of inductor assembly 120) are sufficiently in contact with charging region 110. Transitioning the inductor assembly 120 from a first position to a second position can include engaging teeth 131 of retention member 130 with a first tooth 166 of respective arms 160 and then rotating the inductor assembly 120 to engage the teeth 131 with a second tooth 166 of respective arms 160. In some implementations, after the final desired rotational position of inductor assembly 120 is achieved (for example, that shown in FIGS. 1X-1Z), wires 147 can be permanently secured to circuit board 122. However, in some cases, wires 147 can be coupled to circuit board 122 prior to rotating inductor assembly 120 into its final position.

Figures 2A, 2B:
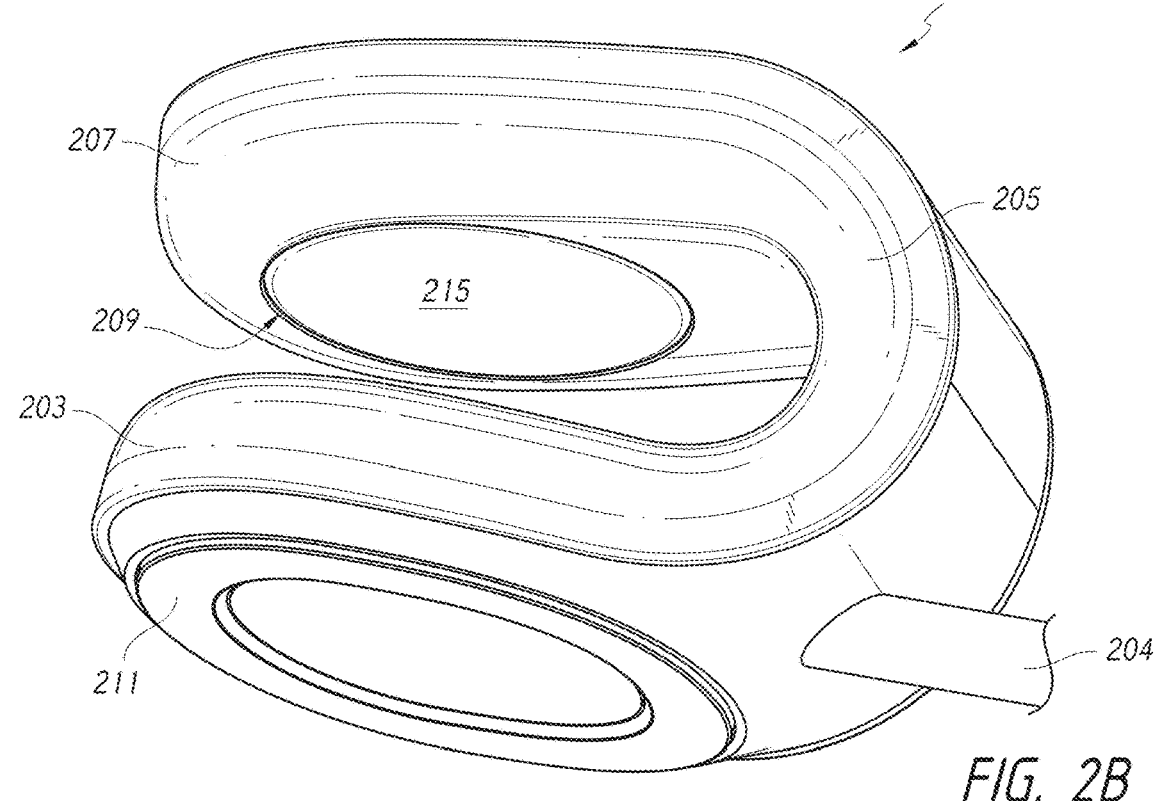
FIGS. 2A-2B are perspective views of another example induction charger in accordance with aspects of this disclosure.

FIGS. 2A-2B illustrate perspective views of an example induction charger 200 according to one implementation. The charger 200 can include a housing 202 and a cable 204. The housing 202 can include a bottom portion 203, a top portion 207, and a median portion 205 (which also can be referred to as an "intermediate portion") extending between and/or connecting the top and bottom portions 207, 203. The top portion 207 can include a charging region 210 and a heat dissipation region 209. The bottom portion 203 can include a support 211. When the charger 200 is positioned atop a support surface (for example, a desk, table, or other surface), bottom portion 203 can be in contact with such support surface and top portion 207 can be positioned above (for example, vertically) and spaced from such support surface (and the bottom portion 203). FIG. 2I illustrates charger 200 and an electronic device 10 in an example condition of use in which the charger 200 rests atop a support surface 201 and electronic device is positioned atop the charging region 210 of charger 200. As shown, charger 200 can be configured such that the charging region 210 and electronic device 10 is elevated above the support surface 201.

The charger 200 can provide energy to an electronic device, for example, electronic device 10. The charger 200 can be configured charge an electronic device in a similar or identical manner as that described above with respect to charger 100 (for example, via induction). The charger 200 can be configured to charge a variety of electronic devices, such as any of the example electronic devices shown and/or described herein. The charger 200 can be configured to generate a magnetic field, for example, responsive to receiving energy from the cable 204. The cable 204 can be similar or identical to cable 104. The cable 204 can be configured to connect to a power source, for example, any of the power sources described above with respect to cable 104. The cable 204 can include one or more wires. The cable 204 can be configured to conduct energy (for example, an electrical current) to charger 100. The charger 200 can include an induction coil configured to receive an electrical current from the cable 204, conduct the electrical current, and generate a magnetic field. The induction coil of the charger 200 can be arranged within the interior of the housing 202, which can serve to protect the induction coil. In some implementations, the induction coil of the charger 200 is arranged within the top portion 207 of the housing 202. In such implementations, the induction coil of the charger 200 can generate a magnetic field at the top portion 207.

As mentioned previously, the charger 200 can include a charging region 210 arranged on the top portion 207 of the housing 202. The charging region 210 can be configured to receive an electronic device to be charged (for example, electronic device 10), or a portion of such electronic device. The charging region 210 can be similar or identical to charging region 110 described elsewhere herein. The charging region 210 can be circular. The charging region 210 can be ellipsoidal. The charging region 210 can be concave. The charging region 210 can be dome-shaped. The charger 200 can generate magnetic field that passes through the charging region 210.

The charger 200 can be configured to dissipate heat generated from one or more components of the charger 200 inside an interior of housing 202 to the external environment. With reference to FIG. 2B, the housing 202 can include an opening 209 on a bottom surface of the top portion 207 and a plate 215 arranged within the opening 209. Plate 215 can comprise a thermally conductive material (for example, a metallic material) and can be configured to conduct heat out of the interior of housing 202 to the external environment (through opening 209). As described previously, in some implementations, the induction coil of the charger 200 is arranged within the top portion 207. In some of such implementations, opening 209 and plate 215 are also arranged within the top portion 207 and are arranged proximate or adjacent to the induction coil (for example, underneath induction coil).

Figure 2C:
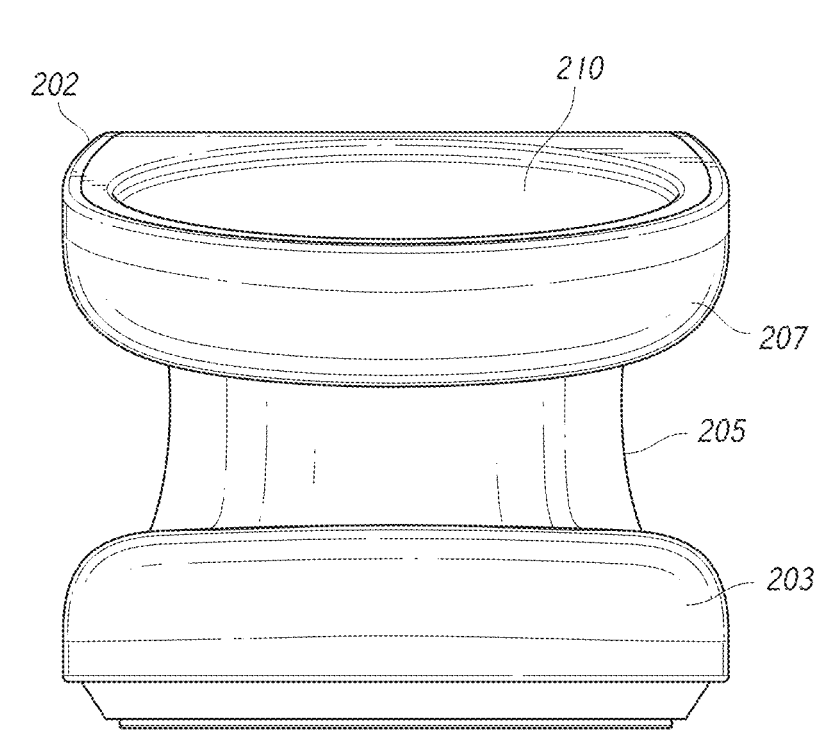
FIG. 2C is a front view of the charger of FIGS. 2A-2B in accordance with aspects of this disclosure.
Figure 2D:
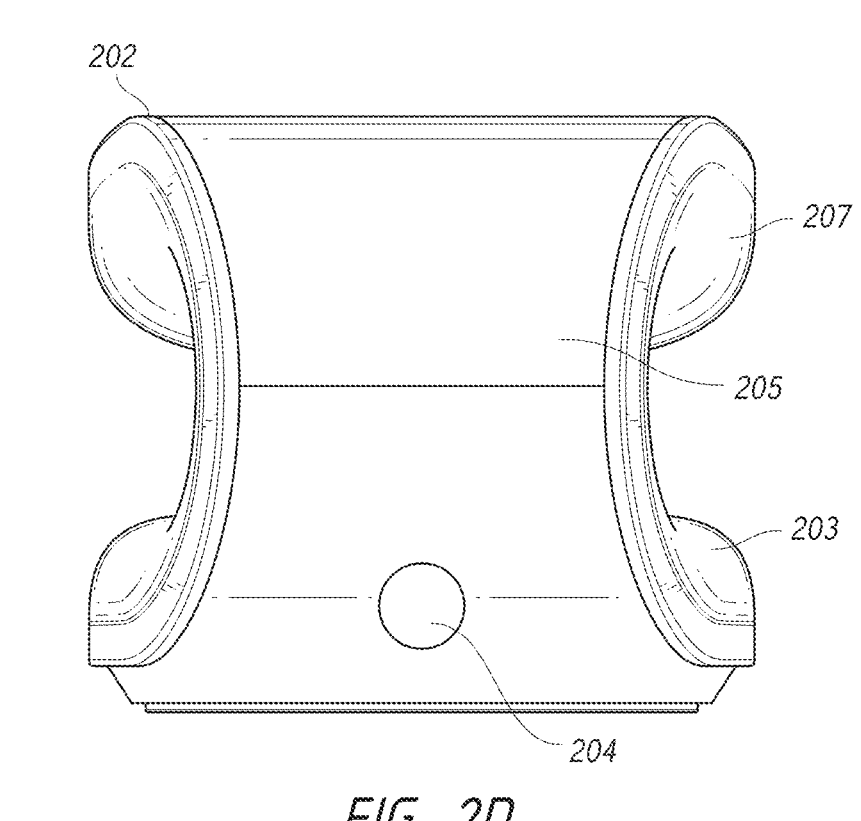
FIG. 2D is a rear view of the charger of FIGS. 2A-2B in accordance with aspects of this disclosure.
Figure 2E:
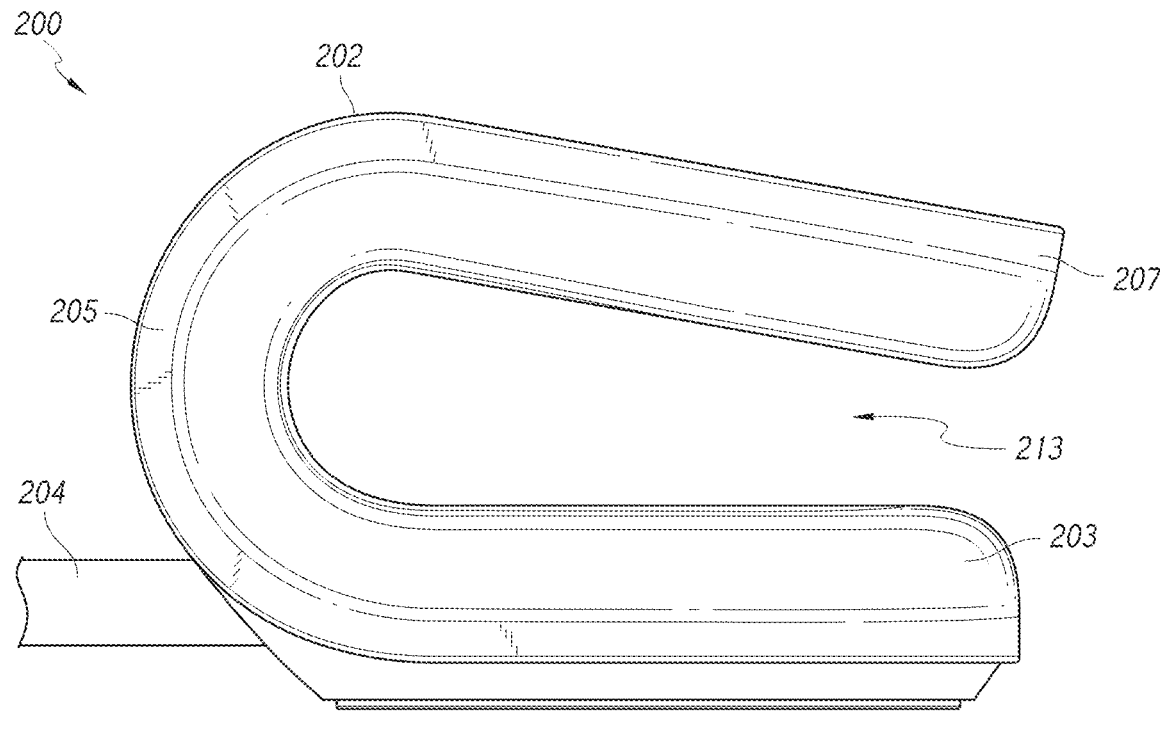
FIGS. 2E-2F are side views of the charger of FIGS. 2A-2B in accordance with aspects of this disclosure.
Figure 2F:
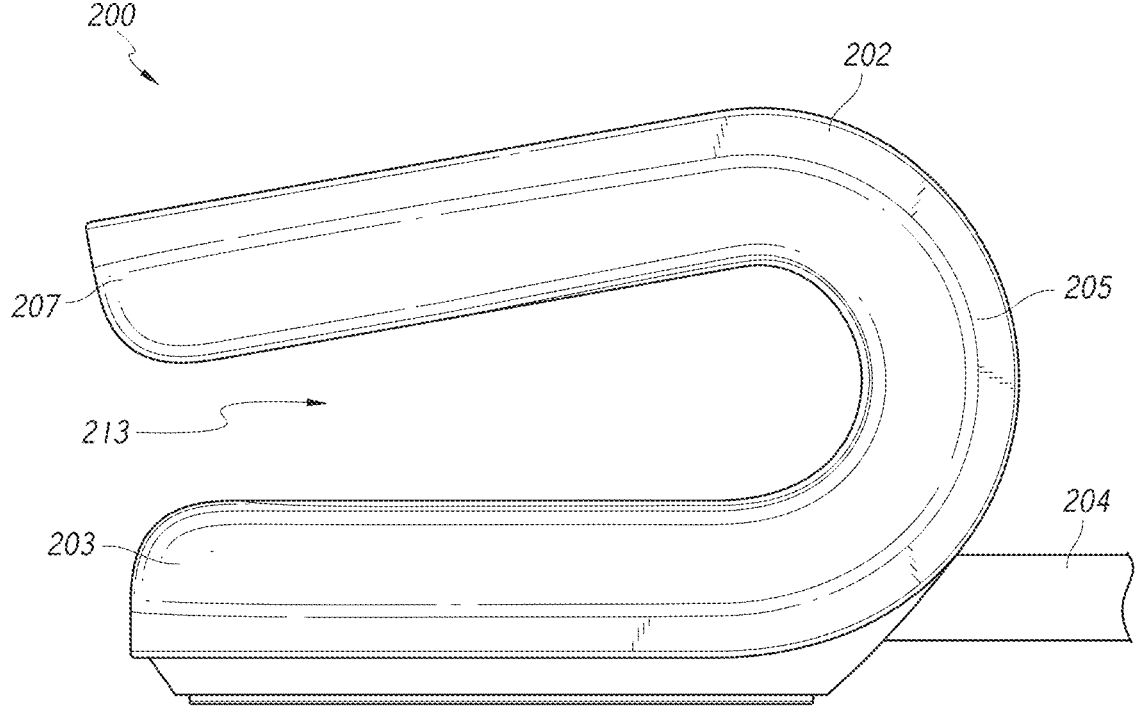

With reference to FIGS. 2A-2F and as mentioned previously, the top and bottom portions 207, 203 can be connected to, and by, the median portion 205. For example, median portion 205 can be connected to ends of the top and bottom portions 207, 203. The median portion 205 can operably position the top and bottom portions 207, 203 away from one another such that a gap 213 (which also can be referred to as a "space") separates the top portion 207 from the bottom portion 203, the benefits of which are described further below. In some implementations, no portion of the top portion 207 contacts any portion of the bottom portion 203. In some implementations, the median portion 205 is curved. In some implementations, the top portion 207 is non-parallel with respect to the bottom portion 203 (see FIGS. 2E-2F). For example, as shown in FIGS. 2E-2F, in some implementations, the top portion 207 tilts downward from a first end of the top portion 207 (which connects to median portion 205) to a second end of the top portion 207. The top portion 207 can be arranged at an angle (relative to a support surface 201 upon which charger 200 rests and/or a horizontal plane parallel to such support surface 201) that is between 0 degrees and 20 degrees, for example, between 1 degrees and 19 degrees, between 2 degrees and 18 degrees, between 3 degrees and 17 degrees, between 4 degrees and 16 degrees, between 5 degrees and 15 degrees, between 6 degrees and 14 degrees, between 7 degrees and 13 degrees, between 8 degrees and 12 degrees, between 9 degrees and 11 degrees, between 1 degrees and 20 degrees, between 5 degrees and 20 degrees, between 5 degrees and 15 degrees, or between 10 degrees and 15 degrees. Such configurations can allow charging region 210 to face in a direction that is non-perpendicular relative to a support surface 201 (for example, slightly non-perpendicular to support surface 201), which can in turn cause a display of electronic device 10 (which can be arranged at a top surface of device 10) to be more easily viewable/assessable to a user when electronic device 10 is mounted to charger 200.

The charger 200 can include a circuit board. In some implementations, such circuit board is arranged within the interior of the housing 202 in the bottom portion 203. In some implementations, circuit board is arranged within the interior of the housing 202 in the bottom portion 203 and the induction coil of charger 200 is arranged within the interior of the housing 202 in the top portion 207. Such configurations advantageously inhibit or prevent heat generated by the induction coil from being transmitted to the circuit board, and vice versa. This allows temperatures within charger 200 to be regulated and improves performance of the induction coil and circuit board, along with other components of the charger 200. Gap 213 between top and bottom portions 207, 203 allows heat generated by the induction coil and circuit board to dissipate to more readily to the external environment while minimizing or eliminating heat transfer between the top and bottom portions 207, 203.

As described previously, the charger 200 can include a support 211 (see FIGS. 2B, 2H) which can contact a surface on which the charger 200 rests (for example, support surface 201). The support 211 can be made of synthetic material. The support 211 can be made of plastic, polymer, and/or rubber. The support 211 can be made of a thermally insulative material. The support 211 can be annular and/or circular.

FIGS. 2C-2D illustrate front and rear views (respectively) of the charger 200. The charging region 210 can be ellipsoidal. The charging region 210 can be concave. The charging region 210 can be recessed from a top surface of housing 202 at the top portion 207. In some implementations, the charging region 210 is planar.

Figure 2G:
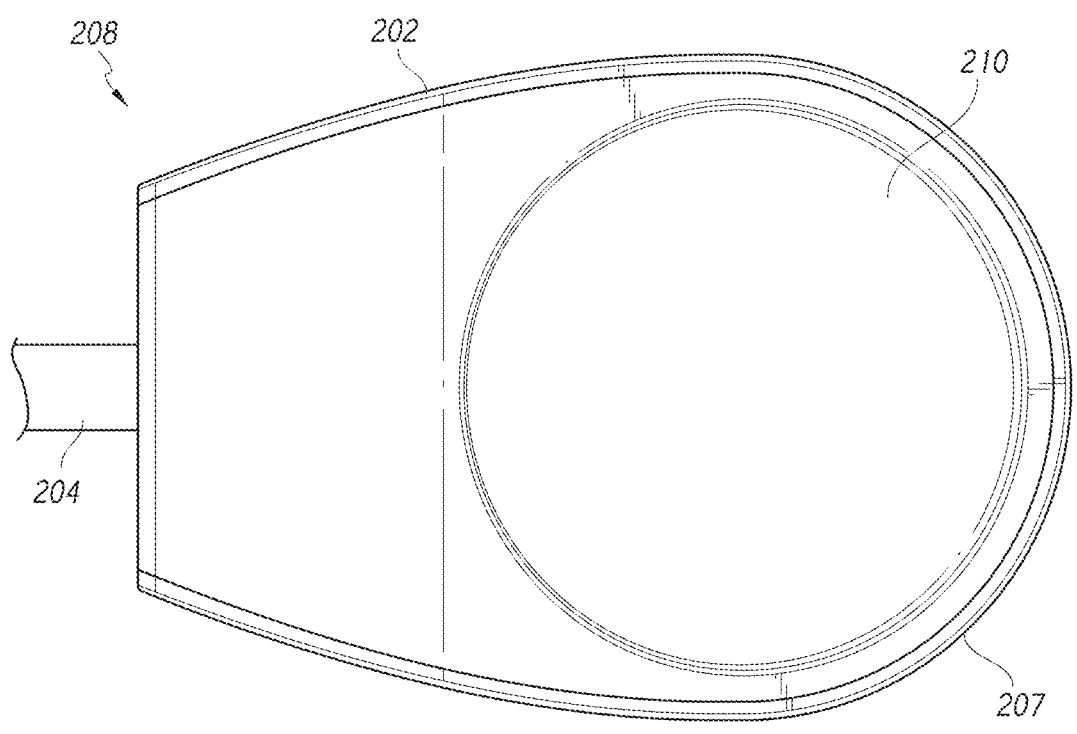
FIG. 2G is a top view of the charger of FIGS. 2A-2B in accordance with aspects of this disclosure.

FIG. 2G is a top view of the charger. The charging region 210 can be circular. The charging region 210 can receive an electronic device to be charged.

Figure 2H:
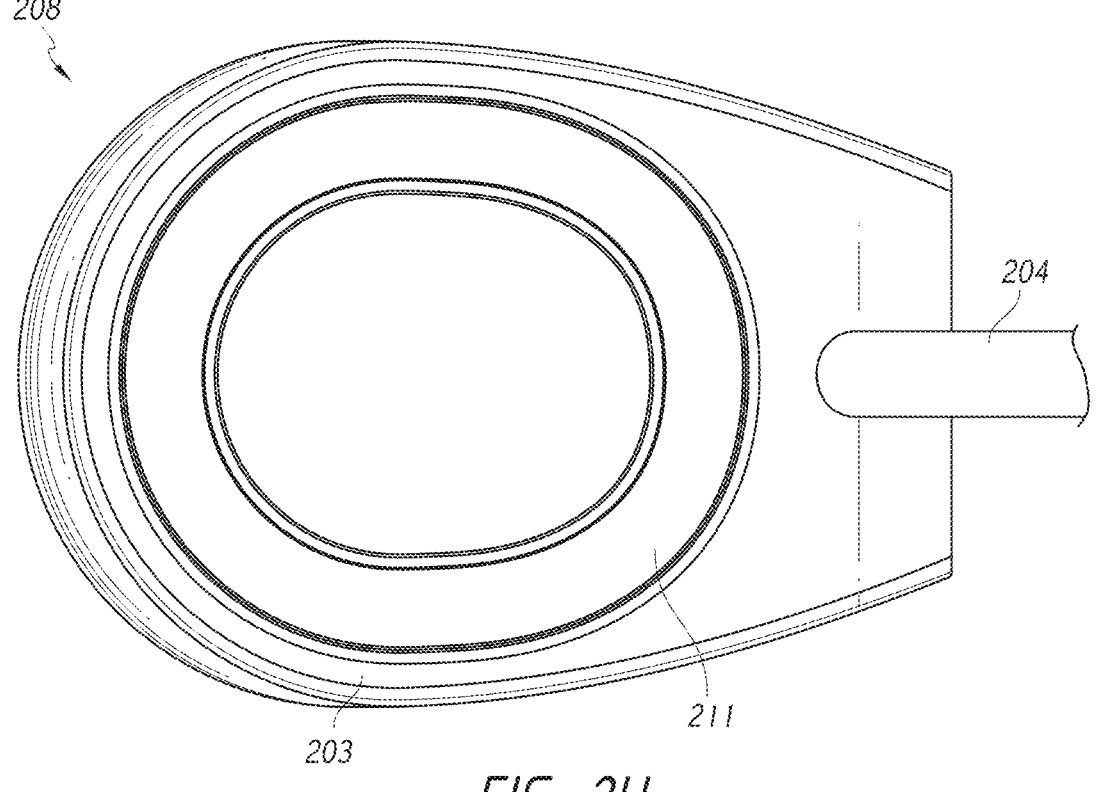
FIG. 2H is a bottom view of the charger of FIGS. 2A-2B in accordance with aspects of this disclosure.
Figures 2I, 2J:
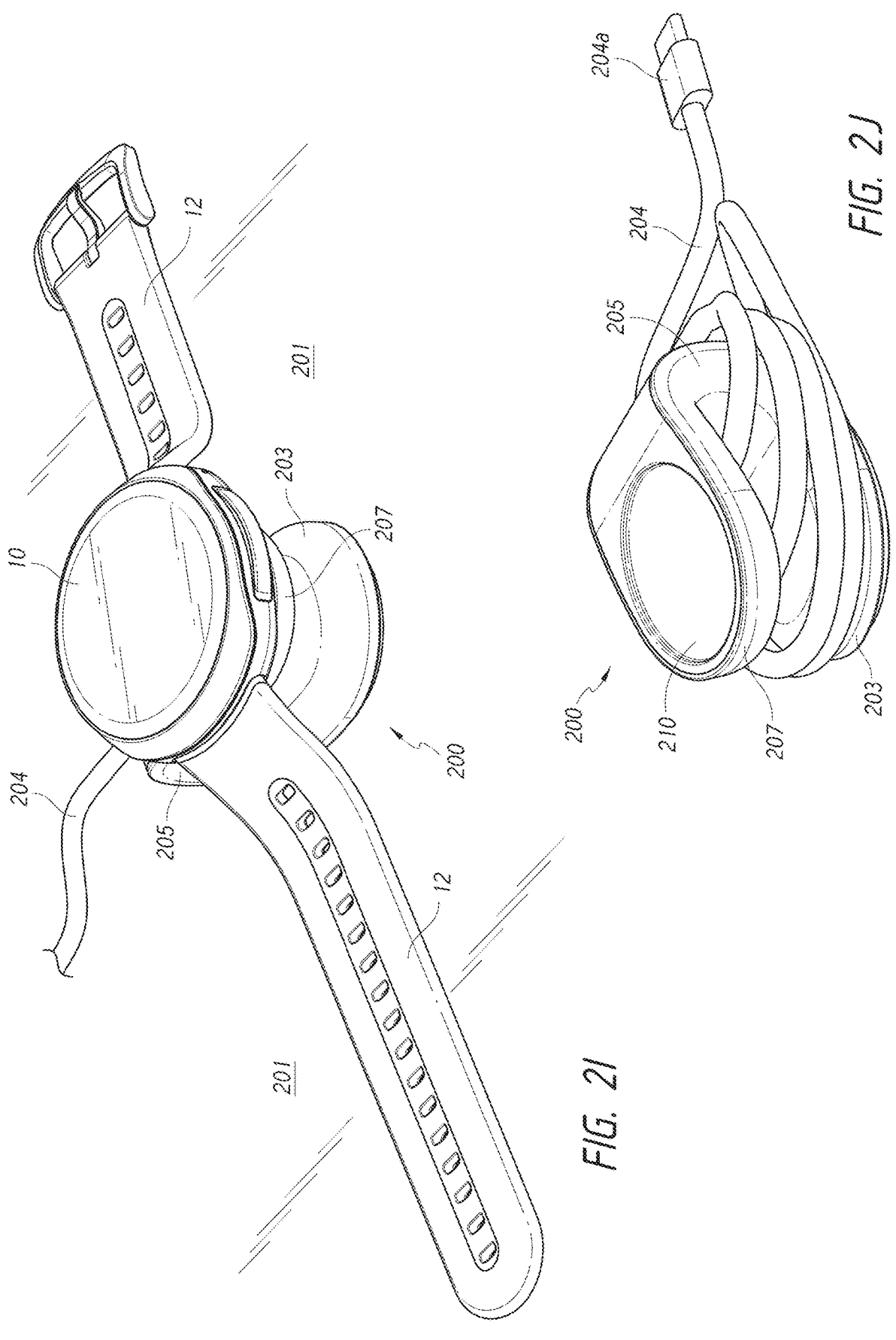
FIG. 2I illustrates the charger of FIGS. 2A-2B in an example condition of use with an example electronic device in accordance with aspects of this disclosure.
FIG. 2J illustrates the charger of FIGS. 2A-2B in an example condition of use where a cable is wrapped around the charger in accordance with aspects of this disclosure.

FIG. 2H is a bottom view of the charger. The support 211 can be annular. The support 211 can be circular.

As described previously, gap 213 advantageously allows for heat generated by a circuit board and induction coil of charger 200 to be efficiently dissipating to an external environment and minimizes or eliminates heat transfer therebetween. Gap 213 can additionally allow for improved cable management. FIG. 2J illustrates charger 200 in another example condition of use where cable 204 is wrapped around median portion 205 and is partially positioned within gap 213. Cable 204 can be wrapped in such illustrated configuration when charger 200 is not being used (for example, when charger 200 is stored away) and/or when charger 200 is in use, in some cases.

Figures 3A, 3B, 3C:
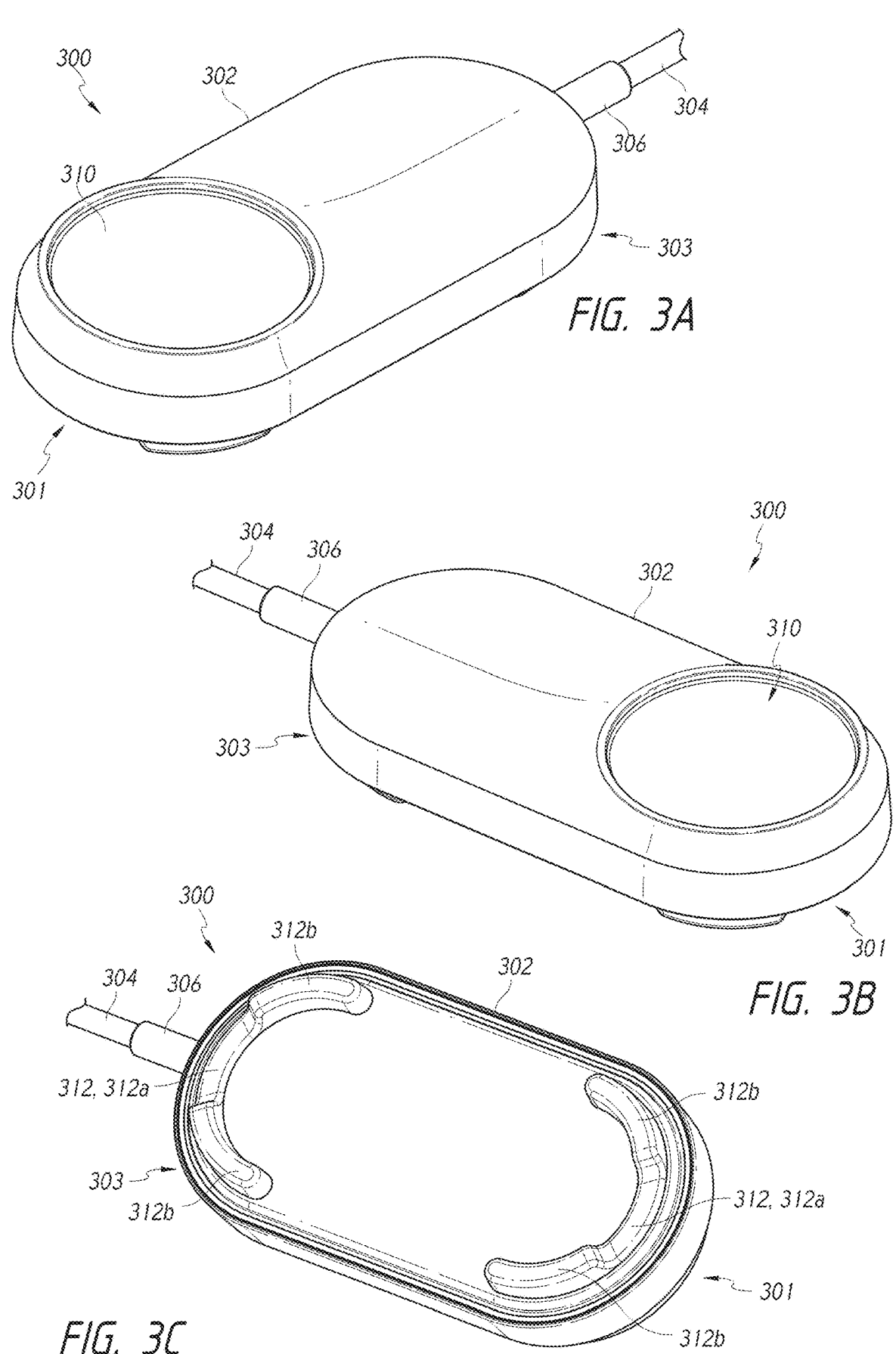
FIGS. 3A-3B are top perspective views of another example induction charger in accordance with aspects of this disclosure.
FIG. 3C is a bottom perspective view of the charger of FIGS. 3A-3B in accordance with aspects of this disclosure.
Figure 3D:
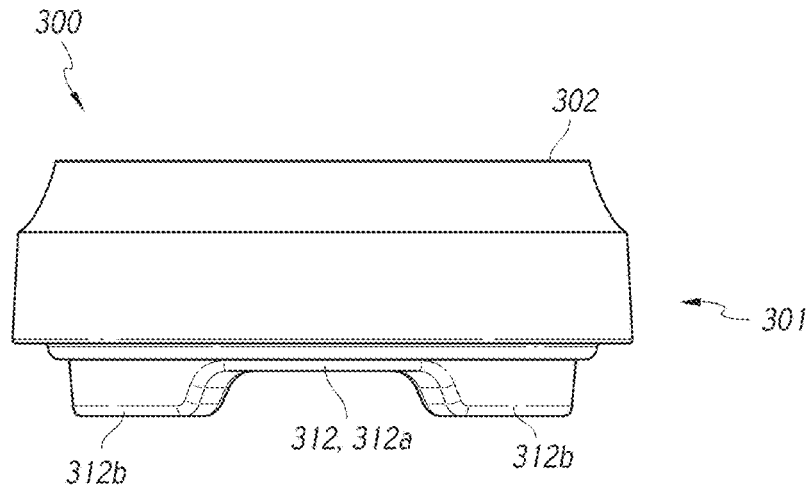
FIG. 3D is a front view of the charger of FIGS. 3A-3B in accordance with aspects of this disclosure.
Figure 3E:
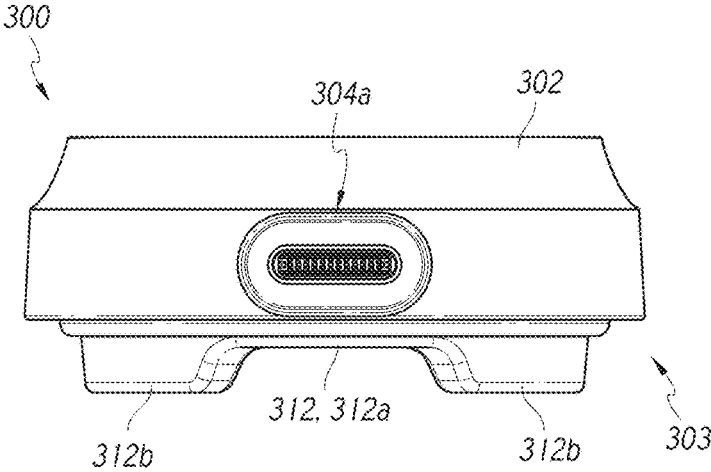
FIG. 3E is a rear view of the charger of FIGS. 3A-3B in accordance with aspects of this disclosure.
Figure 3F:
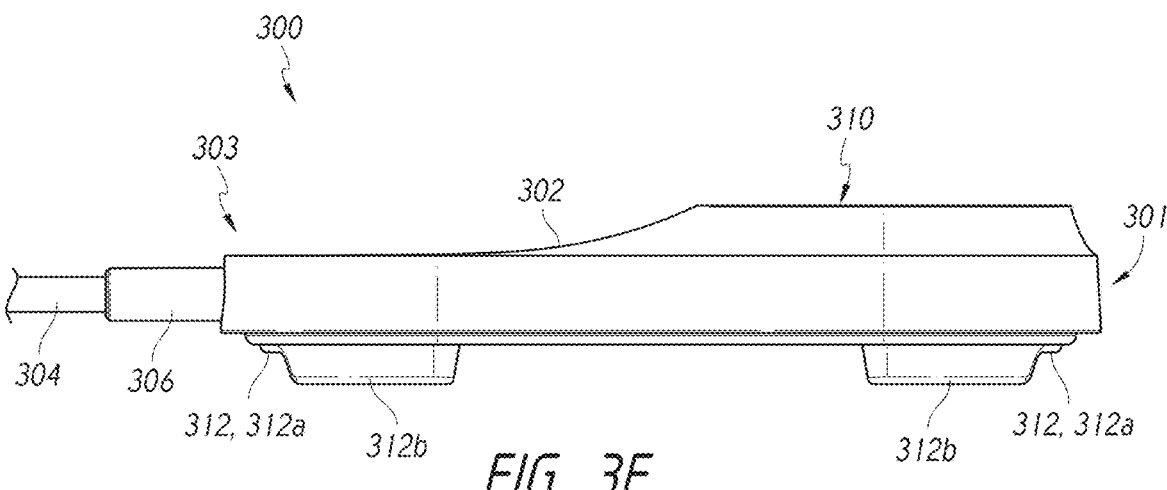
FIGS. 3F-3G are side views of the charger of FIGS. 3A-3B in accordance with aspects of this disclosure.
Figures 3G, 3H, 3I:
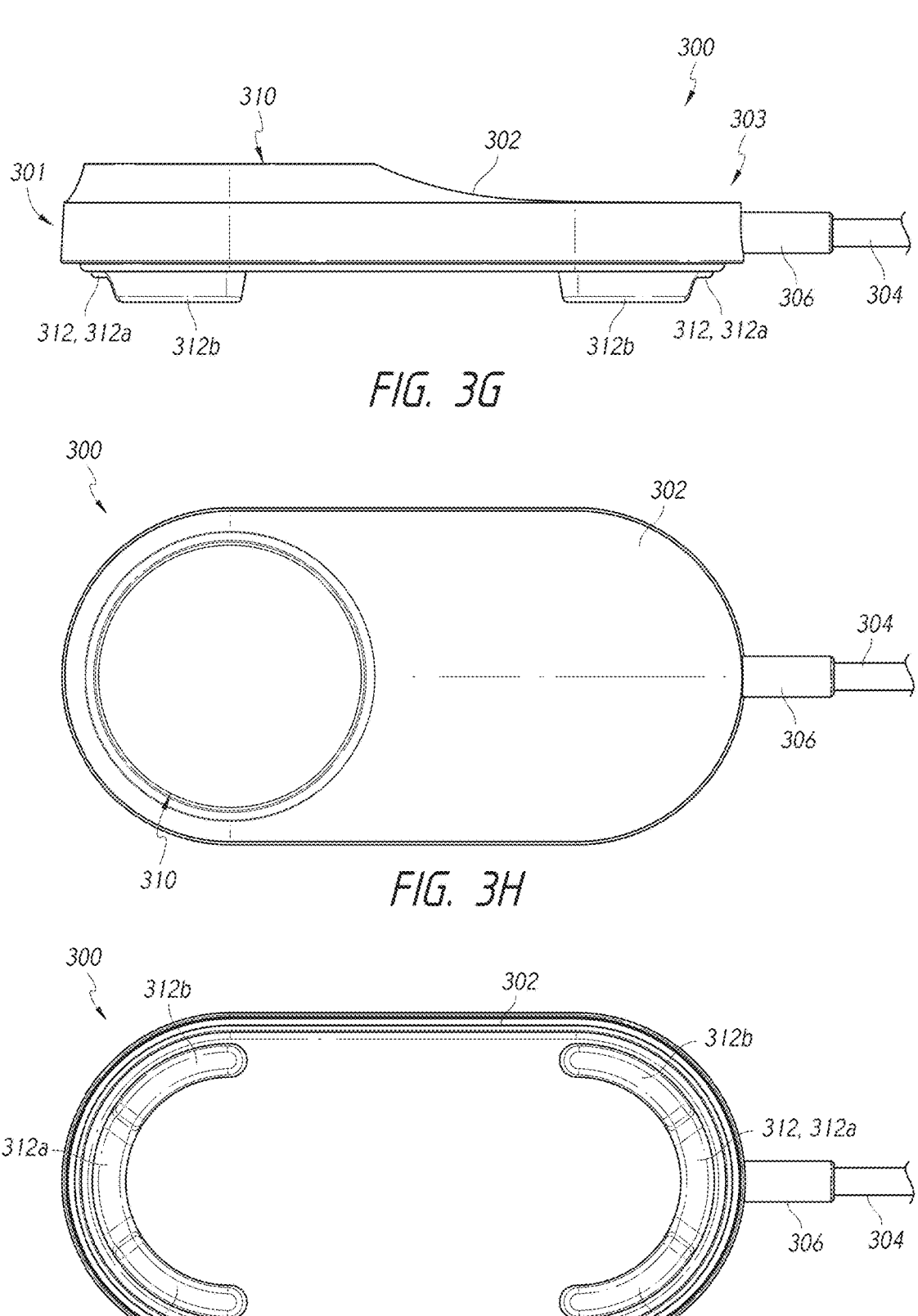
FIG. 3H is a top view of the charger of FIGS. 3A-3B in accordance with aspects of this disclosure.
FIG. 3I is a bottom view of the charger of FIGS. 3A-3B in accordance with aspects of this disclosure.

FIGS. 3A-3B illustrate top perspective views of another charger 300. FIG. 3C illustrates a bottom perspective view, FIG. 3D illustrates a front view, FIG. 3E illustrates a rear view, FIGS. 3F-3G illustrate side views, FIG. 3H illustrates a top view, and FIG. 3I illustrates a bottom view of charger 300. Charger 300 can be similar or identical to charger 100 in some or many respects. Charger 300 can include a housing 302, a cable 304, a bend relief 306, a first end 301, a second end 303, and a charging region 310, which can be similar or identical to housing 102, a cable 104, a bend relief 106, a first end 101, a second end 103, and a charging region 110 (respectively) of charger 100. Housing 302 can be similar or identical to housing 102 in some, many, or all respects. For example, housing 302 can include a top shell, bottom shell, and plate, that can be similar or identical to top shell 102a, bottom shell 102b, and plate 136 (respectively). Charger 300 can include any of the other components described with respect to charger 100 above, for example, inductor assembly 120 (and any or all component described with respect to inductor assembly 120) and/or circuit board 122. Charger 300 can be configured to receive and charge electronic device 10 in a similar or identical manner as that described and/or illustrated elsewhere herein with respect to charger 100.

With reference to FIGS. 3C-3G and 31, charger 300 can include supports 312 configured to contact a support surface (for example, a desk, table, or other surface). Supports 312 can be similar to supports 112 in some or many respects. For example, supports 312 can be configured to couple portions of housing 302 together, such as a top shell, a bottom shell, and/or a plate of housing 302 (which can be similar or identical to top shell 102*a*, bottom shell 102*b*, and plate 136 of housing 102 of charger 100). As illustrated in FIGS. 3C-3G and 31, supports 312 have a different configuration than supports 112 of charger 100. Supports 312 include a main body 312*a* (which can be similar to main body 112*a* of support 112) and pads 312*b* extending from main body 312*a* and separated by each other, similar to pads 112*b*. With reference to FIG. 3C, pads 312*b* can gradually terminate/transition to a size, shape, and/or thickness of a main body 312*a* of supports 312.

ADDITIONAL CONSIDERATIONS

While the above detailed description has shown, described, and pointed out novel features as applied to various implementations, it will be understood that various omissions, substitutions, and changes in the form and details of the systems, devices, or methods illustrated can be made without departing from the spirit of the disclosure. As will be recognized, certain implementations described herein can be embodied within a form that does not provide all of the features and benefits set forth herein, as some features can be used or practiced separately from others.

Many other variations than those described herein will be apparent from this disclosure. For example, depending on the implementation, certain acts, events, or functions of any of the methods described herein can be performed in a different sequence, may be added, merged, or left out altogether (e.g., not all described acts or events are necessary for the practice of the method).

Conditional language, such as, among others, "can," "could," "might," or "may," unless specifically stated otherwise, or otherwise understood within the context as used, is generally intended to convey that certain implementations include, while other implementations do not include, certain features, elements and/or steps. Thus, such conditional language is not generally intended to imply that features, elements and/or steps are in any way required for one or more implementations or that one or more implementations necessarily include logic for deciding, with or without user input or prompting, whether these features, elements and/or steps are included or are to be performed in any particular implementation.

Disjunctive language such as the phrase "at least one of X, Y, or Z," unless specifically stated otherwise, is otherwise understood with the context as used in general to present that an item, term, and so forth, may be either X, Y, or Z, or any combination thereof (for example, X, Y, and/or Z). Thus, such disjunctive language is not generally intended to, and should not, imply that certain implementations require at least one of X, at least one of Y, or at least one of Z to each be present.

Language of degree used herein, such as the terms "approximately," "about," "generally," and "substantially" as used herein represent a value, amount, or characteristic close to the stated value, amount, or characteristic that still performs a desired function or achieves a desired result. For example, the terms "approximately", "about", "generally," and "substantially" may refer to an amount that is within less than 10% of, within less than 5% of, within less than 1% of, within less than 0.1% of, and within less than 0.01% of the stated amount. As another example, in certain implementations, the terms "generally parallel" and "substantially parallel" refer to a value, amount, or characteristic that departs from exactly parallel by less than or equal to 10 degrees, 5 degrees, 3 degrees, or 1 degree. As another example, in certain implementations, the terms "generally perpendicular" and "substantially perpendicular" refer to a value, amount, or characteristic that departs from exactly perpendicular by less than or equal to 10 degrees, 5 degrees, 3 degrees, or 1 degree.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

It should be emphasized that many variations and modifications may be made to the herein-described implementations, the elements of which are to be understood as being among other acceptable examples. All such modifications and variations are intended to be included herein within the scope of this disclosure. The section headings used herein are merely provided to enhance readability and are not intended to limit the scope of the implementations disclosed in a particular section to the features or elements disclosed in that section. The foregoing description details certain implementations. It will be appreciated, however, that no matter how detailed the foregoing appears in text, the devices, systems, and methods can be practiced in many ways. As is also stated herein, it should be noted that the use of particular terminology when describing certain features or aspects of the systems and methods should not be taken to imply that the terminology is being re-defined herein to be restricted to including any specific characteristics of the features or aspects of the devices, systems, and methods with which that terminology is associated.

What is claimed is:

1. A method of manufacturing an induction charger, the method comprising:

obtaining a housing comprising an interior surface, an exterior surface, and a charging region configured to receive a portion of an electronic device;

obtaining an inductor member configured to receive electrical current and generate a magnetic field responsive to the received electrical current;

obtaining a frame;

positioning said inductor member adjacent said frame;

engaging the frame with one or more portions of the housing in a first position; and biasing the inductor member against a portion of the interior surface of the housing at said charging region with said frame based on transitioning said frame from said first position to a second position, wherein said inductor member does not contact the portion of the interior surface when the frame is in said first position, wherein said inductor member contacts the portion of the interior surface when the frame is in said second position.

2. The method of claim 1, wherein:

the induction charger is configured to rest upon a support surface;

said housing comprises a top shell and a bottom shell, said bottom shell configured to be positioned closer to said support surface than said top shell when said induction charger rests upon said support surface;

said charging region is located on a portion of said top shell;

the method further comprises securing the top shell to the bottom shell; and said step of biasing the inductor member against the portion of the interior surface of the housing at said charging region with said frame occurs prior to said step of securing the top shell to the bottom shell.

3. The method of claim 1, wherein:

said inductor member comprises an annular shape; and said step of biasing the inductor member against the portion of the interior surface of the housing at said charging region with the frame comprises biasing the inductor member such that an inner edge of the annular inductor member contacts the portion of the interior surface of the housing at said charging region of the housing.

4. The method of claim 1, wherein:

the first position is a first rotational position of the frame and the second position is a second rotational position of the frame; and said transitioning the frame from said first position to the second position comprising rotating the frame from the first rotational position to the second rotational position.

5. The method of claim 1, wherein:

said transitioning the frame from said first position to the second position comprises rotating the frame about an axis extending through a center of the frame; and said rotating the frame about said axis causes the inductor member to move along said axis.

6. The method of claim 1, wherein the method further comprises:

inhibiting the frame from transitioning from said second position to said first position.

7. The method of claim 1, wherein:

said frame comprises a main body, one or more arms connected to said main body, and one or more fingers connected to said main body; and the method further comprises:

positioning said main body around said inductor member;

engaging said one or more arms with one or more portions of the housing; and engaging said one or more fingers with a magnetic material positioned adjacent said inductor member.

8. The method of claim 7, wherein:

said housing further comprises one or more teeth arranged on the interior surface of said housing;

said engaging the frame with one or more portions of the housing in said first position comprises:

engaging each of said one or more teeth with a first portion of one of the one or more arms of said frame; and said transitioning the frame from said first position to said second position comprises:

engaging each of said one or more teeth with a second portion of said one of the one or more arms of said frame.

9. The method of claim 7, wherein said engagement between said one or more arms and said one or more portions of the housing form a ratchet.

10. The method of claim 1, wherein:

said inductor member is annular; and the method further comprises:

obtaining a magnetic material comprising a first portion and a second portion that is inset from a perimeter of said first portion; and positioning said second portion of said magnetic material within an opening defined by the annular inductor member.

11. The method of claim 10, wherein:

said magnetic material further comprises an aperture extending through said first and second portions of the magnetic material;

said housing further comprises a protrusion extending from the interior surface at said charging region; and the method further comprises positioning said protrusion at least partially within said aperture in said magnetic material to at least partially align said magnetic material with said charging region.

12. The method of claim 1, further comprising:

securing the inductor member to a magnetic material to inhibit relative movement between the inductor member and the magnetic material; and securing the magnetic material to the frame to inhibit relative movement between the magnetic material and the frame.

13. The method of claim 12, wherein said securing the inductor member to the magnetic material comprises adhering the inductor member to the magnetic material.

14. The method of claim 1, wherein said inductor member comprises a coiled conductor wire, and wherein said biasing the inductor member against the portion of the interior surface of the housing at said charging region comprises biasing the inductor member such that at least a portion of the coiled conductor wire deforms.

15. The method of claim 14, wherein said inductor member comprises a casing enclosing said coiled conductor wire.

* * * * *